US012656260B2

(12) United States Patent
Chimenti

(10) Patent No.: US 12,656,260 B2
(45) Date of Patent: Jun. 16, 2026

(54) METHODS OF MONITORING KINETIC PROCESSES IN AMORPHOUS MATERIALS

(71) Applicant: Rowan University, Glassboro, NJ (US)

(72) Inventor: Robert V. Chimenti, Pitman, NJ (US)

(73) Assignee: Rowan University, Glassboro, NJ (US)

( * ) Notice: Subject to any disclaimer, the term of this patent is extended or adjusted under 35 U.S.C. 154(b) by 182 days.

(21) Appl. No.: 18/666,705

(22) Filed: May 16, 2024

(65) Prior Publication Data

US 2024/0385114 A1 Nov. 21, 2024

Related U.S. Application Data

(60) Provisional application No. 63/466,894, filed on May 16, 2023.

(51) Int. Cl.
*G01N 21/65* (2006.01)

(52) U.S. Cl.
CPC ....... *G01N 21/65* (2013.01); *G01N 2021/653* (2013.01)

(58) Field of Classification Search
CPC ......................... G01N 21/65; G01N 2021/653
See application file for complete search history.

(56) References Cited

U.S. PATENT DOCUMENTS

| | | | | |
|---|---|---|---|---|
| 2013/0277618 A1* | 10/2013 | Lay | .......................... | H01B 1/04 205/333 |
| 2015/0182119 A1* | 7/2015 | Crane | .................. | A61B 5/0084 600/407 |
| 2016/0238523 A1* | 8/2016 | Zeitler | .................. | G01N 33/15 |
| 2018/0305827 A1* | 10/2018 | Wang | ...................... | B01J 35/59 |
| 2019/0285548 A1* | 9/2019 | Nunney | ............ | G01N 23/2273 |
| 2022/0381696 A1* | 12/2022 | Hoehse | .................. | G01N 21/65 |

OTHER PUBLICATIONS

Chimenti, Robert V., et al. "Toward a practical method for measuring glass transition in polymers with low-frequency Raman spectroscopy." Applied Physics Letters 122.26 (2023). (Year: 2023).*
Novikov, V. N., et al. "Connection between quasielastic Raman scattering and free volume in polymeric glasses and supercooled liquids." The Journal of chemical physics 107.4 (1997): 1057-1065. (Year: 1997).*
Chimenti , et al., "Toward a practical method for measuring glass transition in polymers with low-frequency Raman spectroscopy", Appl Phys Lett, 122, Jun. 26, 2023, pp. 264101.
Hedoux , et al., "Using the low-frequency Raman spectroscopy to analyze the crystallization of amorphous indomethacin", European Journal of Pharmaceutical Sciences, 38, 2009, pp. 156-164.
PCT International search Report dated Aug. 21, 2024 for co-pending PCT International Application No. PCT/US2024/029791.

* cited by examiner

*Primary Examiner* — Uzma Alam
*Assistant Examiner* — Richard O Toohey
(74) *Attorney, Agent, or Firm* — Saul Ewing LLP; Domingos J. Silva; Sean P. Ritchie

(57) ABSTRACT
The present disclosure provides methods for monitoring certain kinetic processes in amorphous materials using low-frequency Raman spectroscopy.

20 Claims, 45 Drawing Sheets

Fully methacrylate, DA-2

Epoxy/amine, EPON 828

Methacrylate/epoxy, PBE

FIG. 6

Time (s)

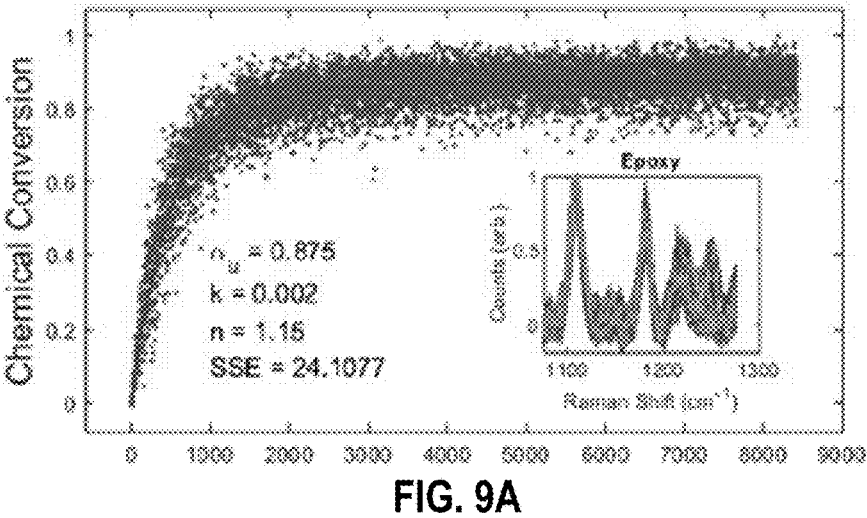
FIG. 9A
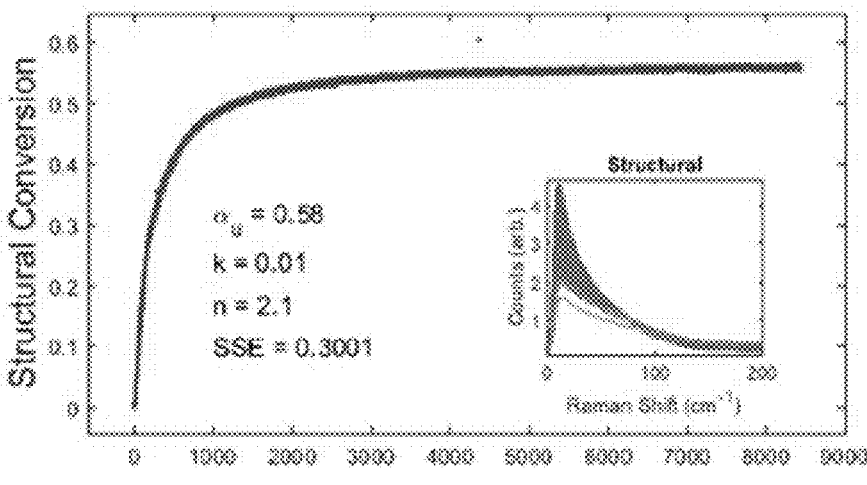
FIG. 9B
FIG. 9C

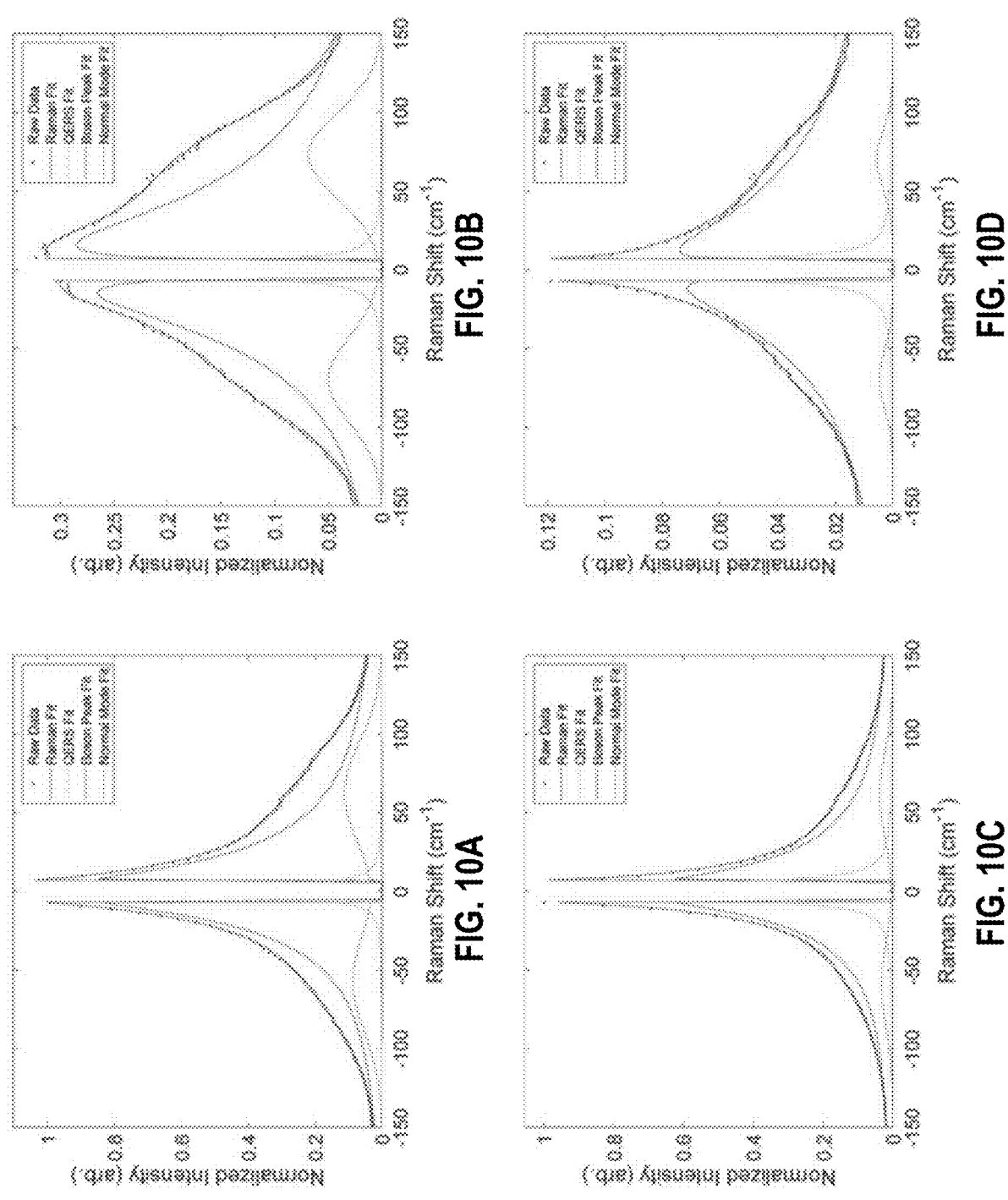

Phenyl Methacrylate (PM)

BisGMA

EPON 828

Epikure W

TPO

FIG. 14

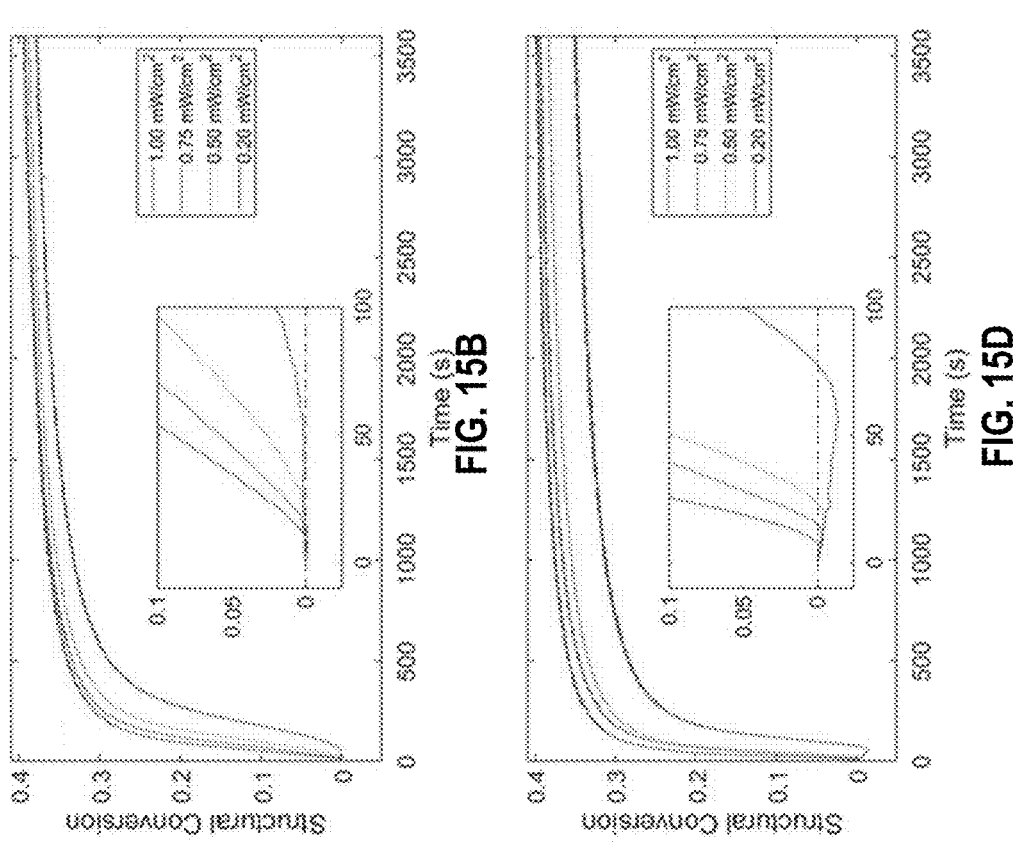
FIG. 15B
FIG. 15D
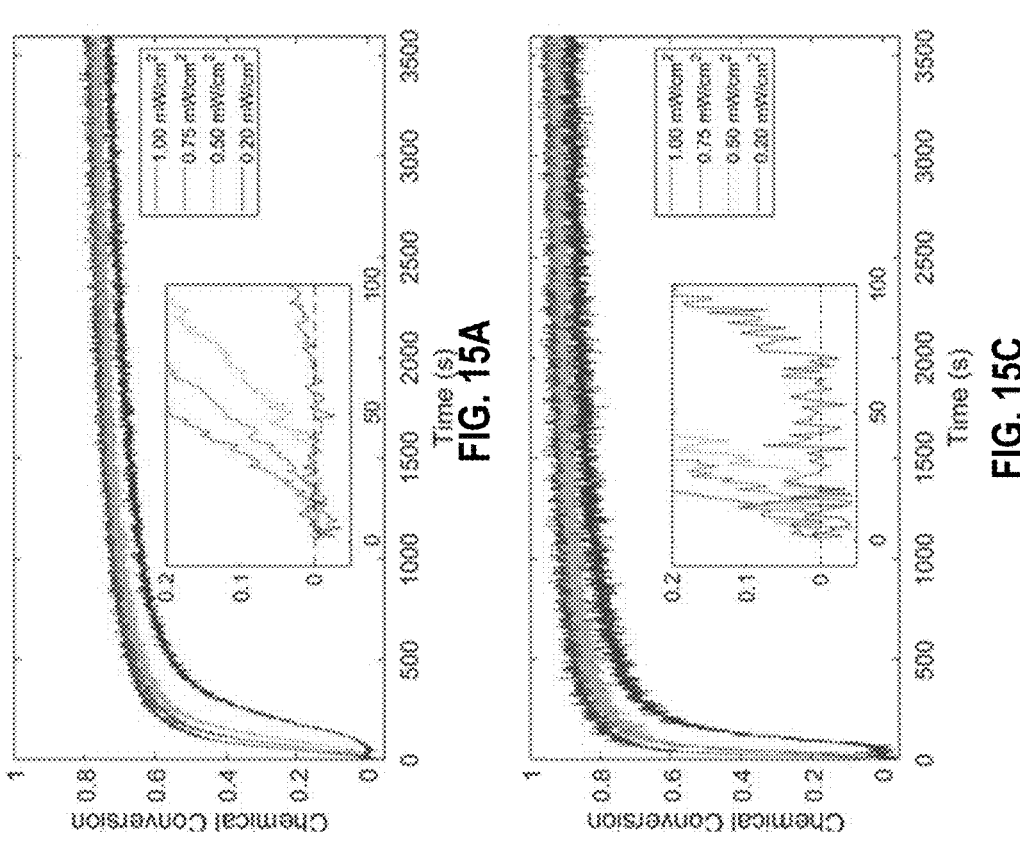
FIG. 15A
FIG. 15C

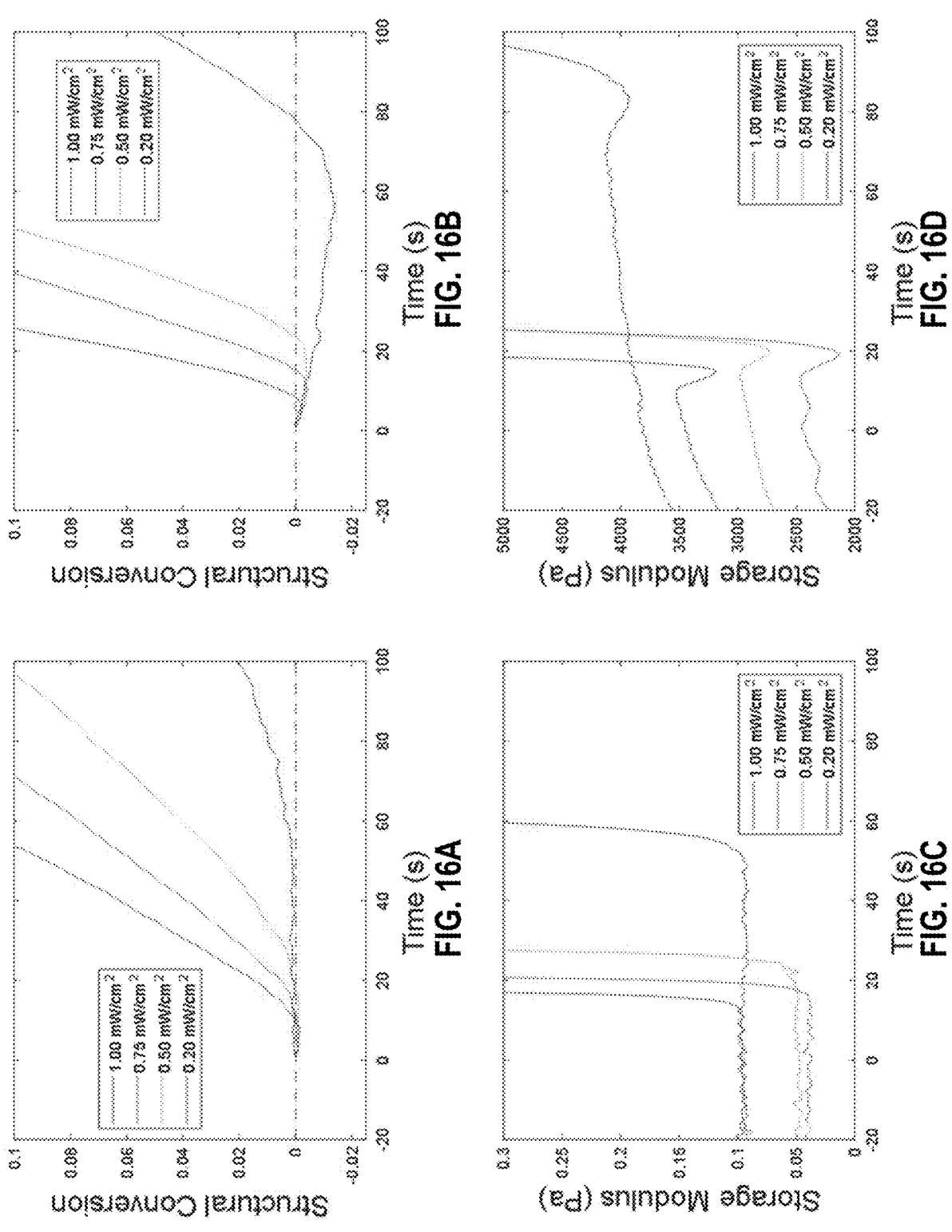

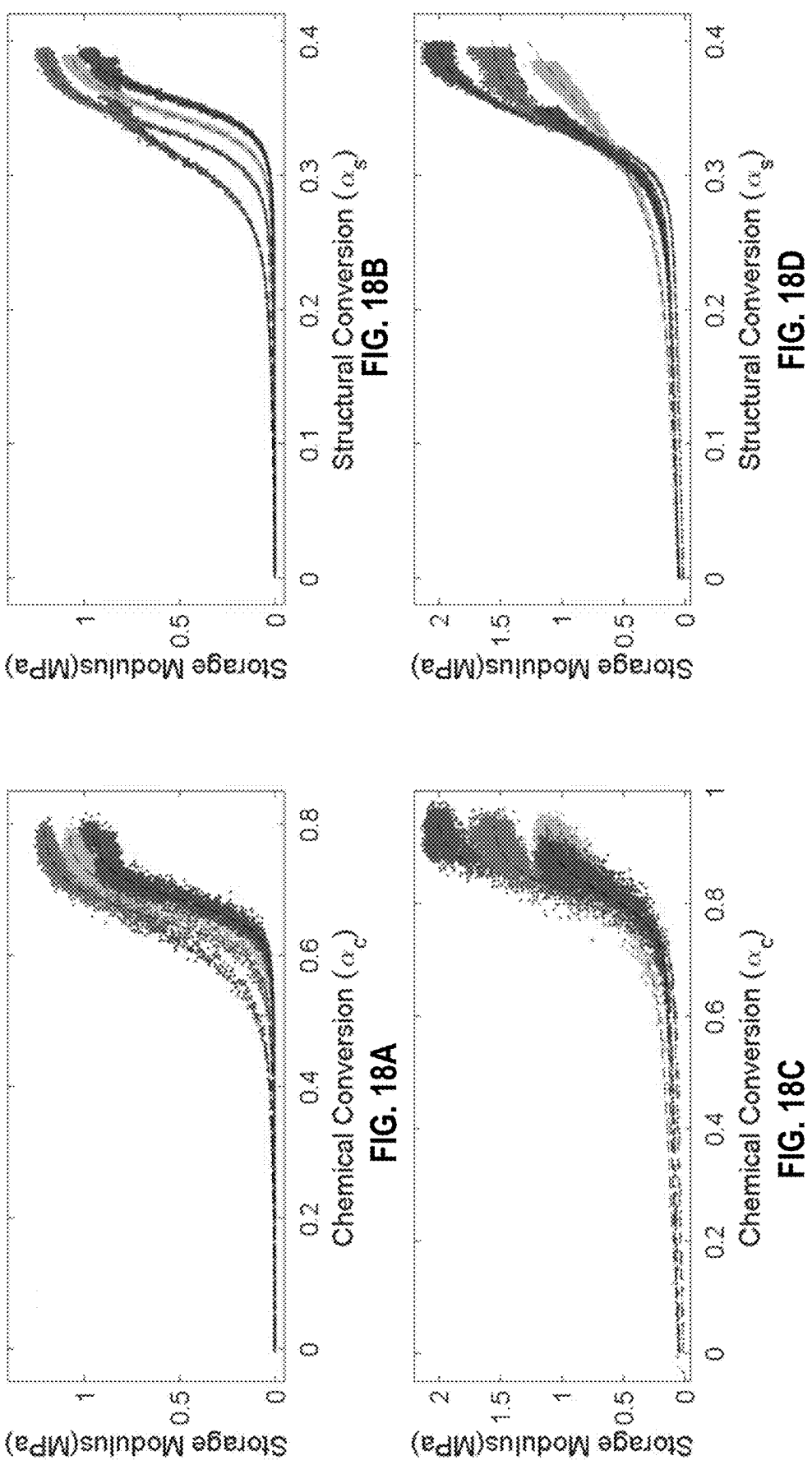

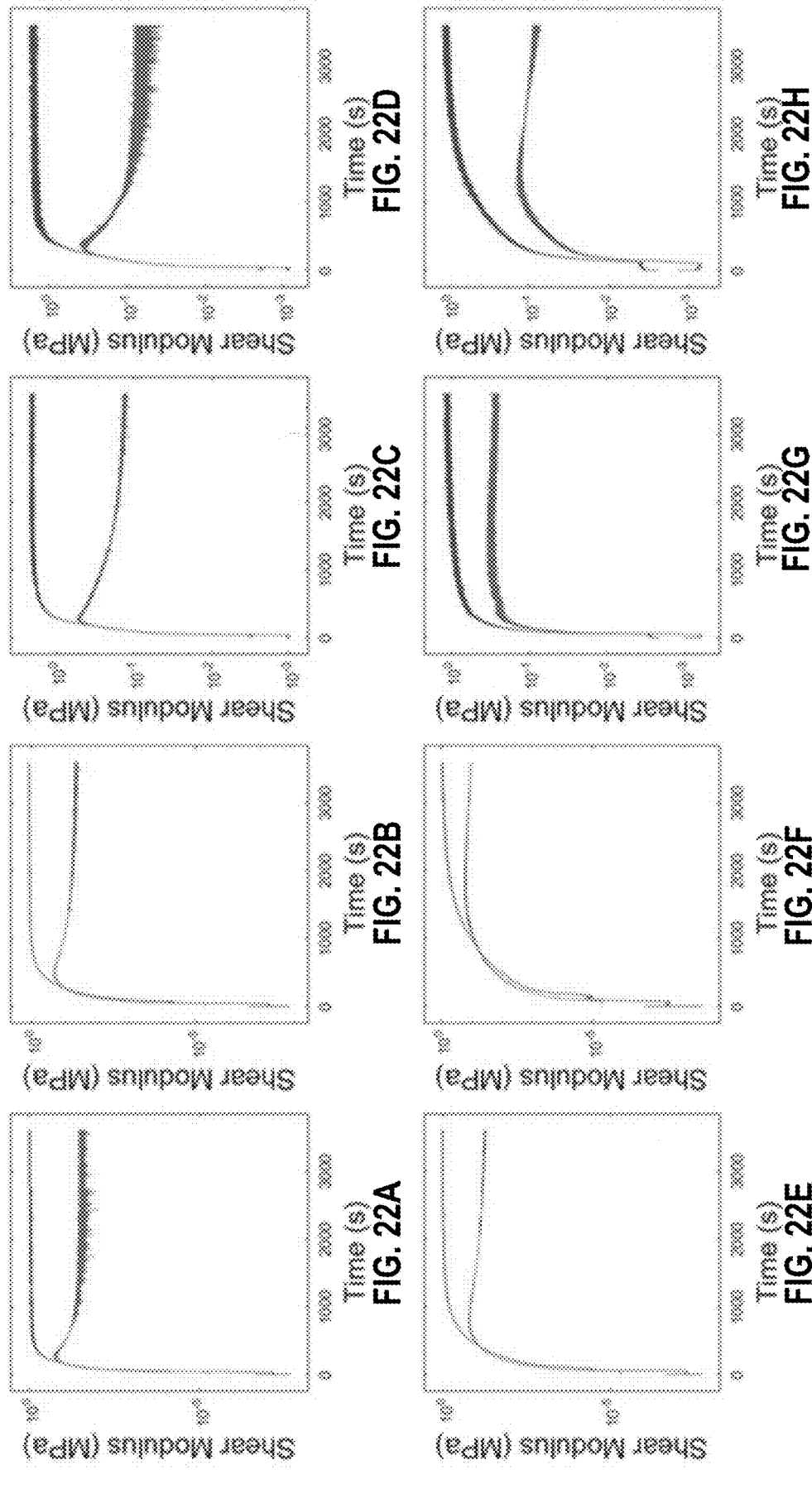

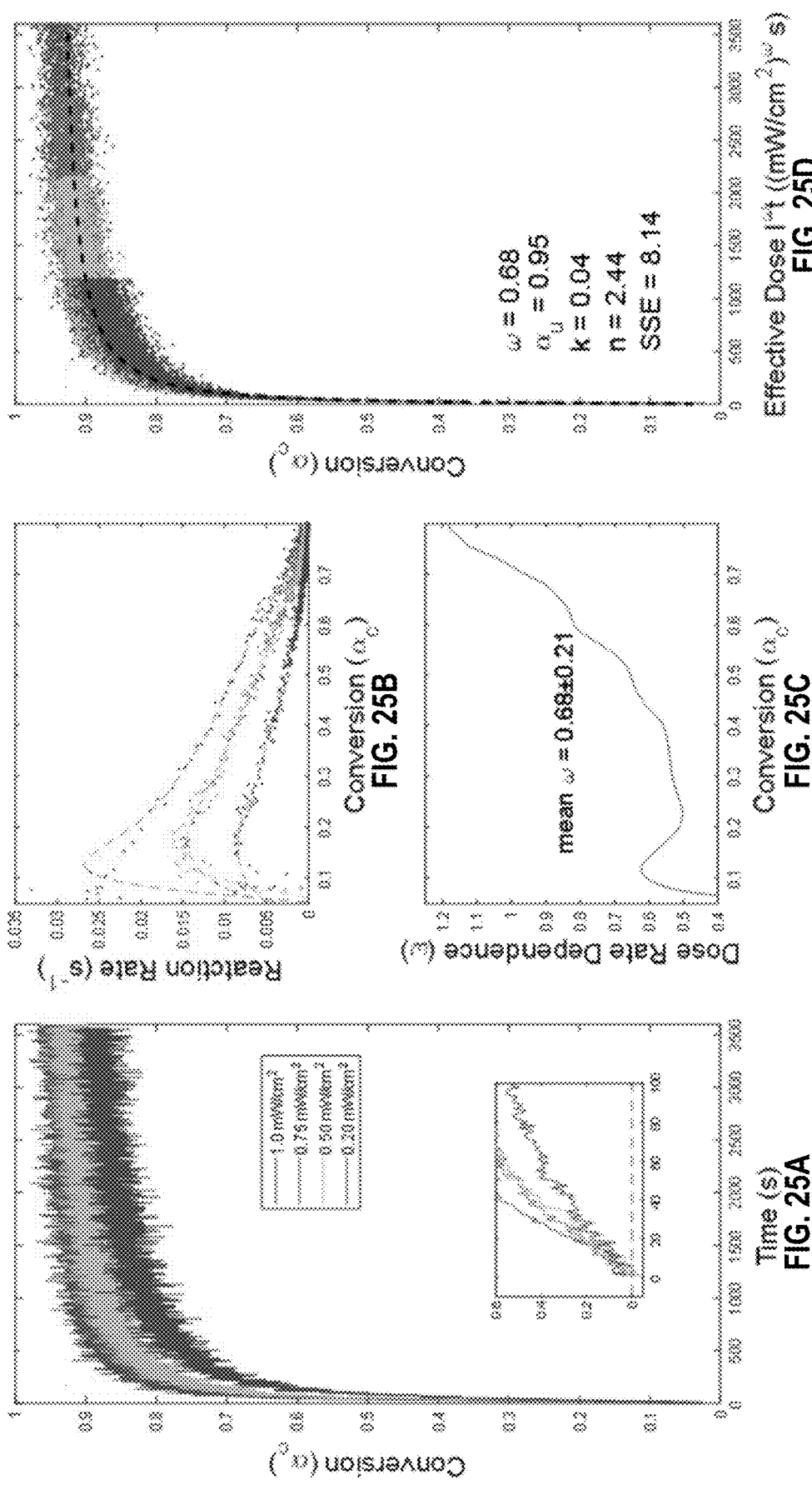

DA-2 Formulation

Bis-GMA: 37.5 wt.%

Bis-EMA: 37.5 wt.%

HDDMA: 25.0 wt.%

TPO

FIG. 34

Phenyl Methacrylate (PM)     Epikure W     TPO

BisGMA

Epon 828

FIG. 42

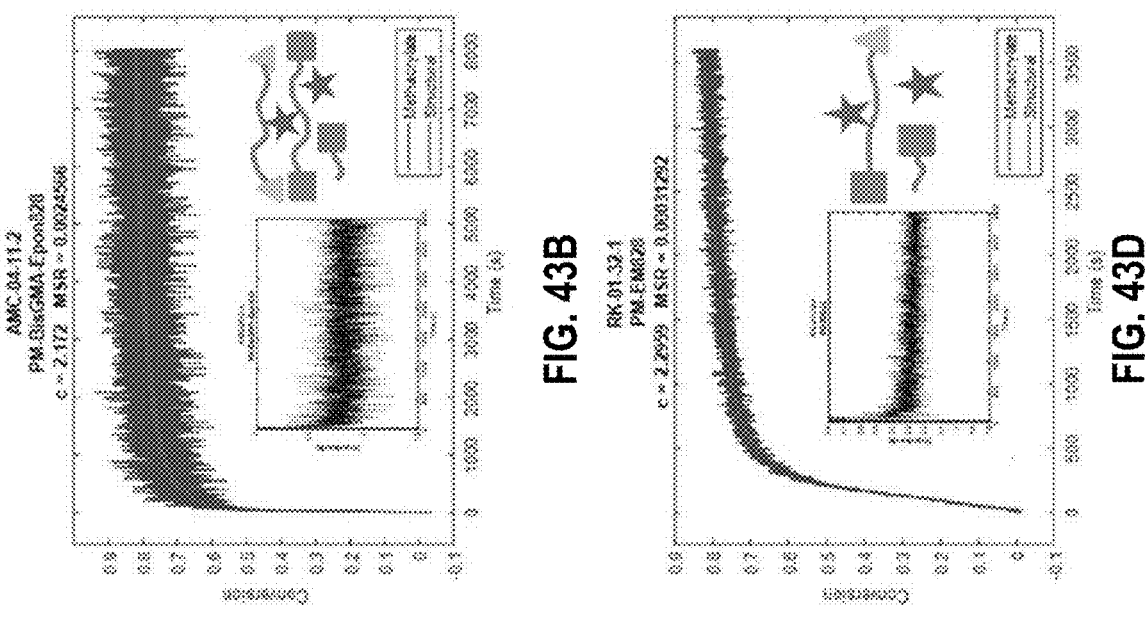
FIG. 43A
FIG. 43B
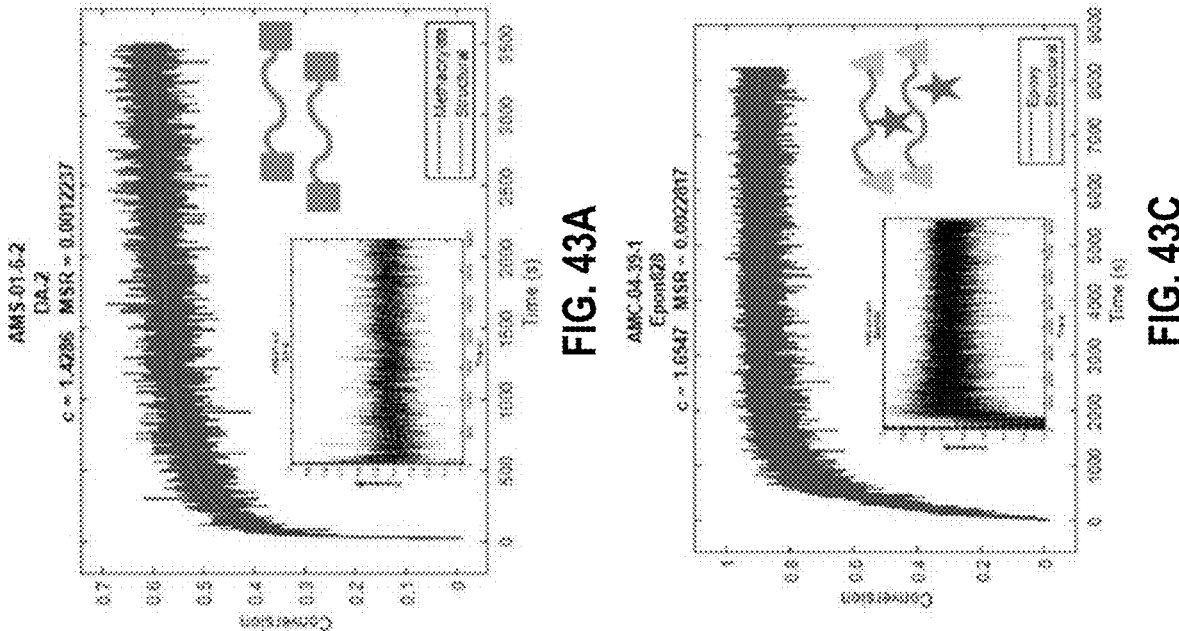
FIG. 43C
FIG. 43D

METHODS OF MONITORING KINETIC PROCESSES IN AMORPHOUS MATERIALS

CROSS-REFERENCE TO RELATED APPLICATIONS

The present application claims priority under 35 U.S.C. § 119 (e) to U.S. Provisional Patent Application No. 63/466,894, filed May 16, 2023, which application is incorporated herein by reference in its entirety.

BACKGROUND

Kinetic processes, such as but not limited to polymerization, gelation, and glass transition, are critical to understanding the structure-property-processing relationships in bulk polymers, films, and fibers. While there are many experimental tools available for monitoring these processes, such as differential scanning calorimetry (DSC), dynamic mechanical analysis (DMA), rheology, and infrared spectroscopy, none of these techniques are well suited for non-contact in situ or micro-scale spatially resolved analysis.

There is a need in the art for methods to monitor certain kinetic processes in amorphous materials. The present disclosure satisfies this unmet need.

SUMMARY

In one aspect, a method of monitoring a kinetic process of an amorphous material includes measuring a disorder band of the amorphous material using Raman spectroscopy, the disorder band including a spectral peak and a shoulder; normalizing the disorder band to the shoulder, generating an integrated value; and analyzing the integrated value to determine a status of the kinetic process of the amorphous material. In some embodiments, the disorder band is a low-frequency disorder band in a terahertz region. In some embodiments, the low-frequency disorder band is measured in a spectrum below 150 cm$^{-1}$. In some embodiments, the shoulder is formed by a van Hove peak. In some embodiments, the spectral peak is formed by at least one of a Boson peak and quasi-elastic Rayleigh scattering (QERS). In some embodiments, the amorphous materials comprises a bulk polymer, film, and/or fiber. In some embodiments, the method is noncontact and chemically agnostic.

In some embodiments, the kinetic process comprises glass transition temperature ($T_g$) kinetics. In some embodiments, the shoulder is formed at between 50 and 100 cm$^{-1}$. In some embodiments, the spectral peak is formed at between 5 and 20 cm$^{-1}$. In some embodiments, the integrated value comprises integrated intensity near the spectral peak. In some embodiments, analyzing the integrated value comprises monitoring the integrated intensity over temperature; and assessing a temperature-dependent status of the $T_g$ kinetics of the amorphous material.

In some embodiments, the kinetic process comprises cure kinetics. In some embodiments, the cure kinetics comprise at least one of polymerization and gelation. In some embodiments, the shoulder is formed at between 50 and 100 cm$^{-1}$. In some embodiments, the spectral peak is formed at between 5 and 20 cm$^{-1}$. In some embodiments, analyzing the integrated value comprises monitoring a decrease in the integrated value over at least one of time and temperature; and assessing at least one of a time-dependent and a temperature-dependent status of the cure kinetic of the amorphous material. In some embodiments, the cure kinetics comprise structural conversion kinetics and chemical conversion kinetics. In some embodiments, the method further includes correlating the structural conversion kinetics to the chemical conversion kinetics.

In some embodiments, the Raman spectroscopy is performed with any Raman spectrometer, such as a double volume-holographic-grating-based fiber optic Raman probe, with an unpolarized laser source and collection optics.

BRIEF DESCRIPTION OF THE DRAWINGS

The following detailed description of exemplary embodiments of the invention will be better understood when read in conjunction with the appended drawings. For the purpose of illustrating the invention, non-limiting embodiments are shown in the drawings. It should be understood, however, that the invention is not limited to the precise arrangements and instrumentalities of the embodiments shown in the drawings.

(FIG. 4A), 60° C. (FIG. 4B), 120° C. (FIG. 4C) and 130° C. (FIG. 4D), according to some embodiments.

FIG. 6 is a illustrative representation of structures of resin formulations, according to some embodiments.

In FIG. 8A and FIG. 8B the blue dots represent measured values and the red line represents the fitted curve. In FIG. 8C the blue line represents the methacrylate chemical conversion, and the red line represents the proportionality corrected structural conversion.

FIGS. 9A-9C are graphical representations depicting EPON 828 resin thermal cure kinetics obtained using the chemical region of the Raman spectrum with inset showing the epoxide (variable) and phenyl (reference) peaks (FIG. 9A), the structural region with inset showing the normalized disorder band (FIG. 9B), and an overlay of the chemical conversion kinetics and the structural kinetics scaled by $c=1.57$ (FIG. 9C) with the inset showing the proportionality across the entire cure, according to some embodiments. In FIG. 9A and FIG. 9B, the blue dots represent measured values and the red line represents the fitted curve. In FIG. 9C the blue line represents the methacrylate chemical conversion, and the red line represents the proportionality corrected structural conversion.

FIGS. 10A-10D are graphical representations depicting intensity corrected Raman spectra (blue) fitted to the total intensity (red) as well as the associated QERS (yellow), Boson peak (purple), and normal mode (green) contributions for DA-2 pre cure (FIG. 10A) and post cure (FIG. 10B) and EPON 828 pre cure (FIG. 10C) and post cure (FIG. 10D), according to some embodiments.

In FIGS. 11A-11C, the blue dots represent measured values and the red line represents the fitted curve. In FIG. 11D, the blue line represents the methacrylate chemical conversion, and the red line represents the proportionality corrected structural conversion.

In FIGS. 13A-13C, the blue dots represent measured values and the red line represents the fitted curve. In FIG. 13D, the blue line represents the methacrylate chemical conversion, and the red line represents the proportionality corrected structural conversion.

FIG. 14 is an illustrative representation of components of phenolic, butadiene, and epoxy (PBE) resin formulation, according to some embodiments.

FIGS. 15A-15D are graphical illustrations of PBE-unfilled chemical (FIG. 15A) and structural (FIG. 15B) conversion kinetics, and PBE-filled chemical (FIG. 15C) and structural conversion kinetics (FIG. 15D) in which, insets demonstrate the first 100 seconds of cure, according to some embodiments.

FIGS. 16A-16D are graphical representations depicting structural conversion kinetics as for PBE-unfilled (FIG. 16A) and PBE-filled (FIG. 16B) during the first 100 seconds of cure, and storage modulus G' for PBE-unfilled (FIG. 16C)

and PBE-filled (FIG. 16D) during the first 100 seconds of cure, according to some embodiments.

FIGS. 17A-17D are graphical representations illustrating master cure kinetics curves for PBE-unfilled chemical (FIG. 17A), PBE-unfilled structural (FIG. 17B), PBE-filled chemical (FIG. 17C), and PBE-filled structural conversions with fit parameters and sum square error (SSE) with the dashed black line indicating model fit (FIG. 17D), according to some embodiments. Dot color indicates illumination intensity—1.0 mw/cm$^2$ blue, 0.75 mw/cm$^2$ orange, 0.50 mw/cm$^2$ yellow, and 0.20 mw/cm$^2$ purple.

FIGS. 18A-18D are graphical representations depicting storage modulus G' vs conversion α curves for PBE-unfilled chemical (FIG. 18A), PBE-unfilled structural (FIG. 18B), PBE-filled chemical (FIG. 18C), and PBE-filled structural conversions with fit parameters and SSE with the dashed black line indicating model fit (FIG. 18D), according to some embodiments. Dot color indicates illumination intensity—1.0 mw/cm$^2$ blue, 0.75 mw/cm$^2$ orange, 0.50 mw/cm$^2$ yellow, and 0.20 mw/cm$^2$ purple.

Figure 19B:
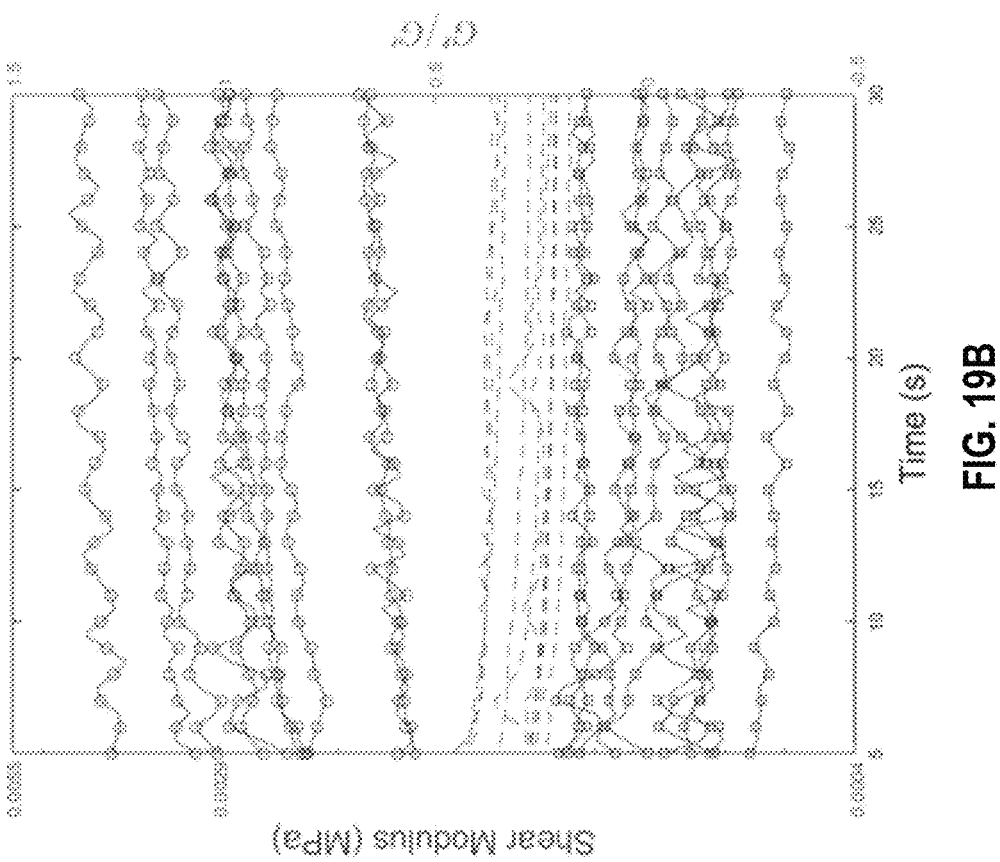
Figure 19A:
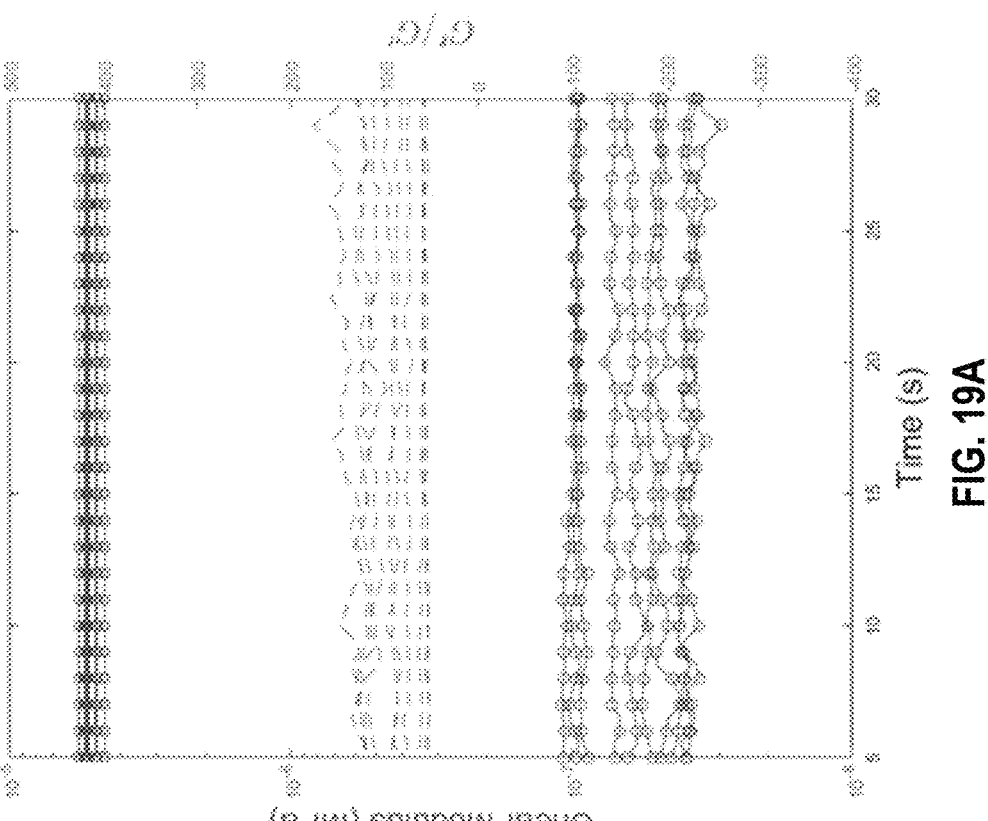

FIGS. 19A-19B are graphical representations depicting storage modulus G' (blue circles), loss modulus G" (blue squares), and G"/G' (orange dashes) for ten different measurements of PBE-unfilled (FIG. 19A) and PBE-filled (FIG. 19B), according to some embodiments.

Figure 20:
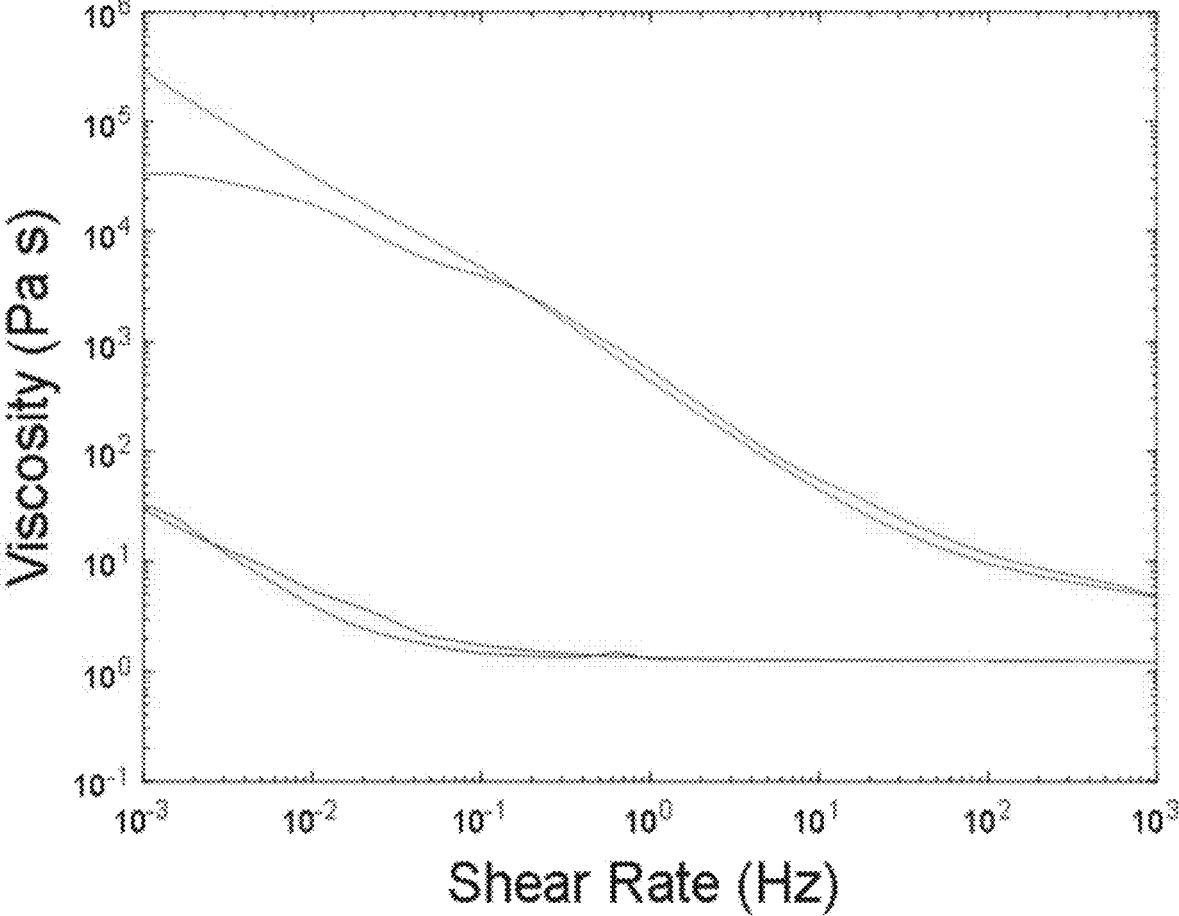

FIG. 20 is a graphical representation illustrating viscosity as a function of shear rate ramped from 0.001 Hz to 1000 Hz and then back to 0.001 Hz at 25° C. for PBE-unfilled (blue) and PBE-filled (orange), according to some embodiments.

Figures 21A, 21B:
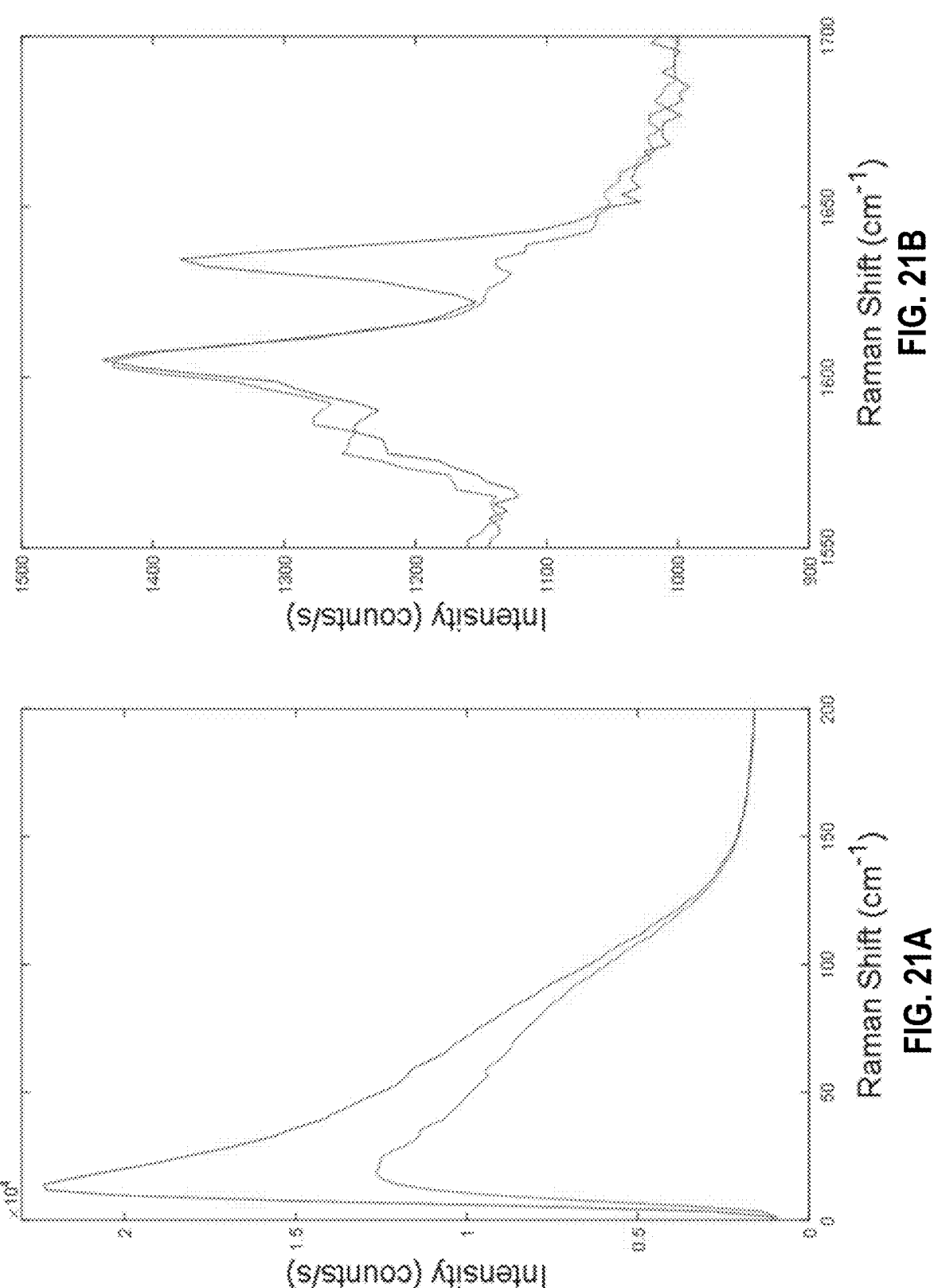
Figures 23A, 23B, 23C, 23D:
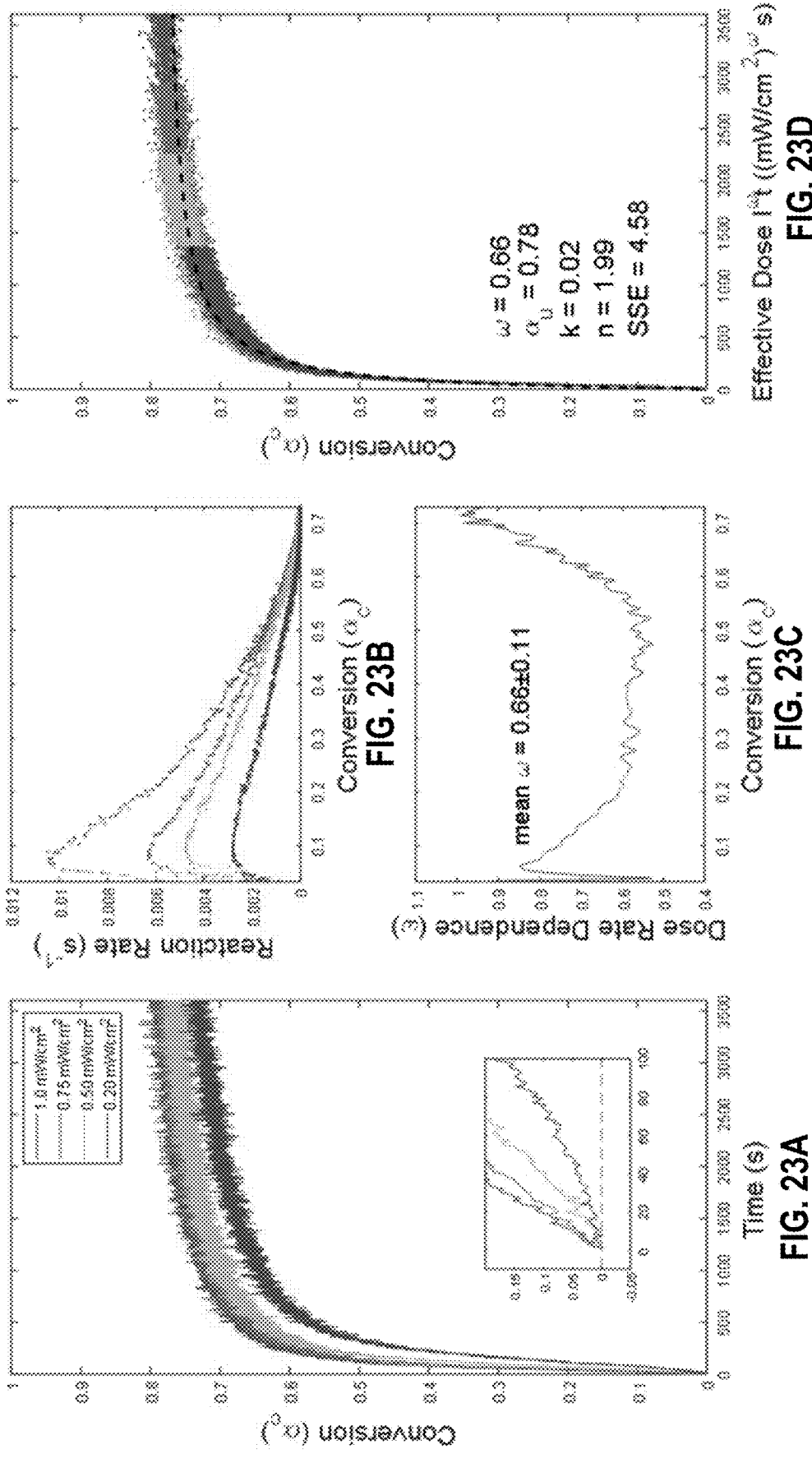
Figures 24A, 24B, 24C, 24D:
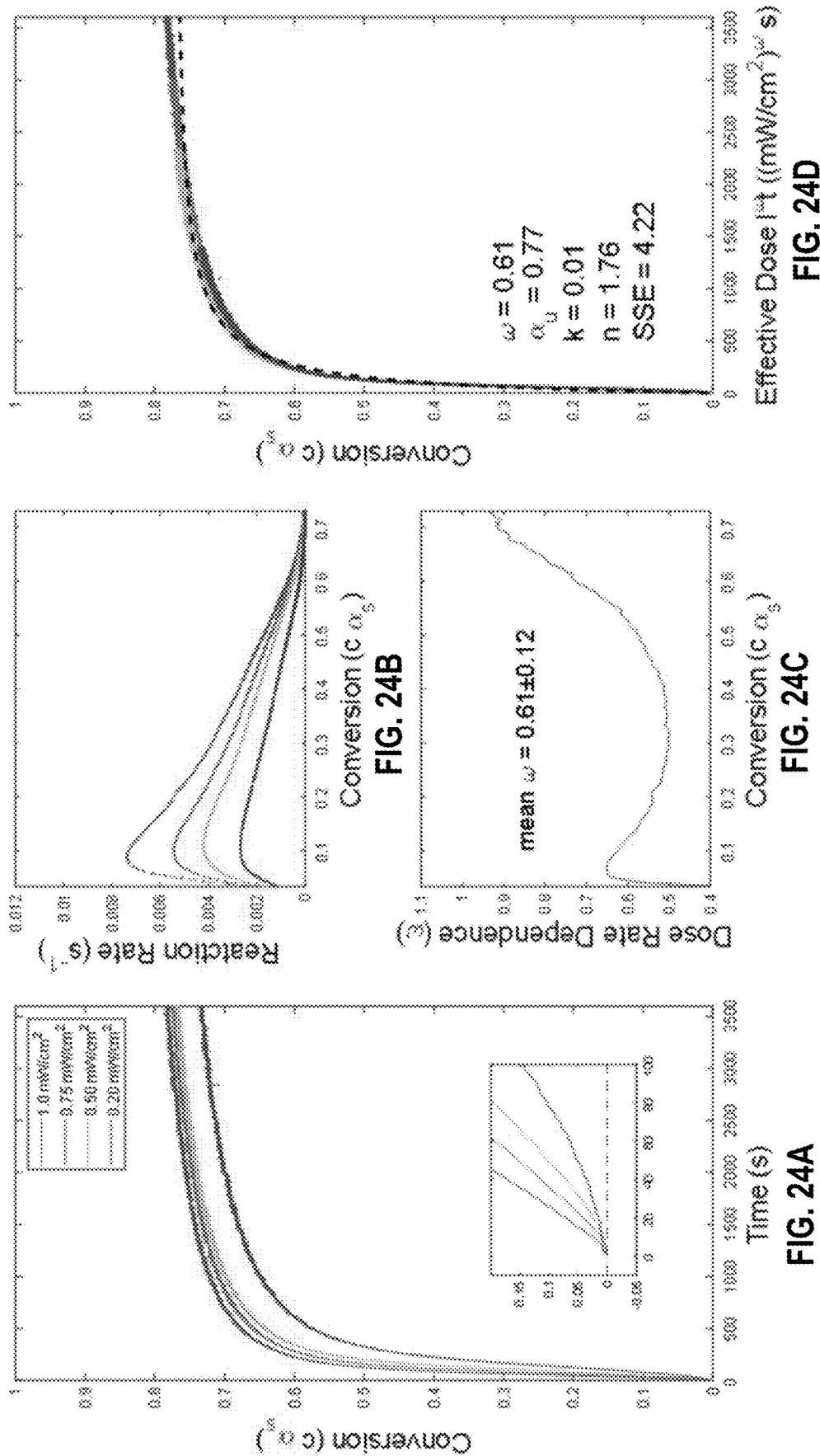
Figures 26A, 26B, 26C, 26D:
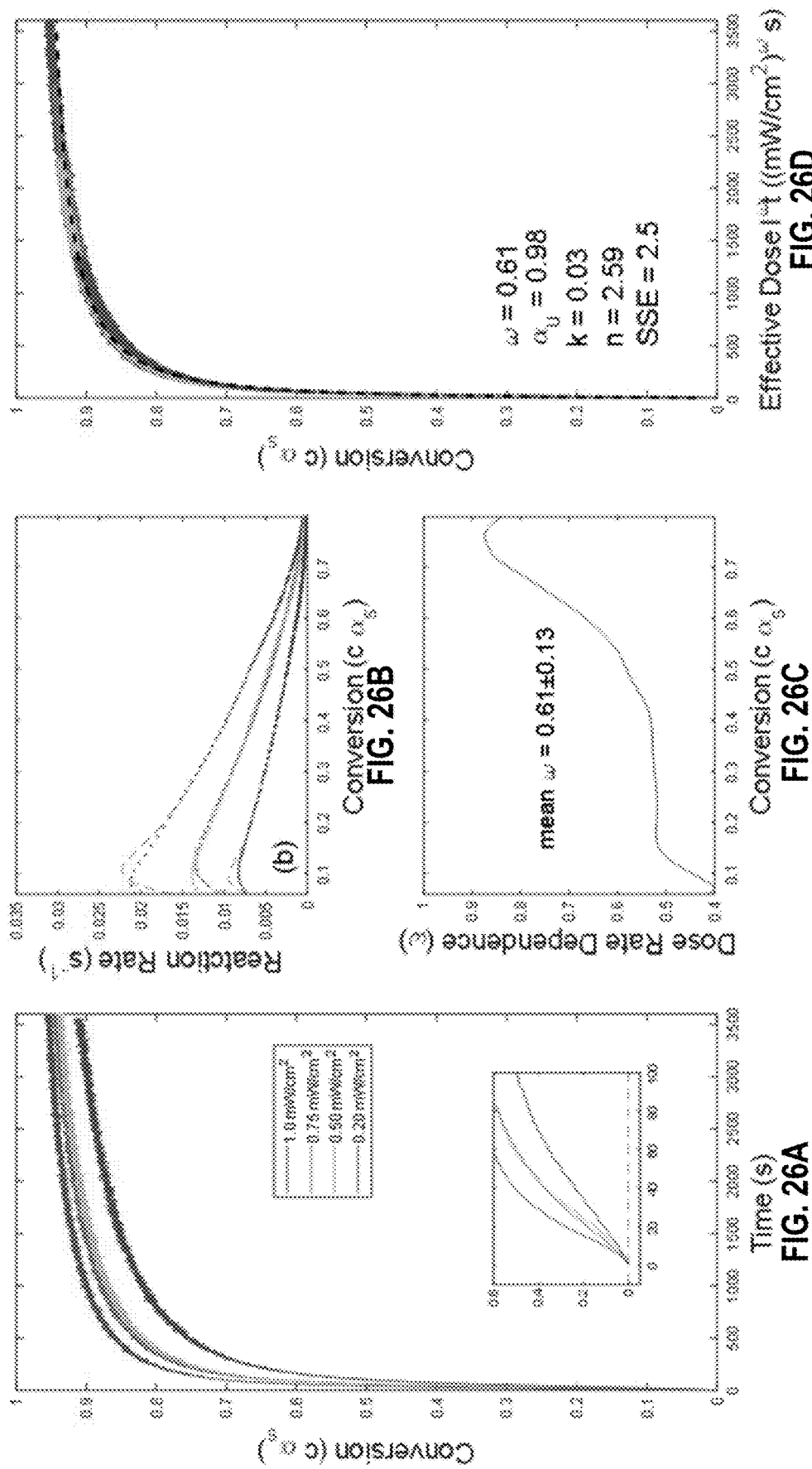
Figures 27A, 27B, 27C, 27D:
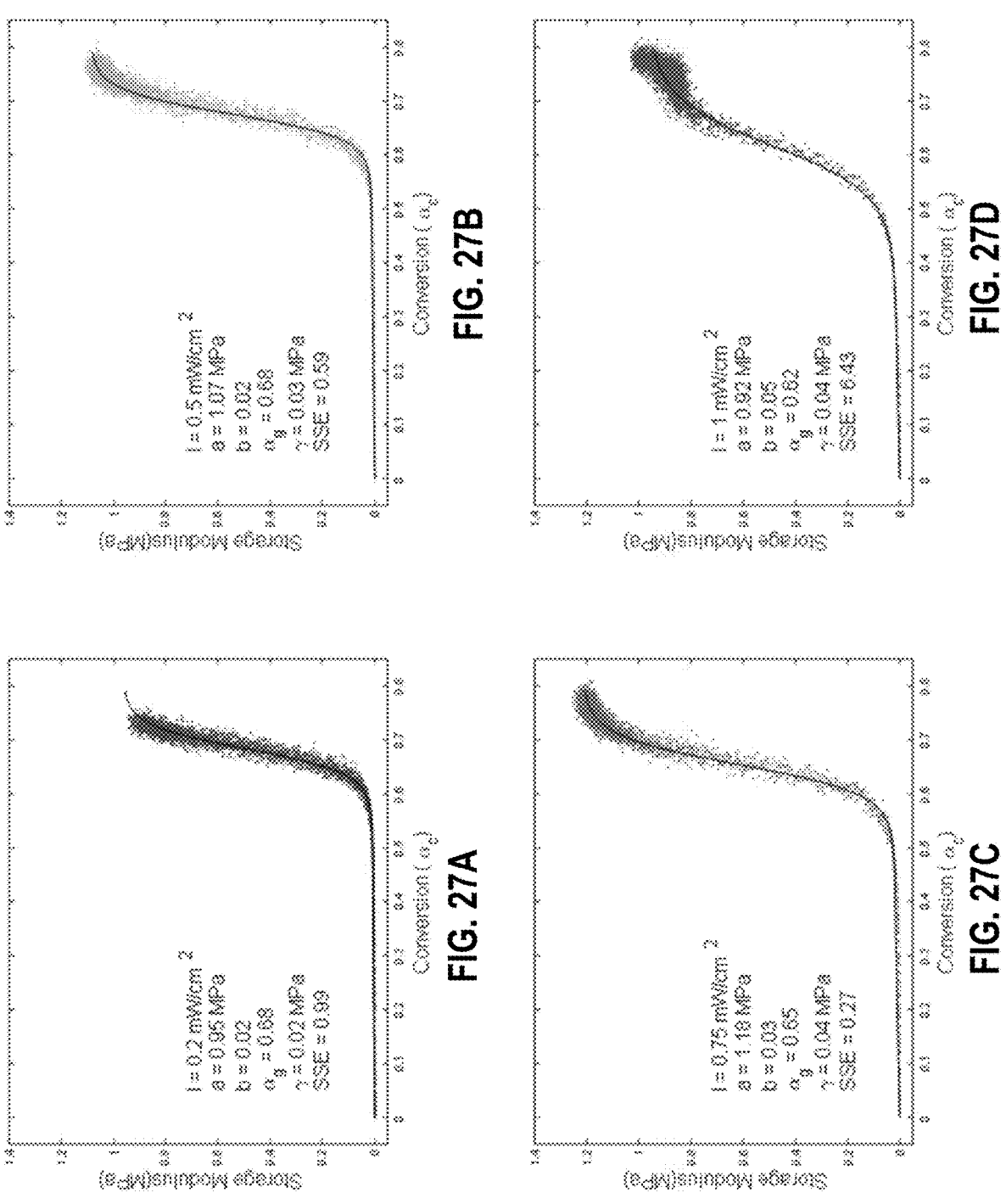
Figures 28A, 28B, 28C, 28D:
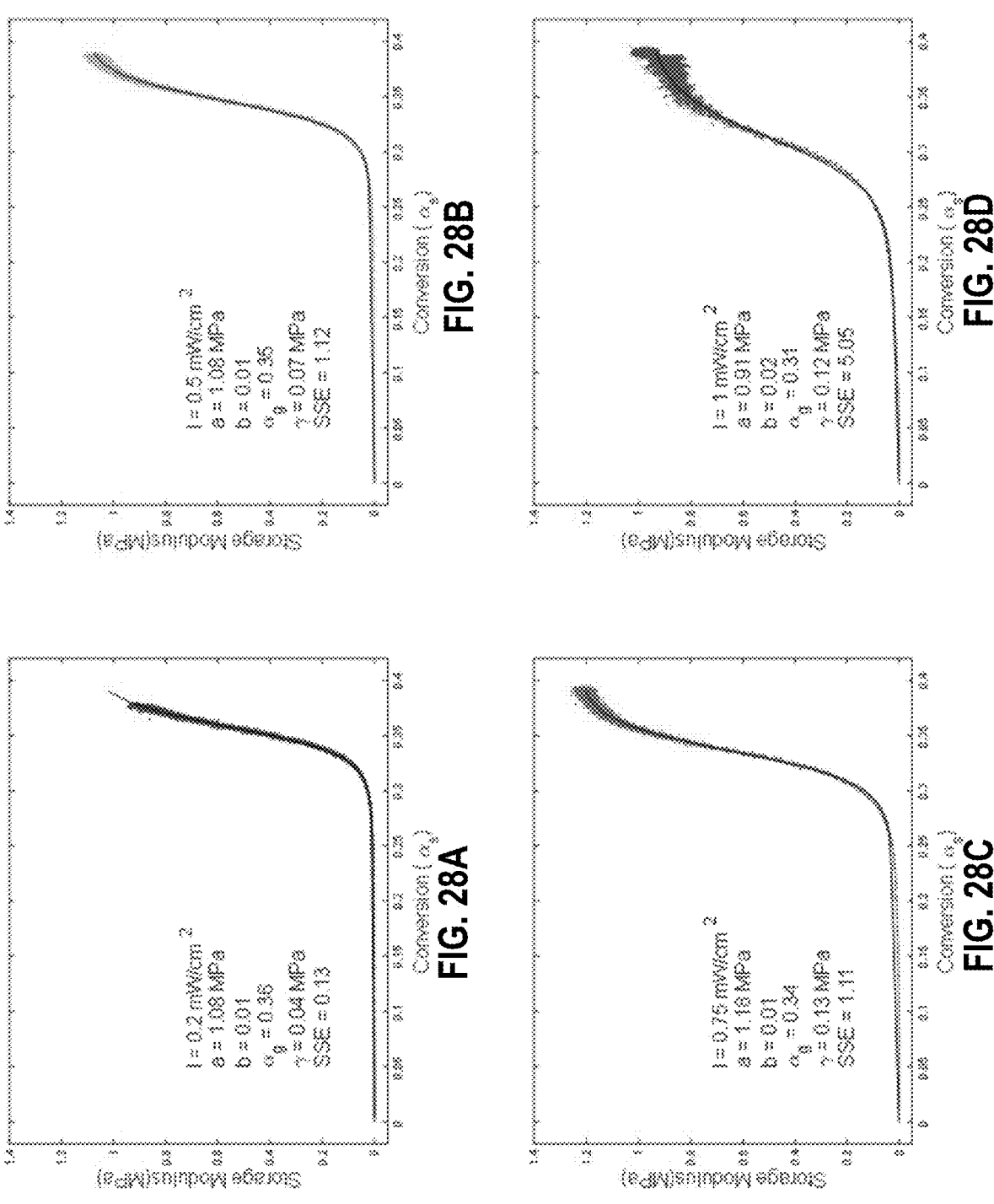
Figures 29A, 29B, 29C, 29D:
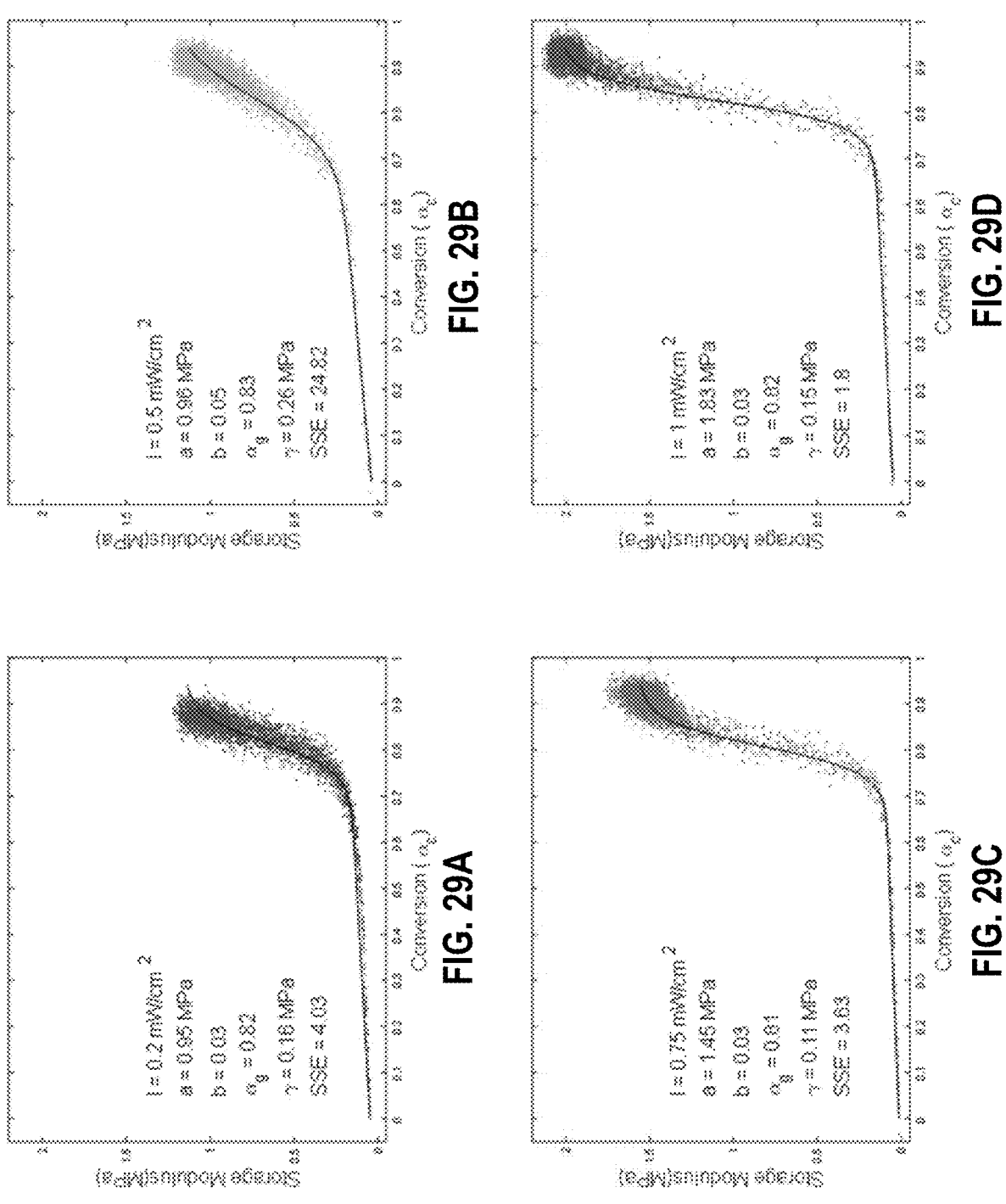
Figures 30A, 30B, 30C, 30D:
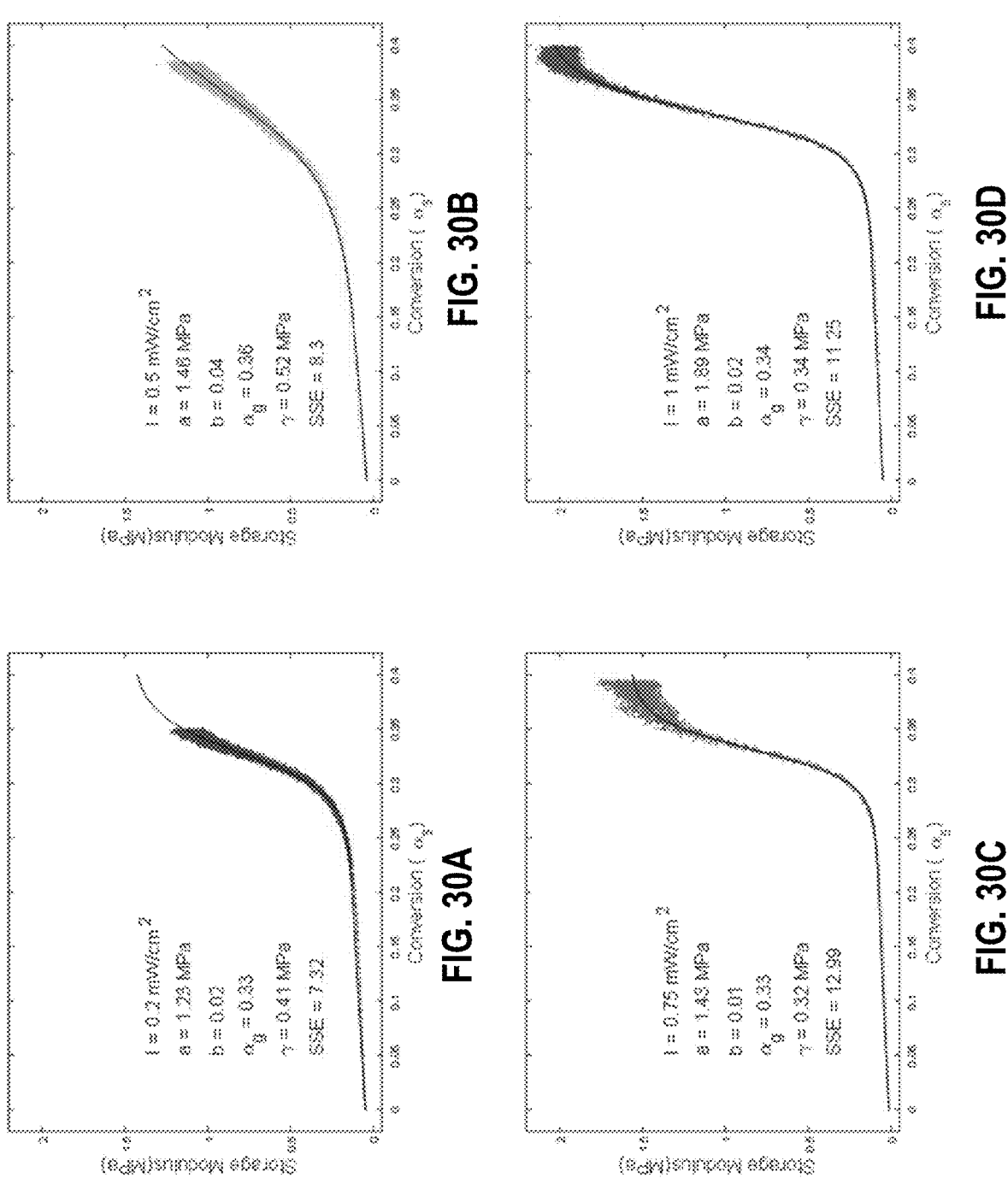

FIGS. 21A-21B are graphical representations depicting representative Raman spectra of PBE-unfilled pre (blue) and post (orange) UV cure, with showing the low-frequency structural region (FIG. 21A) and showing the chemical fingerprint region (FIG. 21B), according to some embodiments.

FIGS. 22A-22H are example graphical representations depicting storage modulus G' (blue), loss modulus G" (orange) for PBE-unfilled at 1.00 mW/cm$^2$ (FIG. 22A), 0.75 mW/cm$^2$ (FIG. 22B), 0.50 mW/cm$^2$ (FIG. 22C), and 0.20 mW/cm$^2$ (FIG. 22D), and PBE-filled at 1.00 mW/cm$^2$ (FIG. 22E), 0.75 mW/cm$^2$ (FIG. 22F), 0.50 mW/cm$^2$ (FIG. 22G), and 0.20 mW/cm$^2$ (FIG. 22H), according to some embodiments.

FIGS. 23A-23D are example graphical representations depicting PBE-unfilled $\alpha_c$ shifted to remove inhibition time with inset showing the first 100 s of the reaction (FIG. 23A), $R_p$ as a function of $\alpha_c$ (FIG. 23B), calculated ω as a function of $\alpha_c$ (FIG. 23C), and master curve with fit parameters and SSE with the dashed black line indicating model fit (FIG. 23D), according to some embodiments.

FIGS. 24A-24D are example graphical representations depicting PBE-unfilled c $\alpha_s$ shifted to remove inhibition time with inset showing the first 100 seconds of the reaction (FIG. 24A), $R_p$ as a function of $\alpha_s$ (FIG. 24B), calculated ω as a function of $\alpha_s$ (FIG. 24C), and master curve with fit parameters and SSE with the dashed black line indicating model fit (FIG. 24D), according to some embodiments.

FIGS. 25A-25D are example graphical representations depicting PBE-filled $\alpha_c$ shifted to remove inhibition time with inset showing the first 100 s of the reaction (FIG. 25A), $R_p$ as a function of $\alpha_c$ (FIG. 25B), calculated ω as a function of $\alpha_c$ (FIG. 25C), and master curve with fit parameters and sum square error SSE with the dashed black line indicating model fit (FIG. 25D), according to some embodiments.

FIGS. 26A-26D are example graphical representations depicting PBE-filled c $\alpha_s$ shifted to remove inhibition time with inset showing the first 100 seconds of the reaction (FIG. 26A), $R_p$ as a function of $\alpha_s$ (FIG. 26B), calculated $\omega$ as a function of $\alpha_s$ (FIG. 26C), and master curve with fit parameters and SSE with the dashed black line indicating model fit (FIG. 26D), according to some embodiments.

FIGS. 27A-27D are example graphical representations depicting storage modulus G' vs chemical conversion $\alpha_c$ for PBE-unfilled at 0.2 mW/cm$^2$ (FIG. 27A), 0.5 mW/cm$^2$ (FIG. 27B), 0.75 mW/cm$^2$ (FIG. 27C), and 1 mW/cm$^2$ (FIG. 27D) illumination intensities, according to some embodiments. Solid black line indicates model fit.

FIGS. 28A-28D are example graphical representations depicting storage modulus G' vs chemical structural $\alpha_s$ for PBE-unfilled at 0.2 mW/cm$^2$ (FIG. 28A), 0.5 mW/cm$^2$ (FIG. 28B), 0.75 mW/cm$^2$ (FIG. 28C), and 1 mW/cm$^2$ (FIG. 28D) illumination intensities, according to some embodiments. Solid black line indicates model fit.

FIGS. 29A-29D are example graphical representations depicting storage modulus G' vs chemical structural $\alpha_s$ for PBE-unfilled at 0.2 mW/cm$^2$ (FIG. 29A), 0.5 mW/cm$^2$ (FIG. 29B), 0.75 mW/cm$^2$ (FIG. 29C), and 1 mW/cm$^2$ (FIG. 29D) illumination intensities, according to some embodiments. Solid black line indicates model fit.

FIGS. 30A-30D are example graphical representations depicting storage modulus G' vs chemical structural $\alpha_s$ for PBE-unfilled at 0.2 mW/cm$^2$ (FIG. 31A), 0.5 mW/cm$^2$ (FIG. 30B), 0.75 mW/cm$^2$ (FIG. 30C), and 1 mW/cm$^2$ (FIG. 0D) illumination intensities, according to some embodiments. Solid black line indicates model fit.

Figure 31B:
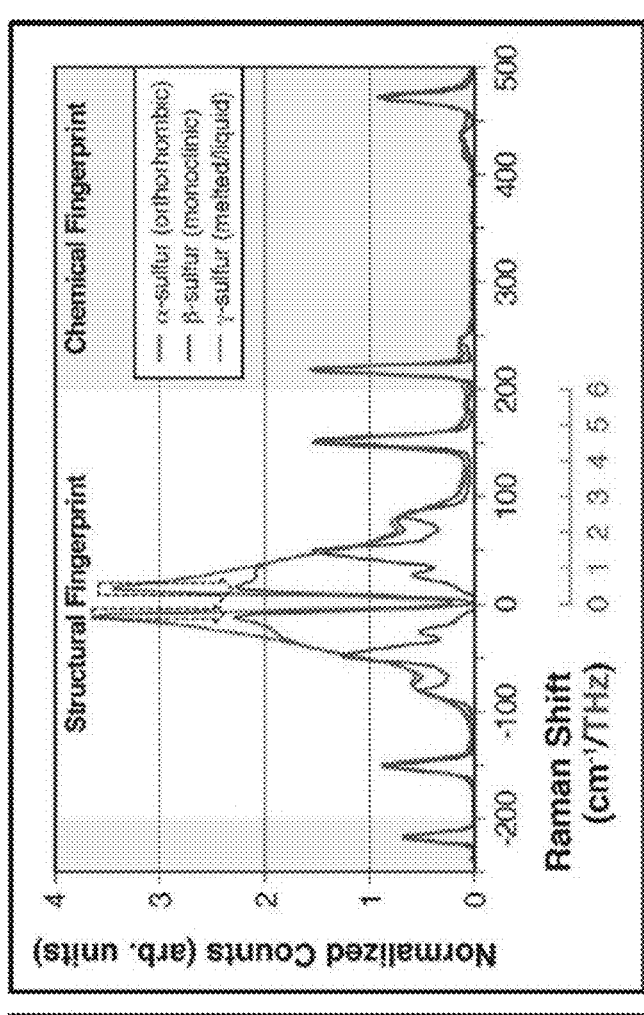
Figure 31A:
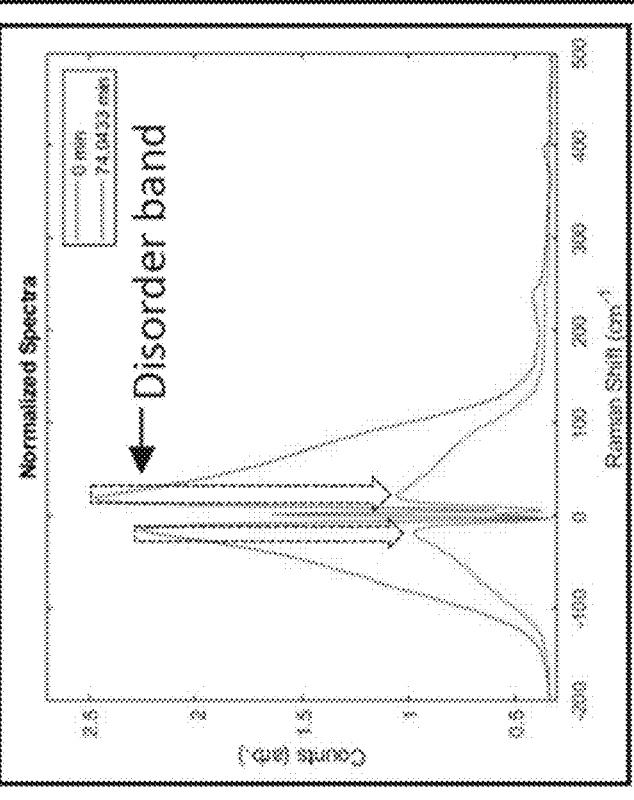

FIGS. 31A-31B shows graphs illustrating that intensity of the disorder band is directly proportional to the entropy of the material.

Figure 32:
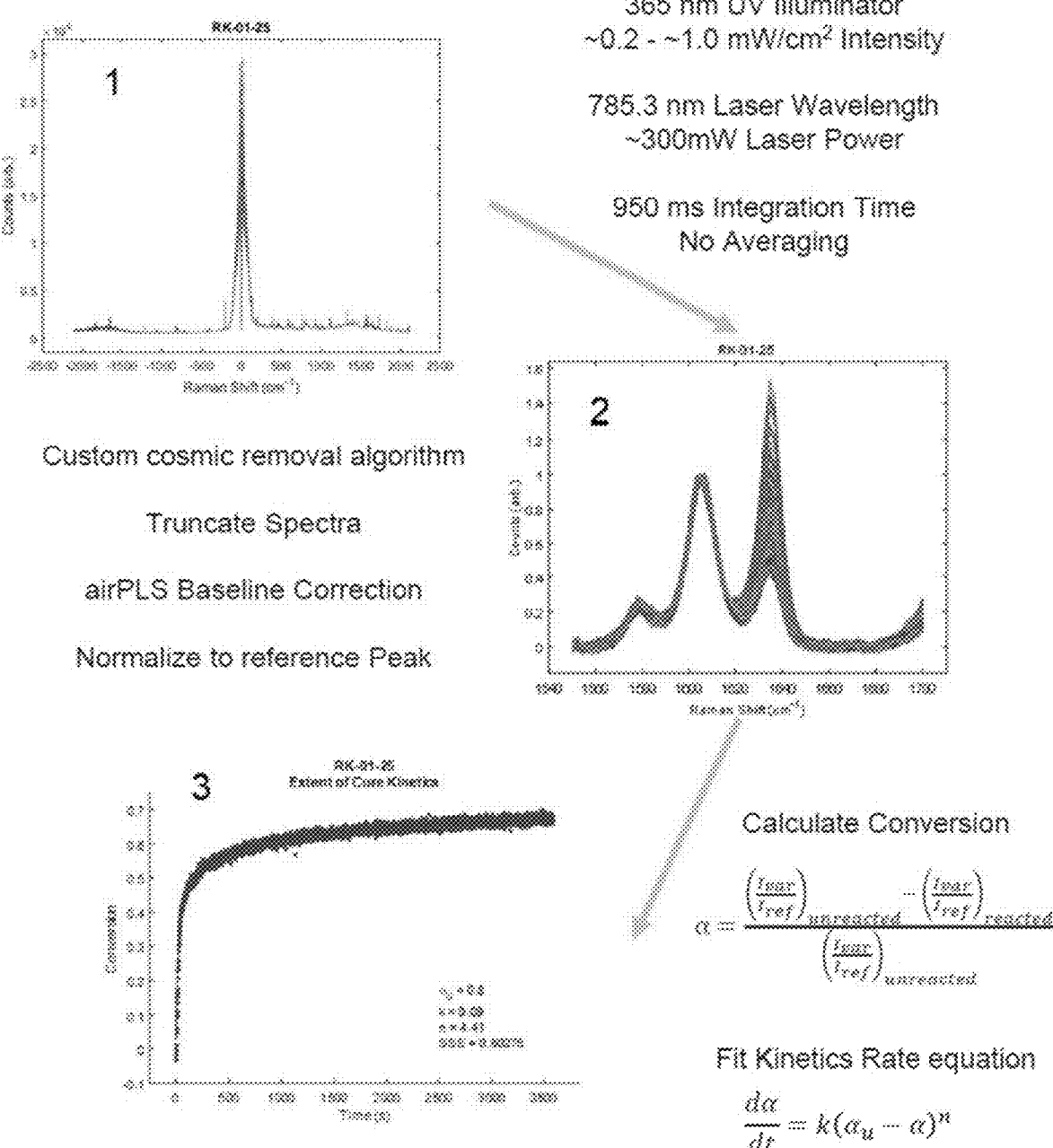

FIG. 32 shows a schematic illustrating cure kinetics workflow according to an embodiment of the disclosure.

Figure 33B:
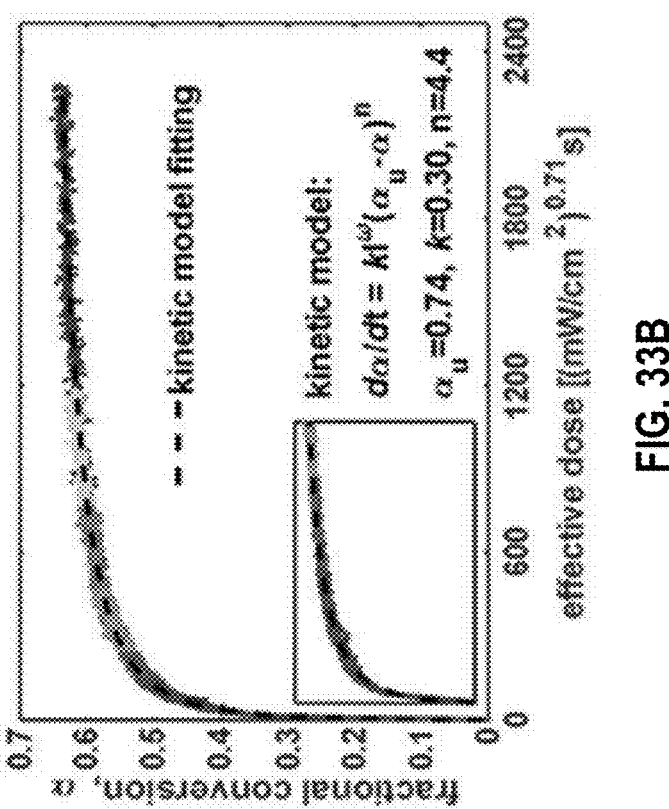
Figure 33A:
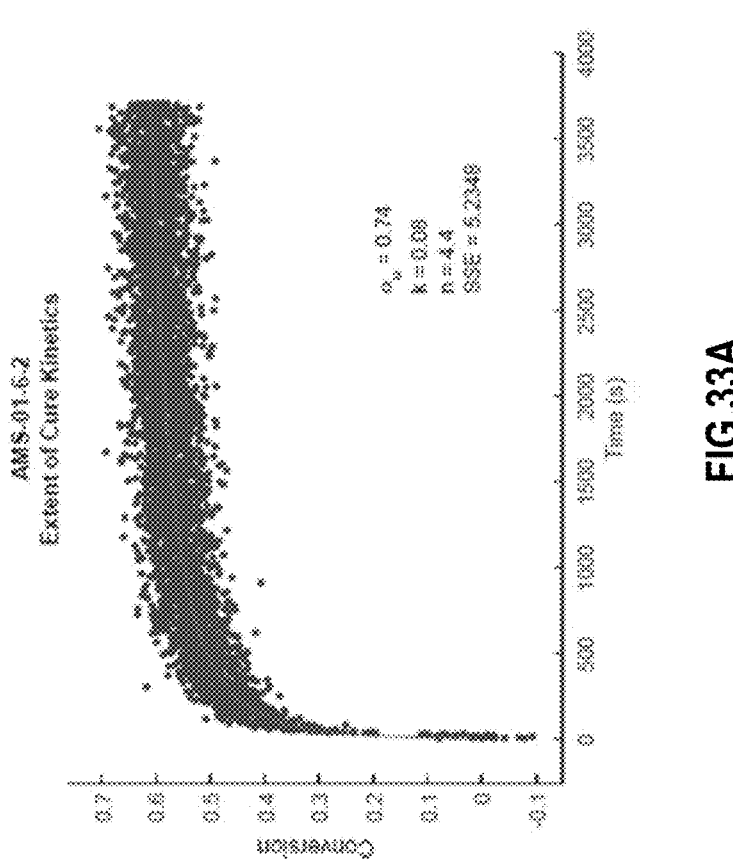

FIGS. 33A-33B show graphs illustrating DA-2 chemical cure kinetics in (A) Raman and (B) ATR.

Figure 34:
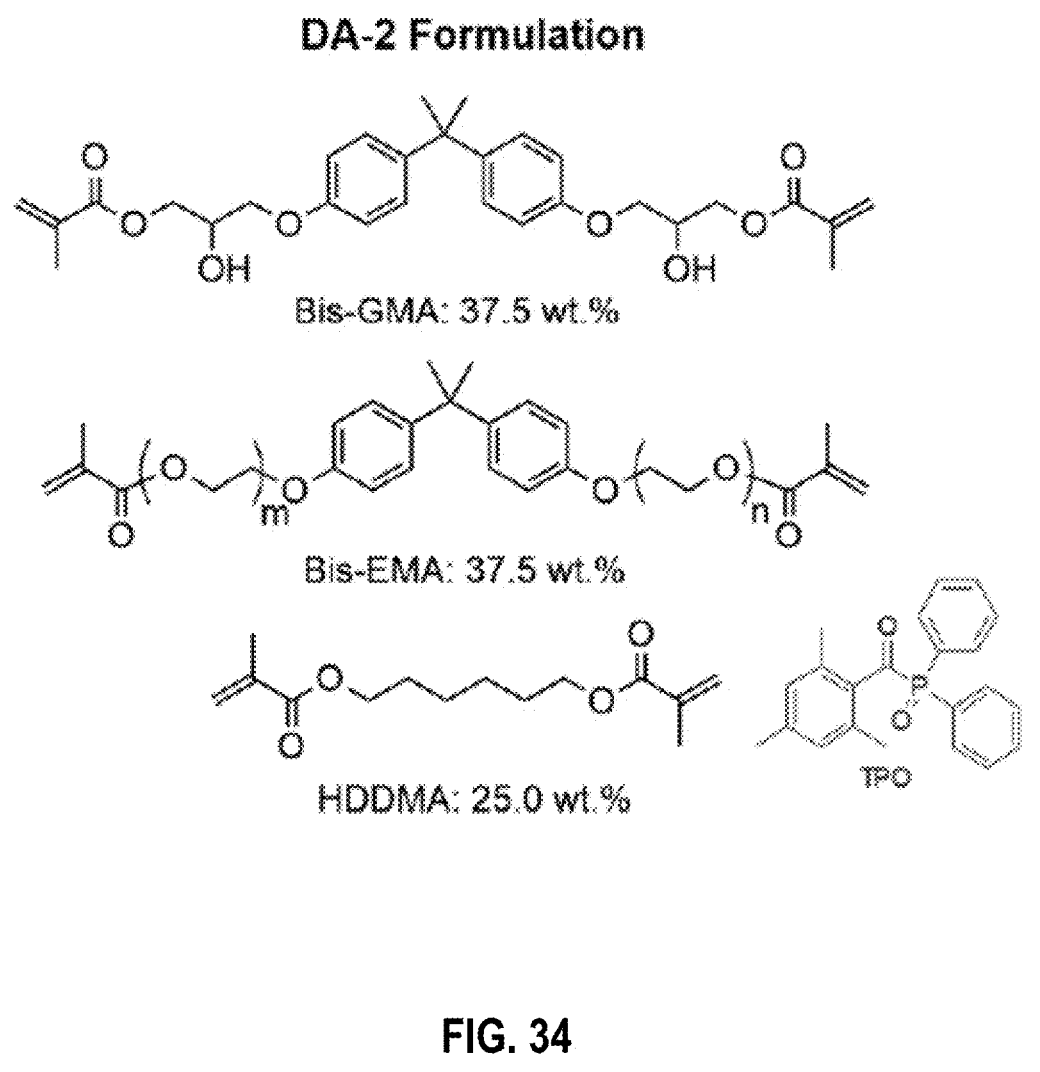

FIG. 34 shows DA-2 formulation.

Figure 35A:
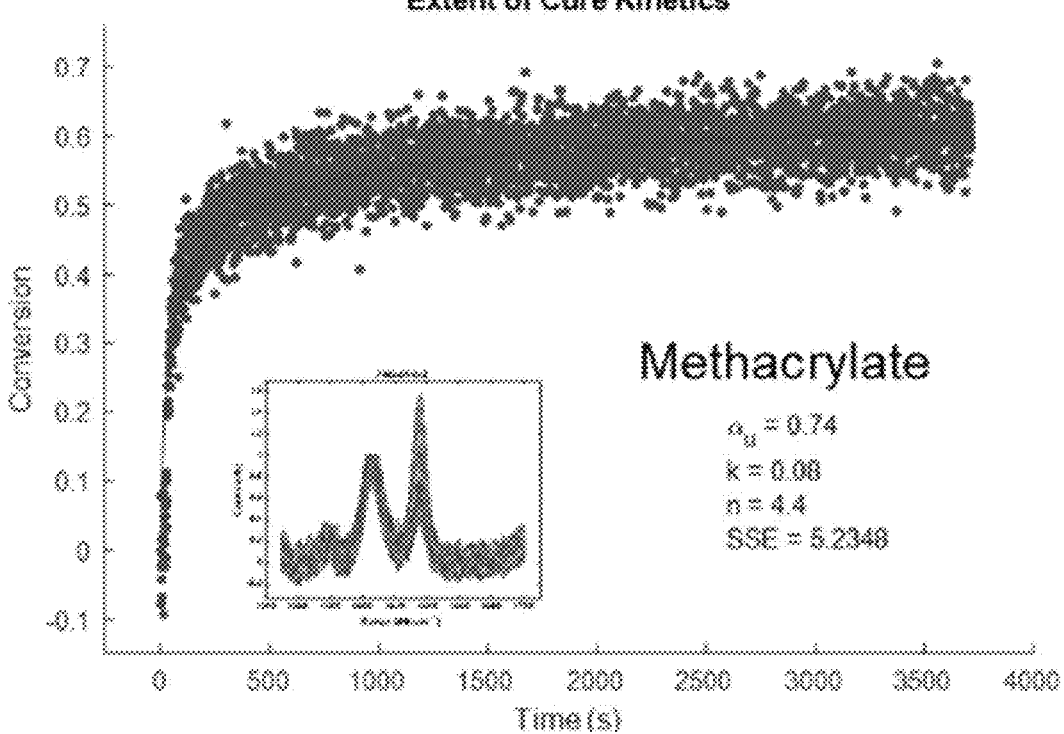
Figure 35B:
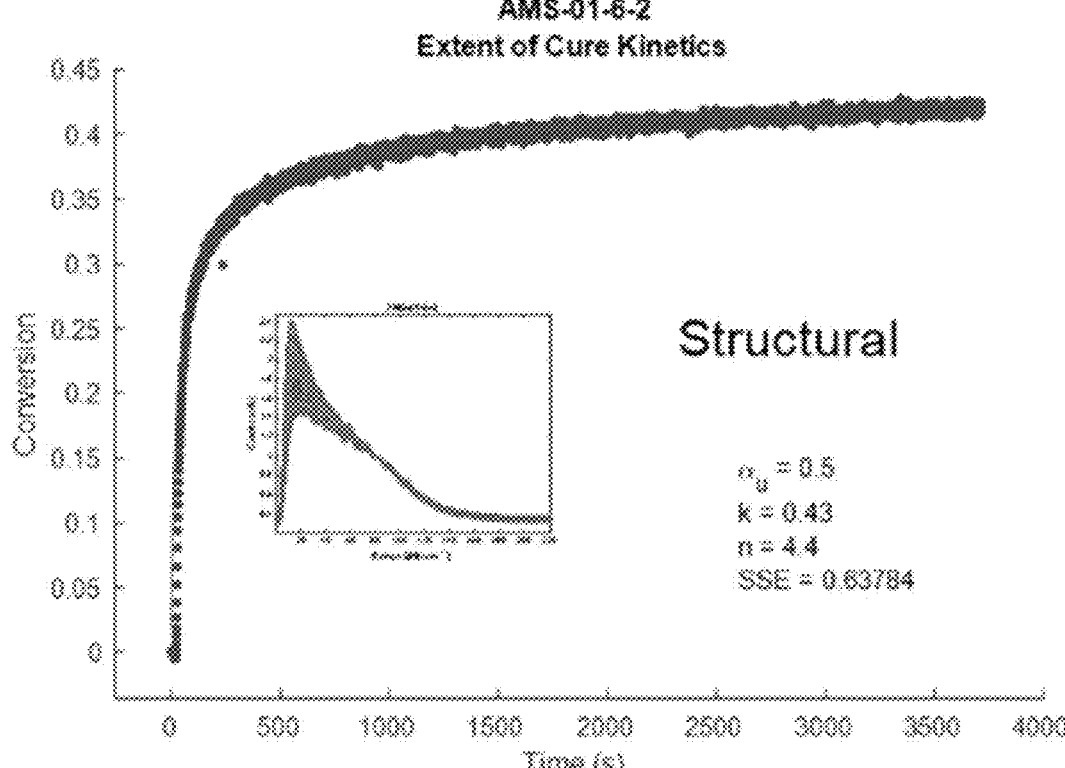

FIGS. 35A-35B show graphs illustrating DA-2 (A) chemical and (B) structural cure kinetics.

Figure 36B:
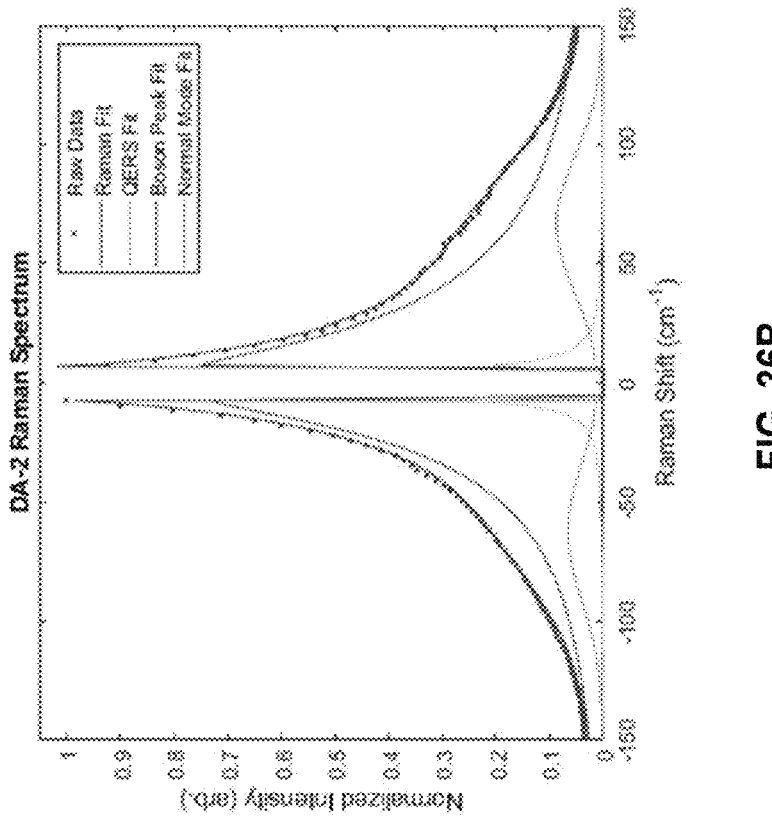
Figure 36A:
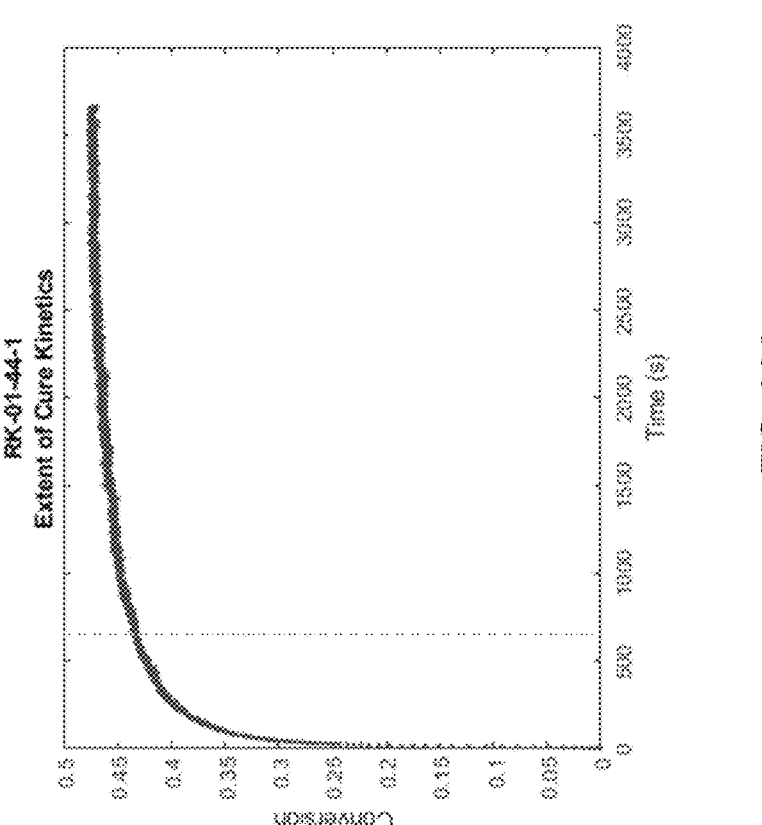

FIGS. 36A-36B show graphs illustrating DA-2 structural kinetics modeling and fitting.

Figure 37A:
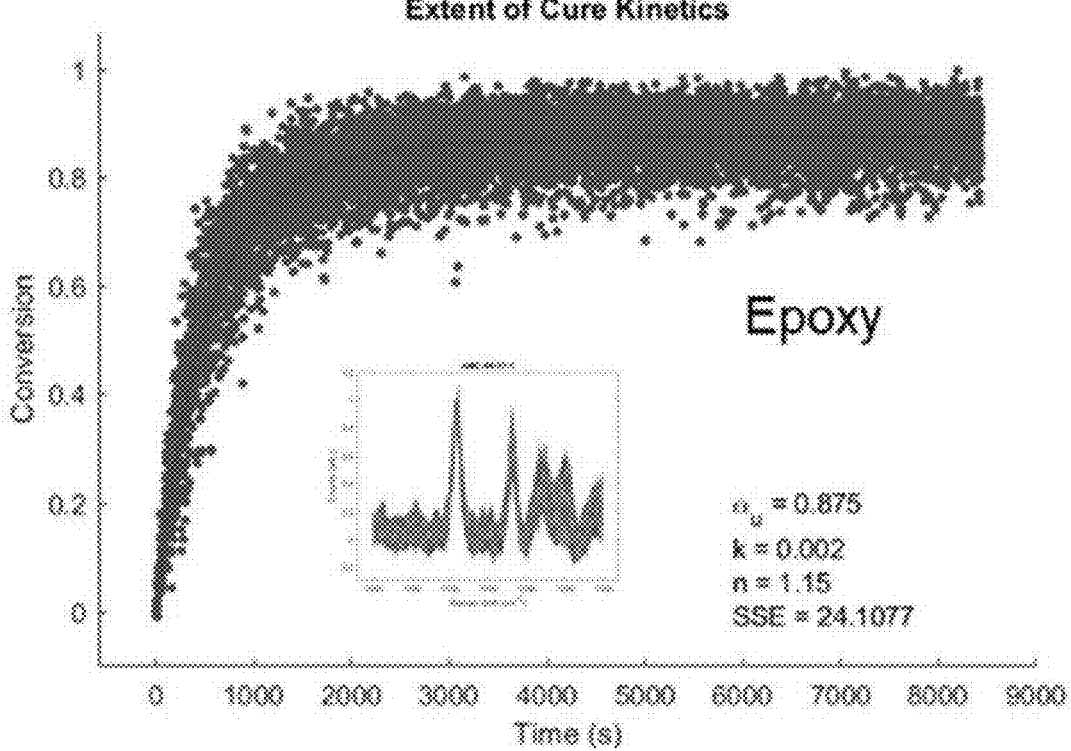
Figure 37B:
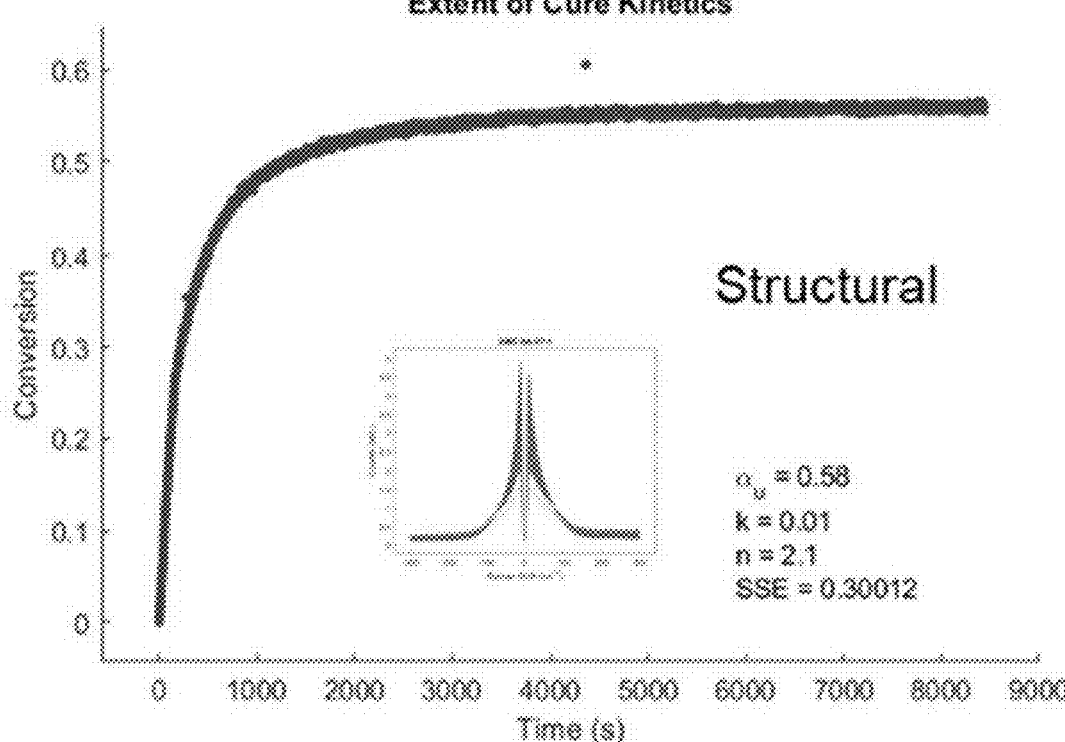

FIGS. 37A-37B show graphs illustrating Epon828 (A) chemical and (B) structural cure kinetics.

Figure 38:
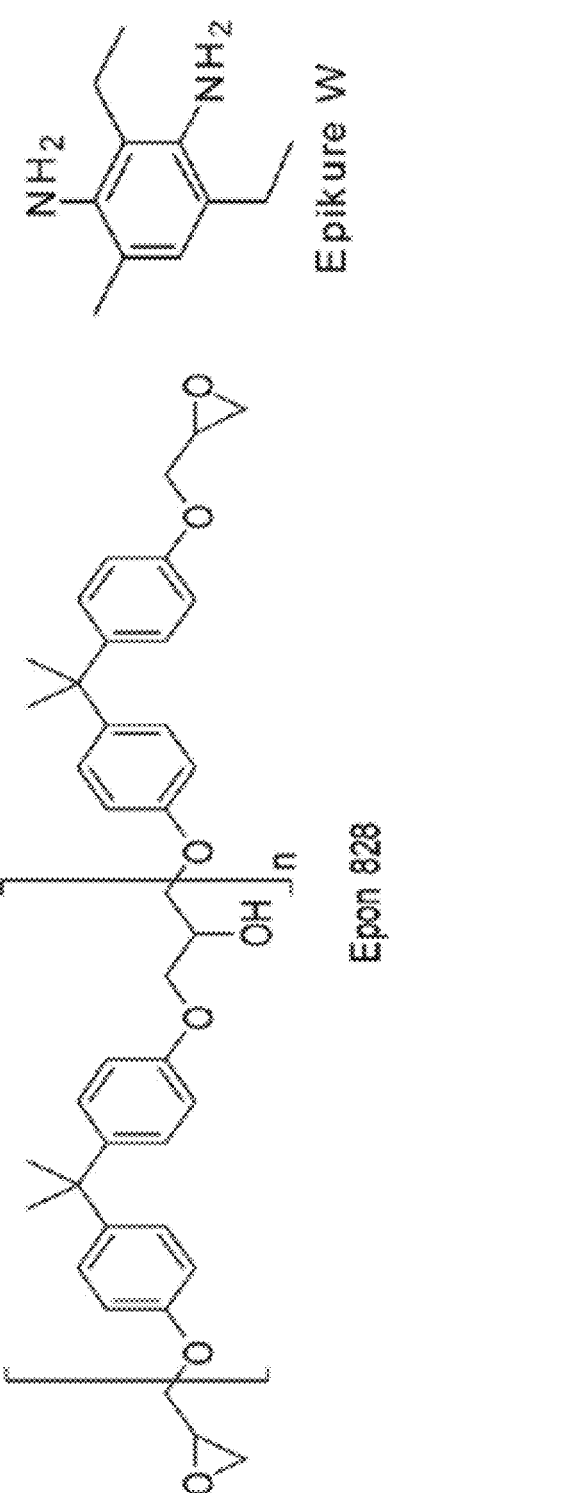

FIG. 38 shows the structure of Epon828.

Figure 39A:
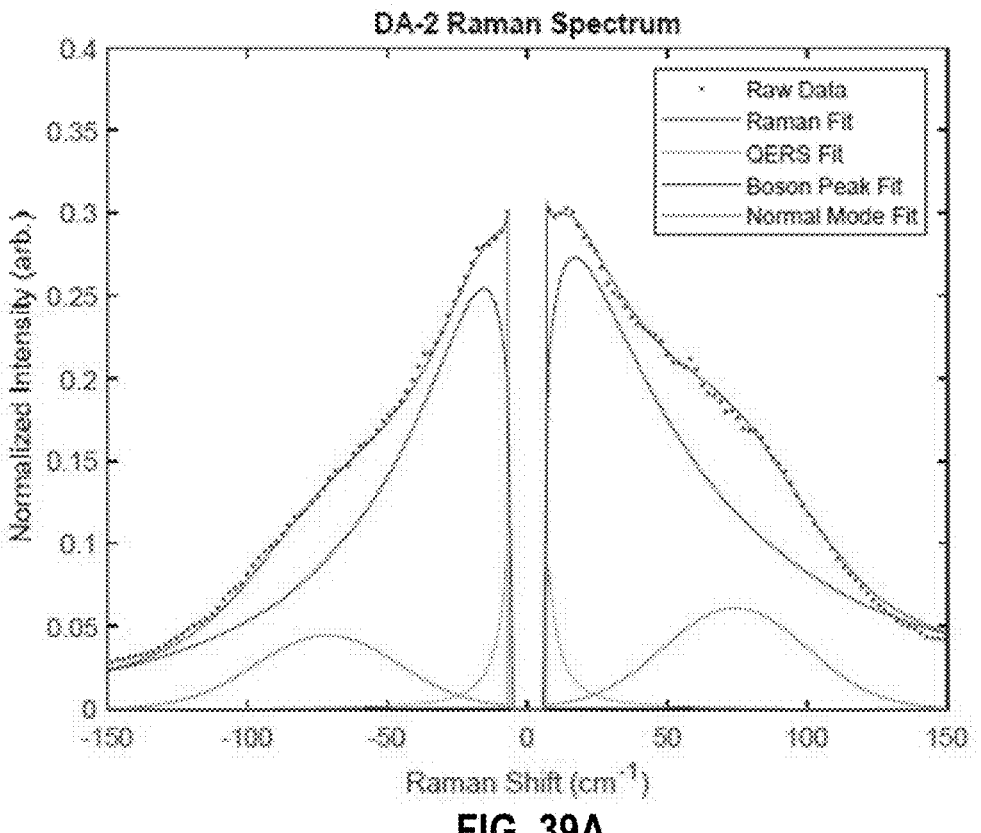
Figure 39B:
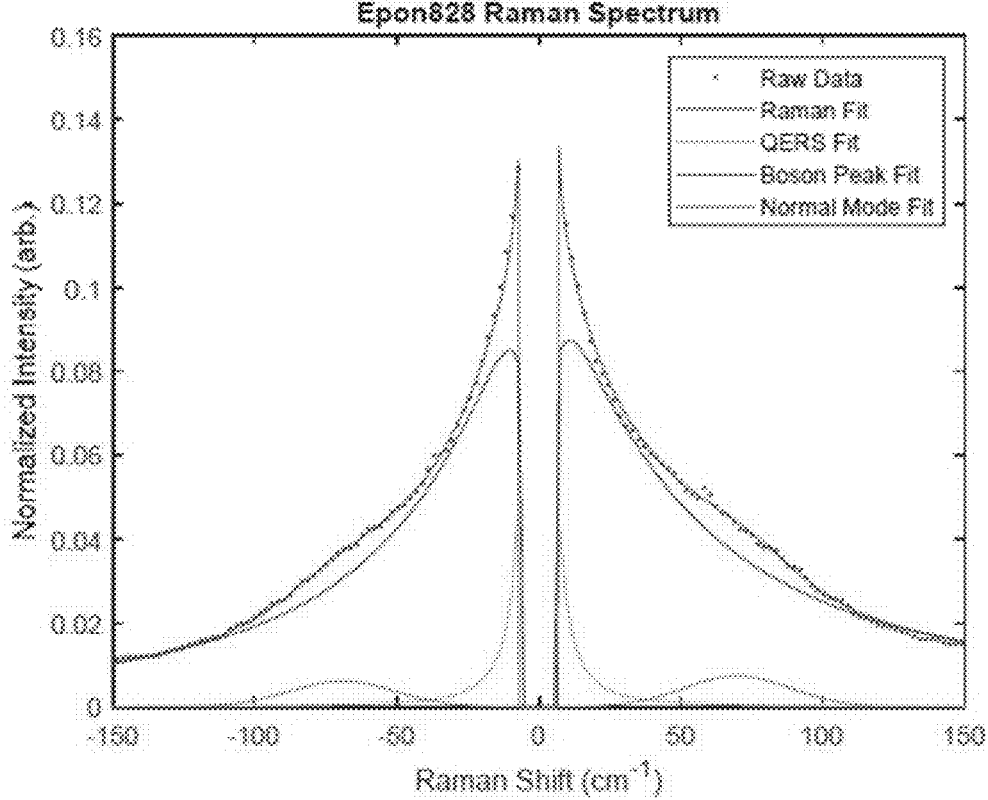

FIGS. 39A-39B show graphs illustrating Boson peak position of (A) DA-2 Raman spectrum and (B) Epon828 Raman spectrum.

Figure 40:
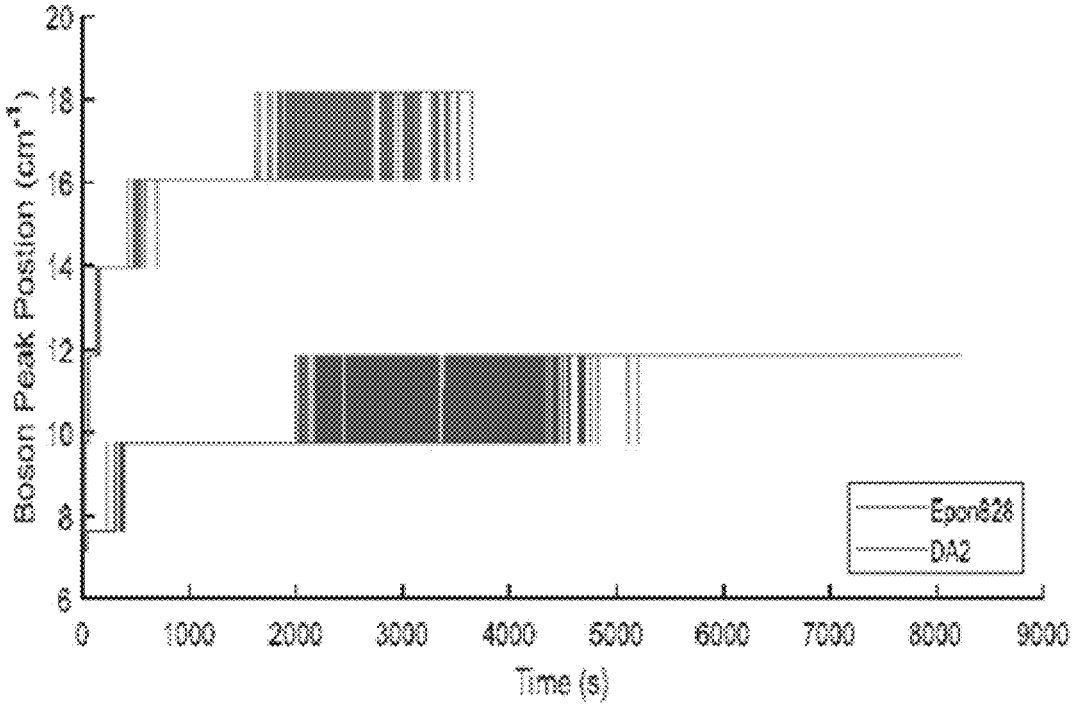

FIG. 40 shows a graph comparing Boson peak position of DA-2 and Epon 828.

Figure 41A:
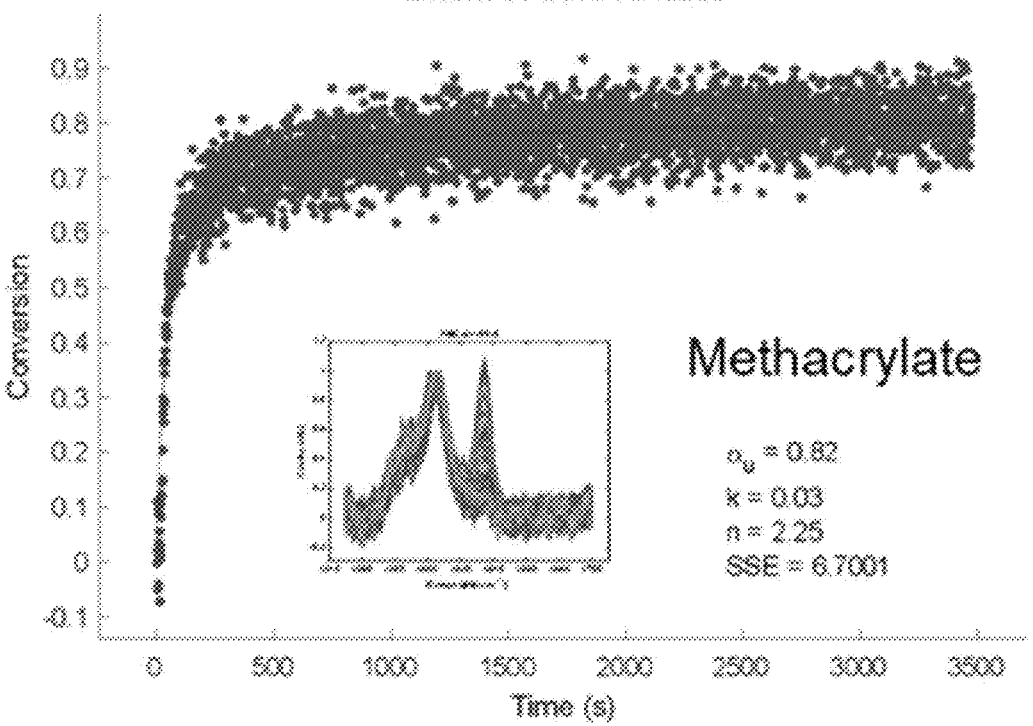
Figure 41B:
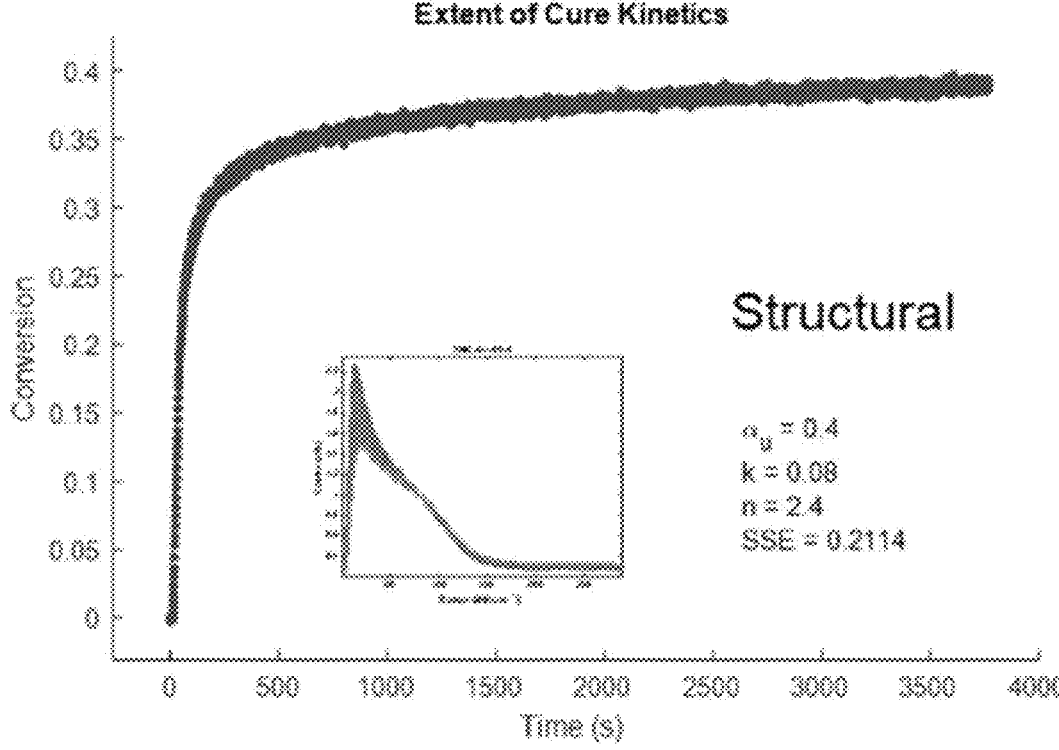

FIGS. 41A-41B show graphs illustrating PM-BisGMA-Epon828 (A) chemical and (B) structural cure kinetics.

Figure 42:
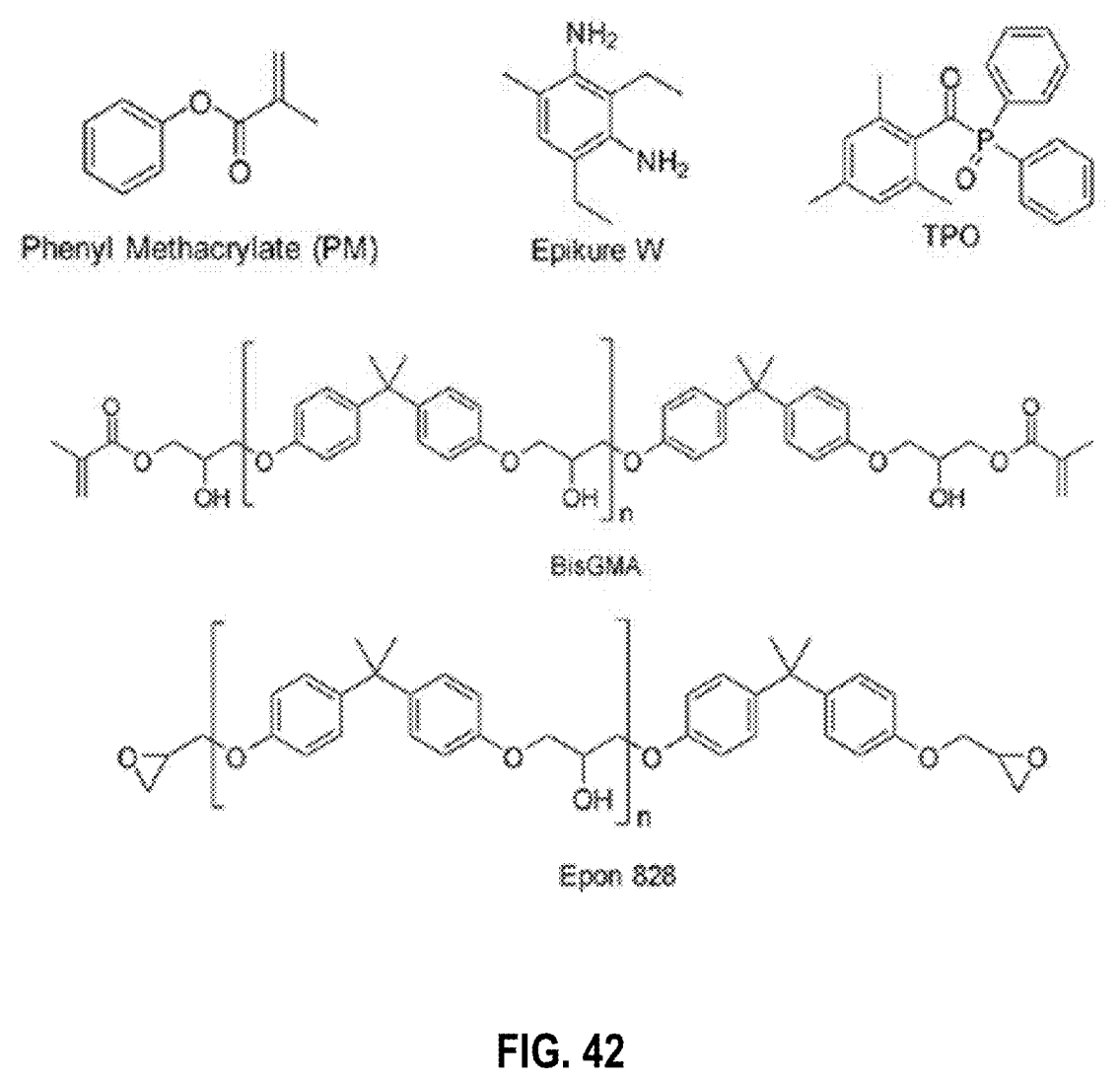

FIG. 42 shows the structures of PM, BisGMA, and Epon828.

FIGS. 43A-43D show graphs illustrating chemical versus structural kinetics.

Figure 44:
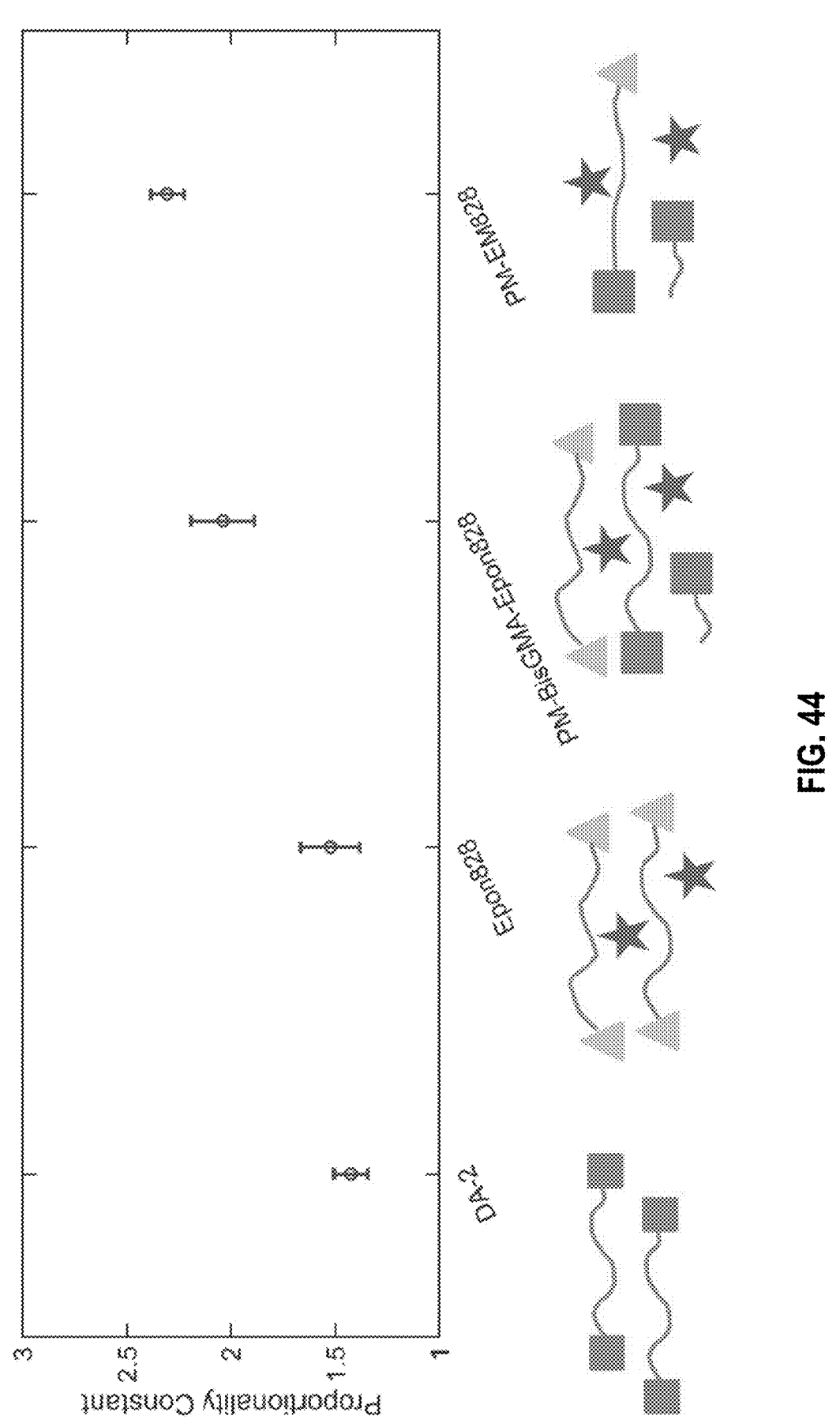

FIG. 44 shows a graph illustrating single versus dual core proportionality constant.

Figure 45B:
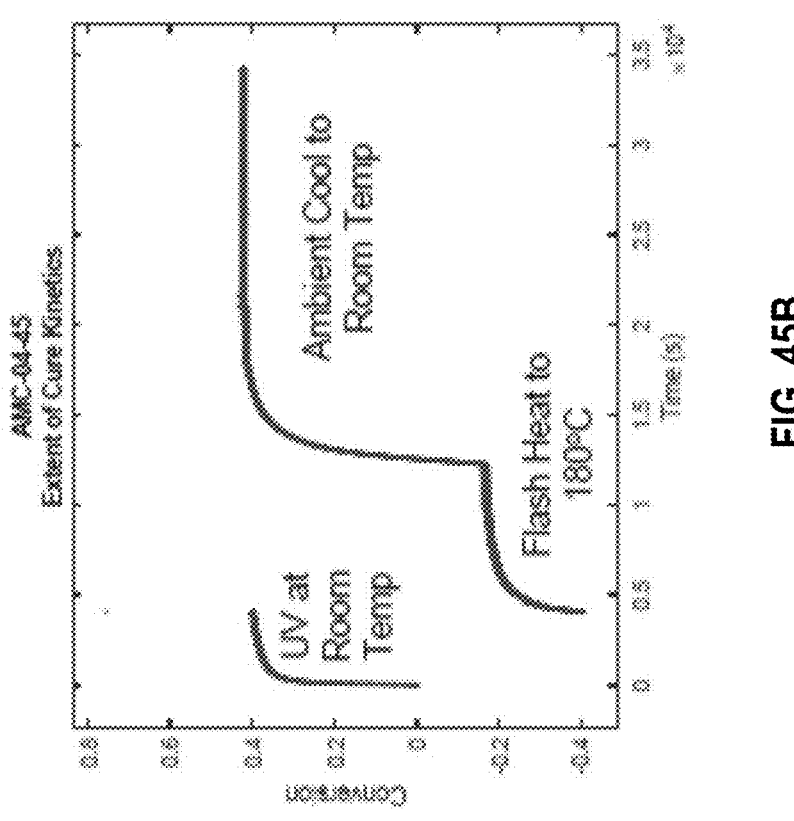
Figure 45A:
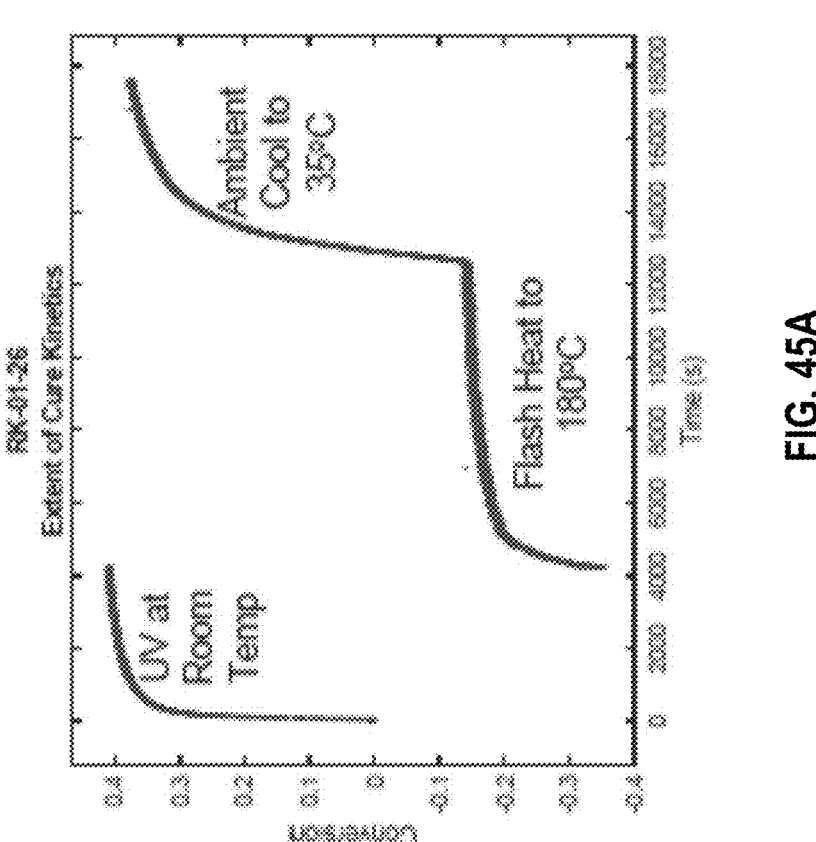

FIGS. 45A-45B show graphs illustrating PM-BisGMA-Epon828 dual cure kinetics, structural with cool down.

DETAILED DESCRIPTION OF THE DISCLOSURE

Definitions

Unless defined otherwise, all technical and scientific terms used herein have the same meaning as commonly understood by one of ordinary skill in the art to which this invention belongs. Although any methods and materials similar or equivalent to those described herein can be used in the practice or testing of the present invention, selected methods and materials are described.

As used herein, each of the following terms has the meaning associated with it in this section.

The articles "a" and "an" are used herein to refer to one or to more than one (i.e., to at least one) of the grammatical object of the article. By way of example, "an element" means one element or more than one element.

"About" as used herein when referring to a measurable value such as an amount, a temporal duration, and the like, is meant to encompass variations of ±20% or ±10%, more preferably ±5%, even more preferably ±1%, and still more preferably ±0.1% from the specified value, as such variations are appropriate to perform the disclosed methods.

Throughout this document, values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (e.g., 1%, 2%, 3%, and 4%) and the sub-ranges (e.g., 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "substantially" as used herein refers to a majority of, or mostly, as in at least about 50%, 60%, 70%, 80%, 90%, 95%, 96%, 97%, 98%, 99%, 99.5%, 99.9%, 99.99%, or at least about 99.999% or more, or 100%. The term "substantially free of" as used herein can mean having none or having a trivial amount of, such that the amount of material present does not affect the material properties of the composition including the material, such that the composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less. The term "substantially free of" can mean having a trivial amount of, such that a composition is about 0 wt % to about 5 wt % of the material, or about 0 wt % to about 1 wt %, or about 5 wt % or less, or less than, equal to, or greater than about 4.5 wt %, 4, 3.5, 3, 2.5, 2, 1.5, 1, 0.9, 0.8, 0.7, 0.6, 0.5, 0.4, 0.3, 0.2, 0.1, 0.01, or about 0.001 wt % or less, or about 0 wt %.

Description

Provided herein are methods of monitoring kinetic processes of an amorphous material. In some embodiments, the method includes measuring a broad disorder band of the amorphous material using Raman spectroscopy, the broad disorder band including a spectral peak and a shoulder; normalizing the broad disorder band to the shoulder, generating an integrated value; and analyzing the integrated value to determine a status of the kinetic process of the amorphous material. In some embodiments, analyzing the integrated value includes measuring a change in the normalized intensity of the disorder band to measure material kinetics. In some embodiments, the broad disorder band is measured in the low-frequency Raman spectra of the amorphous material. In some embodiments, the low-frequency spectra includes a terahertz region, or anything under 300 $cm^{-1}$. In some embodiments, the low-frequency spectra is measured in a spectrum below 150 $cm^{-1}$, 100 $cm^{-1}$, or any combination, sub-combination, range, or sub-range thereof.

In some embodiments, the shoulder is formed by a van Hove peak. In some embodiments, the spectral peak is formed by at least one of a Boson peak and quasi-elastic Rayleigh scattering (QERS). For example, in one embodiment, the spectral peak is formed by the Boson peak. In another embodiments, the spectral peak is formed by the Boson peak and QERS. In some embodiments, by normalizing the disorder band to its shoulder, variations in the integrated intensity correspond to changes in conformational entropy, which is extremely sensitive to structural changes. In such embodiments, the integrated intensity of the peak may be used to monitor various structural kinetics of an amorphous material.

In some embodiments, the kinetic process comprises glass transition temperature ($T_g$) kinetics. In some embodiments, the spectral peak is formed at between about 5 and about 20 $cm^{-1}$ and/or the shoulder is formed at between about 50 and about 100 $cm^{-1}$. For example, the spectral peak may be formed at about 15 $cm^{-1}$ and/or the shoulder may be formed at about 65 $cm^{-1}$. In some embodiments, the integrated value comprises integrated intensity near the spectral peak. In some embodiments, analyzing the integrated value comprises monitoring the integrated intensity over temperature; and assessing a temperature-dependent status of the $T_g$ kinetics of the amorphous material.

Additionally or alternatively, in some embodiments, the kinetic process comprises cure kinetics. Cure kinetics may include, but are not limited to, polymerization and/or gelation. In some embodiments, the spectral peak is formed at between about 5 and about 20 $cm^{-1}$ and/or the shoulder is formed at between about 50 and about 100 $cm^{-1}$. For example, the spectral peak may be formed at about 15 $cm^{-1}$ and/or the shoulder may be formed at about 85 $cm^{-1}$. In some embodiments, analyzing the integrated value comprises monitoring a decrease in the integrated value over time and/or temperature; and assessing a time- and/or temperature-dependent status of the cure kinetic of the amorphous material. The results may also be fitted to an appropriate rate equation for the determination of kinetic constants such as reaction rate and reaction order. In some embodiments, the cure kinetics comprise structural conversion kinetics and chemical conversion kinetics. In such embodiments, the method may further comprise correlating the structural conversion kinetics to the chemical conversion kinetics.

The methods according to the embodiments disclosed herein may be applied to any suitable amorphous or semi-crystalline material, such as, but not limited to, bulk polymers, films, and/or fibers. For example, suitable materials may include, but are not limited to, thermoplastics (e.g., polystyrene, polylactic acid, and polymethyl methacrylate), thermoset resins (e.g., methacrylate- and epoxy-based), interpenetrating polymer network (IPN) resins, chemically connected IPN resins, or any other suitable material. The methods according to the embodiments disclosed herein may also be performed with any suitable Raman spectroscopy system. For example, in some embodiments, the Raman spectroscopy is performed using a double volume-holographic-grating-based fiber optic Raman probe, with an unpolarized laser source and collection optics. In some embodiments, the fiber optic Raman probe measures real time changes in the materials entropy, as opposed to traditional measurements which focus on changes in bond concentration, viscoelasticity, or heat flow. Accordingly, in some embodiments, the method disclosed herein is noncontact and chemically agnostic. Additionally or alternatively, the method disclosed herein can be performed without the need for advanced spectral processing.

In some embodiments, the low frequency region of the Raman spectrum used in the methods described herein provides monitoring of kinetic processes with improved signal-to-noise in as compared to existing methods, which focus on the chemical fingerprint region. Additionally, in contrast to differential scanning calorimetry (DSC), dynamic mechanical analysis (DMA), rheology, and infrared spectroscopy, which are not appropriate for in situ analysis, microanalysis, or in-line process measurements of amorphous material, the non-contact and high spatial resolution of Raman spectroscopy in the methods disclosed herein facilitate both micro-analysis as well as in situ process control applications. For example, in some embodiments, the methods disclosed herein may be used to monitor cure kinetics in situ, ensuring that polymer/resin components are fully cured (i.e., reduce or eliminate uncured components).

The invention is further described in detail by reference to the following experimental examples. These examples are provided for purposes of illustration only, and are not intended to be limiting unless so specified. Thus, the invention should in no way be construed as being limited to the following examples, but rather, should be construed to encompass any and all variations which become evident as a result of the teaching provided herein.

EXPERIMENTAL EXAMPLES

Without further description, it is believed that one of ordinary skill in the art can, using the preceding description and the following illustrative examples, make and utilize the compounds of the present invention and practice the claimed methods. The following working examples therefore, specifically point out the preferred embodiments of the present invention, and are not to be construed as limiting in any way the remainder of the disclosure.

Example 1: Method for Measuring Glass Transition in Polymers using Low-Frequency Raman Spectroscopy Glass transition temperature is one of the most important characteristics to describe the behavior of polymeric materials. When a material goes through glass transition, configurational entropy increases, which affects the phonon density of states. Amorphous materials invariably display low frequency Raman features related to the phonon density of states resulting in a broad disorder band below 100 $cm^{-1}$. This band includes the Boson peak and a shoulder, which is dominated by the van Hove peak, and quasi-elastic Rayleigh scattering also contributes to the signal. The temperature dependence of the ratio of the integrated intensity in proximity of the Boson peak to that of the van Hove peak shows a kink near the glass transition temperature as found by differential scanning calorimetry. Careful analysis of the Raman spectra confirms that this is related to a change in the phonon density of states at the transition temperature. This makes low-frequency Raman a promising technique for thermal characterization of polymers because not only is this technique chemically agnostic and contactless, but it does not require intensity calibration, nor deconvolution nor chemometric analysis.

The glass transition is loosely defined by the temperature at which an amorphous material gains enough internal energy to overcome vitrification and begin to flow as a viscous liquid. As a result, the glass transition temperature $T_g$ is one of the most important parameters when analyzing the structure-property-processing relationships in polymer science and engineering. While the melting point temperature of crystalline materials, holding constant pressure and material composition, results from a clearly defined phase transition detectable by a discontinuity in extensive properties such as volume, enthalpy, and entropy, the glass transition is a gradual process whereby the material slowly becomes less "glassy" and more "rubbery" as the temperature increases. Therefore, $T_g$ is characterized as a rate-dependent quasi second order thermodynamic phase transition which can be identified by a change in the slope of volume, enthalpy, or entropy as a function of temperature. Since it is challenging to directly measure these extensive quantities in the laboratory, $T_g$ is traditionally measured indirectly by techniques such as differential scanning calorimetry (DSC) and dynamic mechanical analysis (DMA).

The simpler of these two approaches is DSC, which measures the heat capacity (or heat flow) of a material as a function of temperature T. Since heat capacity is equal to the derivative of the enthalpy with respect to T, holding pressure or volume, and composition constant, a step change in the DSC curves can correlate to a glass transition. By contrast, DMA probes viscoelasticity by measuring the storage and loss moduli as functions of temperature. While DMA provides a more direct measurement of the "glassy" to "rubbery" transition, there is no universally accepted definition of the exact transition point, be it the onset temperature of the decrease in storage modulus E', the temperature of the maximum in the loss modulus E", or the temperature of the peak of the loss tangent E"/E'. Furthermore, there is rarely agreement among any of these various methods for determining $T_g$. For instance, some studies reported $T_g$ values for polystyrene measured at 2° C./min ranging from 84.7 to 89.3° C. when determined from DSC measurements and ranging from 89.4 to 111.5° C. when ascertained from DMA results.

Both infrared and Raman spectroscopies have been explored as potential alternative methodologies for detecting the glass transitions in polymers. Raman spectroscopy is of particular interest due to the high spatial resolution and inherent non-contact nature of laser-based techniques. However, most Raman-based approaches to measuring $T_g$ have focused on detecting relatively small changes in either the intensity or position of peaks of bending or stretching modes which arise at $T_g$ due to changes in steric hindrances. The low-frequency region of the Raman spectra has been used to investigate the effects of aging and thermal history on amorphous polymers. Furthermore, previous studies in this area relied upon complex multi-grating monochromators and polarization sensitive collection optics.

This Example presents a new methodology which uses the low-frequency region for determining $T_g$ of polymers by Raman spectroscopy using a double volume-holographic-grating-based fiber optic Raman probe, with an unpolarized laser source and collection optics. The use of two gratings as a Rayleigh filter in a fiber optic Raman probe has been well demonstrated as a means of simulating a double monochromator providing access to low frequency vibrational modes, but there is still significant filter roll-off below ~15 cm$^{-1}$, which can often make quantitation rather challenging. Here, experimental evidence, backed-up by first principles modeling, demonstrates the ability to determine $T_g$ directly from the low-frequency Raman spectra irrespective of the filter roll-off. This technique permits direct investigation of thermal-structural properties, in a non-contact non-destructive manner, and is inherently well suited for in situ or high spatial resolution applications. Furthermore, the extremely high scattering efficiency in this region of the spectrum permits high-speed kinetic studies.

Traditional Raman spectroscopy provides a chemical fingerprint by probing the various vibrational modes of a molecule, but it is also sensitive to phonon modes which provide insight into the overall structure of the material. Two common examples are the presence of c-Si (~520 cm$^{-1}$) and a-Si (~480 cm$^{-1}$) bands as well as the g (~1582 cm$^{-1}$) and d (~1380 cm$^{-1}$) bands in graphene, which are both examples of optical phonons arising from out-of-phase vibrations along the crystal axis. Raman spectroscopy is also sensitive to acoustic phonons, which arise from in-phase lattice vibrations, but due to their extremely low energy, their modes are incredibly close to the Rayleigh line. Until recently, this made it challenging to measure them without the use of a double or triple monochromator.

In highly ordered crystalline materials acoustic phonon modes produce sharp bands corresponding to the crystallographic axes. As the material becomes less ordered, the acoustic phonon modes tend to simultaneously broaden and redshift. In the case of amorphous materials, the phonon density of states g(v) is dominated by two main features—the Boson and van Hove peaks. Therefore, in soft amorphous materials, the Raman scattering intensity $I_R$(v) can be directly related to g(v) by $$I_R(v) = \frac{C(v)g(v)}{|v|}[n(v, T) + H(v)], \qquad \text{Eq 1}$$

where v is the frequency of the Raman shift, C(v) the coupling coefficient, and n(v, T) the Bose-Einstein distribution function n(v, T)=($e^{hv/kT}$−1). The Heaviside function H(v)=1 for v≥0, 0 otherwise, accounts for the difference in the probability between the Stokes and anti-Stokes shifted photons.

The tendency of phonon modes to redshift and broaden is a universal feature of amorphous materials. Therefore, $I_R$(v) can be considered as the disorder band of the polymer, analogous to the a-Si band or the d band in graphene. The primary difference is that the extremely soft nature of polymers shifts the disorder band into the low-frequency region of the Raman spectrum. Described herein is a method of using this disorder band to monitor the change in the phonon density of states as a function of temperature to determine $T_g$ of a polymer.

Polystyrene pellets (CAS #9003-53-6) are used in the new methodology described herein with an approximate molecular weight of 210,000 g/mol purchased from Scientific Polymer Products, Inc. (Ontario, NY). The samples were placed in a temperature-controlled microscope stage, allowing T to be controlled with an accuracy of <0.01° C. The stage was sealed, and measurements were taken through the lid window. No extra efforts were taken to control the internal environment. Liquid nitrogen was utilized to stabilize the heating rate even though the samples were never cooled below 20° C. The Raman measurements were made with an 808-nm laser and probe (TR-PROBE from Coherent) coupled with an 8-mm working distance focusing lens. The probe is a fiber-coupled Raman probe capable of measuring both Stokes and anti-Stokes Raman scattering to within approximately ±7 cm⁻¹ of the Rayleigh line. The scattered light was then fiber coupled directly into a spectrometer. In this Example, a HORIBA LabRAM HR Evolution (Piscataway, NJ) spectrometer was used because it interfaced with the THMS600 temperature stage. However, other spectrometers, such as a fixed grating modular spectrometer, are capable of providing sufficient sensitivity and resolution.

No averaging or baseline correction were used for this dataset. Cosmic rays and other anomalous spikes in the spectra were removed. The normalized intensity of the disorder band $\zeta_D(T)$ was calculated from the following relationship, $$\zeta_D(T) \propto \frac{\int_D I_R(v, T)dv}{\int_S I_R(v, T)dv}, \qquad \text{Eq 2}$$

where the regions D and S are bound by ±7 cm⁻¹ of the peak (~15 cm⁻¹) and shoulder (~65 cm⁻¹) of the disorder band, respectively. Linear interpolations for the two regions (above and below $T_g$) were performed with MATLAB. When performing Raman spectral band fitting, the data were corrected for filter and spectrometer roll-off by calibration with a broadband white light source in the region between ±300 cm⁻¹. Then the data were normalized for Stokes scattering and fitted with the default nonlinear least squares method from the MATLAB curve fitting toolbox.

Heat flow measurements were conducted by differential scanning calorimetry (DSC); 5-10 mg samples were sealed in aluminum pans with hermetic lids and heated at various temperature rates. All DSC measurements were conducted under nitrogen with a 50 ml/min flow rate. All DSC thermograms were smoothed with a Gaussian window function and scaled.

Figure 1:
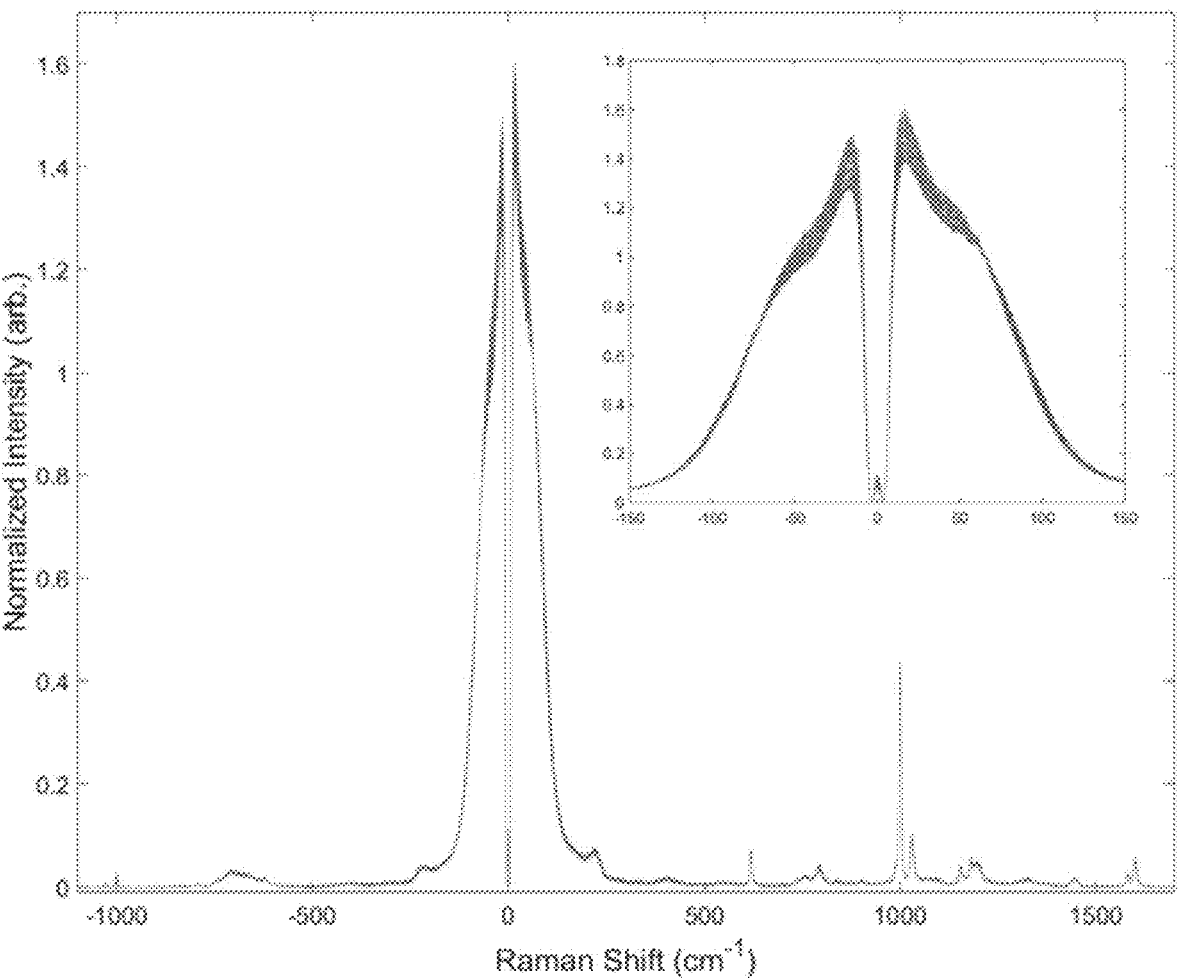
FIG. 1 is a graphical representation of normalized Raman spectra of polystyrene from 70-150° C. in which the inset shows the ultra-low-frequency region, according to some embodiments.
Figure 2:
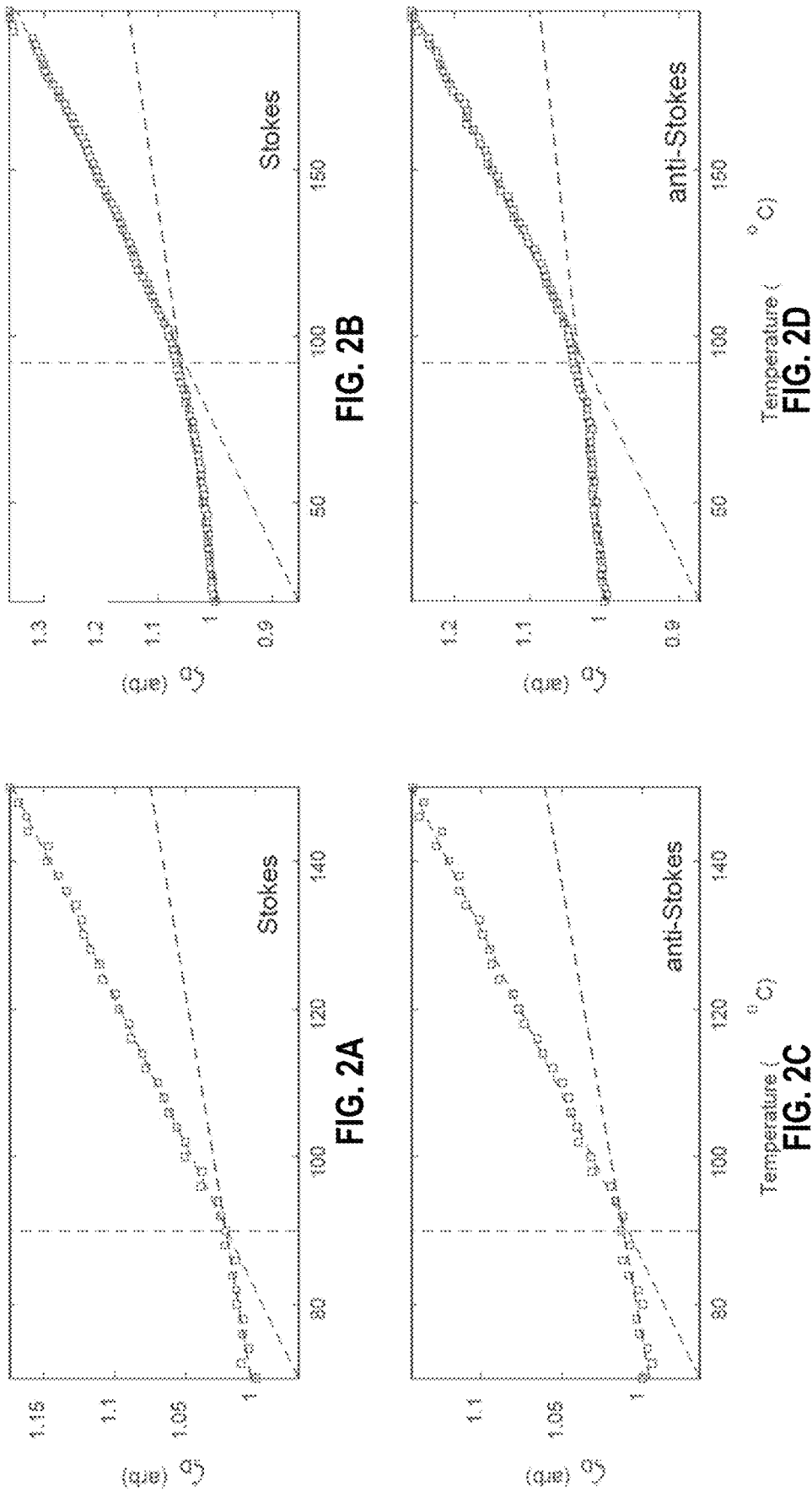
FIGS. 2A-D are graphical representations of temperature dependence of the normalized disorder band intensity for Stokes (FIG. 2A) and anti-Stokes (FIG. 2B) shifted Raman scattering of polystyrene measured at a ramp rate of 4° C./min, and temperature dependence of the normalized disorder band intensity for Stokes and (FIG. 2C) anti-Stokes (FIG. 2D) shifted Raman scattering of polystyrene measured at a ramp rate of 0.25° C./min, in which these graphs show a change in slope near 90° C., according to some embodiments.

Initially, the Raman spectra of polystyrene were measured using a 600 lines/mm diffraction grating and a 5 second integration time from −1100 to 1700 cm⁻¹ with a total measurement time of 30 seconds per spectrum. The sample was heated from 70 to 150° C. with a 2° C. step size, and accounting for spectral acquisition time, this corresponded to an average ramp rate of ~4° C./min. FIG. 1 shows an overlay of the 41 spectra acquired over the temperature range, with the inset highlighting the disorder band increase as a function of T. FIG. 2A and FIG. 2B show the normalized intensity of the Stokes and anti-Stokes shifted disorder band, $\zeta_D(T)$ with a clear change in slope at ~92° C. Next, polystyrene over a spectral range of −1060 to 1060 cm⁻¹ with an 1800 lines/mm grating and an integration time of 30 seconds were measured, resulting in a total acquisition time of 457 seconds per spectrum. The sample was heated from 20 to 198° C. with a 2° C. step size. Accounting for spectral acquisition time, this corresponded to an average ramp rate of ~0.25° C./min. This provided an increase in both spectral and temperature resolution. The results shown in FIG. 2C and FIG. 2D again demonstrate an apparent change in slope in $\zeta_D(T)$ around ~90° C.

Figure 3:
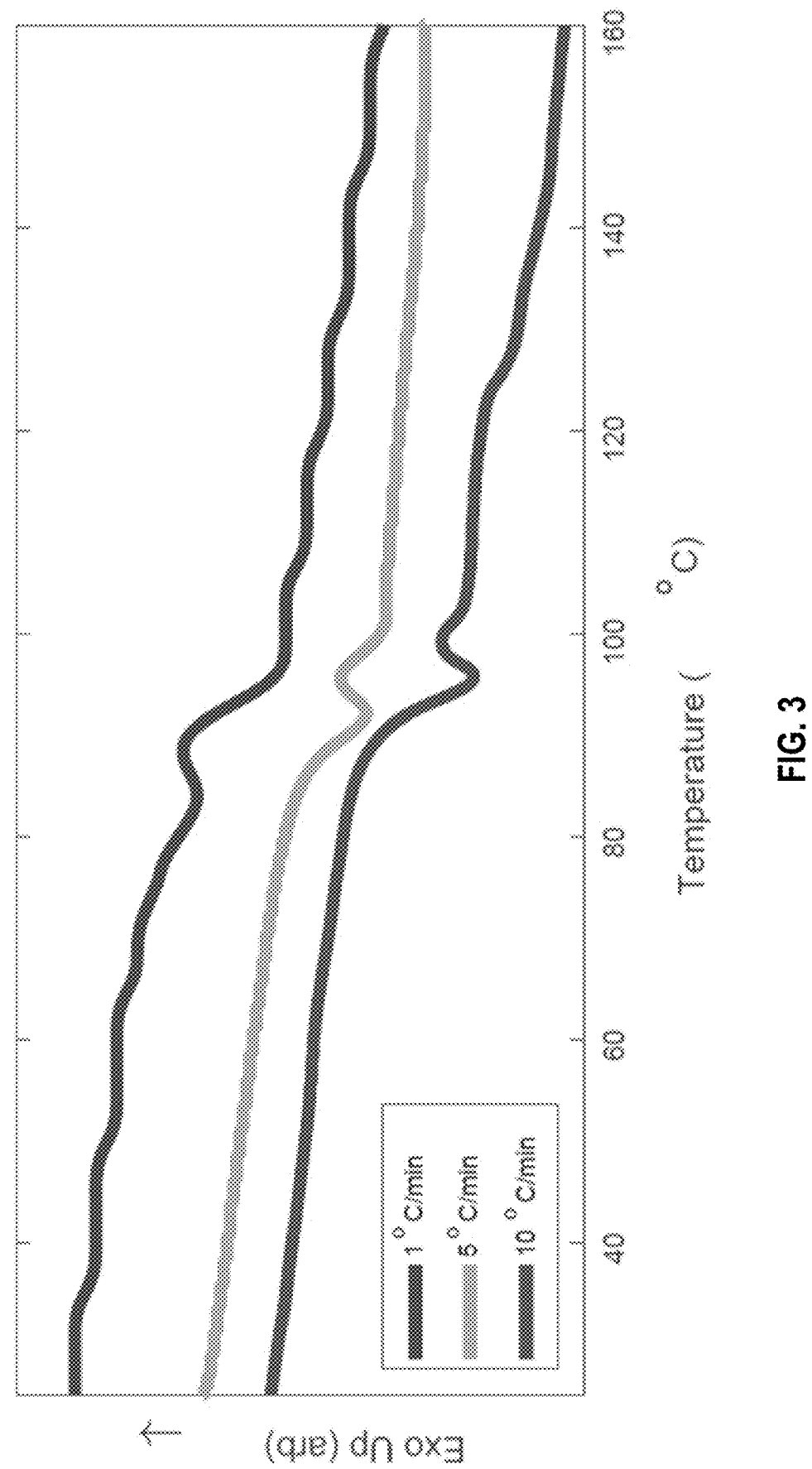
FIG. 3 is a graphical representation of a differential scanning calorimetry thermogram for polystyrene at different ramp rates, according to some embodiments.
Figures 4A, 4B, 4C, 4D:
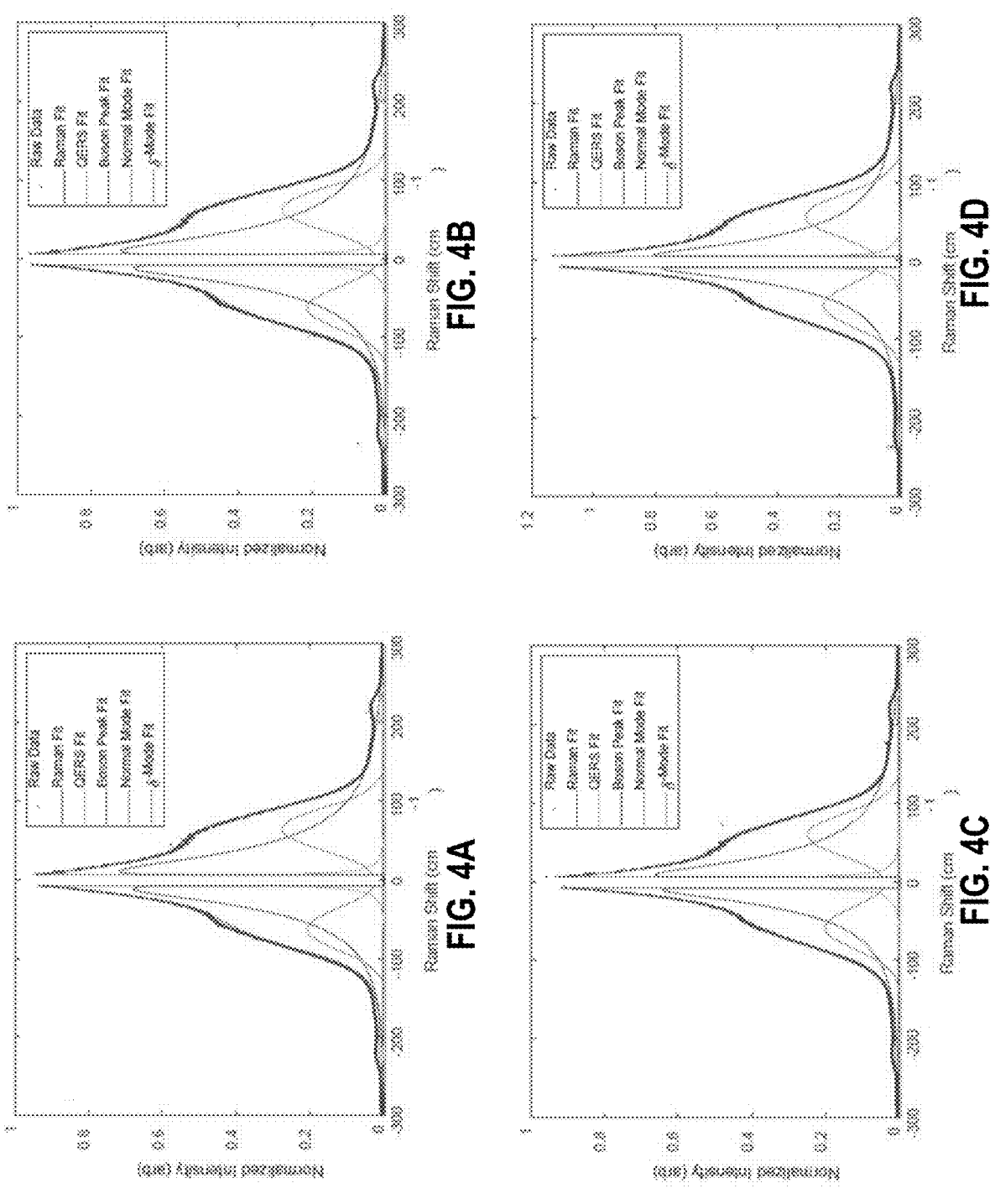
FIGS. 4A-D are graphical representations depicting intensity corrected Raman spectra fitted to the total intensity as well as the associated QERS, Boson peak, normal mode and bending mode contributions at 50° C.

Subsequently, DSC experiments on polystyrene were conducted as shown in FIG. 3. Since $T_g$ can be rate dependent, heating rates of 1, 5, and 10° C./min were used. Typically heat-cool-heat experiments are used, which erase the thermal history of the sample with an initial heating ramp, impart a known thermal history with a cooling ramp, and heat the sample again with the result from the second heating ramp being reported. However, because the spectral analysis was performed with a single temperature ramp, the initial DSC ramp was focused on. The midpoint $T_g$ values for the initial heating ramps ranged from 89-93° C., in excellent agreement with the T value of the kink in $\zeta_D(T)$. Validating the correlation between the change in slope of $\zeta_D(T)$ and $T_g$. Data from slower DSC heating rates approached the limit of detection of the instrument and provided no meaningful results.

The Boson peak is defined as the maxima of the normalized phonon density of states, $g(v)/v^2$. While the origins of this feature are still debated in the community, extensive experimental evidence and more recent modeling have shown this feature to be extremely sensitive to sound velocity. The van Hove peak in $g(v)$ originates from singularities that arrive at critical points in the Brillouin zone and is far less sensitive to sound velocity changes than the Boson peak. In addition to the pure Raman signal, there is also an additional contribution in the disorder band due to quasi-clastic Rayleigh scattering (QERS). The QERS arises from the translational energy associated with the molecules in the sample, resulting in a broadening of the Rayleigh band. This process can be thought of similarly to collision broadening of an atomic emission line and can be modeled as a Lorentzian function centered at 0 cm⁻¹.

All these factors combined contribute to the overall shape of the disorder band resulting in its broad asymmetric shape and well-defined shoulder. To investigate the relative contributions of these various physical phenomena to understand the correlation between the kink in the temperature dependence of $\zeta_D(T)$ and $T_g$, the spectral intensity $I(v)$ was modeled based on previous work comparing ultra-low-frequency Raman scattering and inelastic neutron scattering.

$$I(v) = \frac{I_{QERS}}{2\pi} \frac{\Delta v_{QERS}}{v^2 + \left(\frac{\Delta v_{QERS}}{2}\right)^2} + \\ \left\{ \frac{\gamma I_{BP}}{2\sqrt{\pi}\xi_{BP}} e^{-\left[\frac{1}{4\gamma^2} + \left(\gamma + log\frac{|v|}{\xi_{BP}}\right)^2\right]} + \frac{I_{NM}}{2\sqrt{\pi}\Delta\xi_{BP}} e^{-\left(\frac{v-|\xi_{NM}|}{2\Delta\xi_{NM}}\right)^2} + \\ \frac{I_\delta}{2\sqrt{\pi}\Delta\xi_\delta} e^{-\left(\frac{v-|\xi_\delta|}{2\Delta\xi_\delta}\right)^2} \right\} \left[H(v) + H(-v)\left(\frac{v_0-v}{v_0+v}\right)^3 e^{\left(\frac{hv}{kT}\right)}\right] \qquad \text{Eq 3}$$

where I is the integrated intensity of the mode, $v_0$ the frequency of the incident radiation, $\Delta v$ the full width half maximum, and $\xi$ the peak position, with the subscripts QERS, BP, NM, and δ denoting the four different contributions to the fit, namely quasi-elastic Rayleigh scattering, Bosonic peak, normal modes, and bending mode, respectively, $\gamma$ is a constant relating to the skew of the Boson peak. Consistent with previously published inelastic neutron scattering results, the normal modes arise from $g(v)$, including the van Hove peak in addition to any modes other than those due to the Boson peak. For this analysis, polystyrene was used as it has a skeletal deformation mode within the tail of the disorder band at ~220 cm⁻¹. It is important to note that contributions from skeletal deformation modes will vary by material as the location and number of deformation modes are not only polymer specific, but they can also vary with molecular weight and tacticity. The relative strength of the Stokes and anti-Stokes shifted scattering signals is accounted for by the Boltzmann distribution due to thermal phonon populations and a cubic term in frequency due to the dipolar radiation. It should be noted that the frequency term is raised to the third power not the fourth power, since the signal from the camera in the spectrometer is proportional to the mean number of photons incident on the detector and not the absolute intensity.

Based on an observed Rayleigh filter cut-on of $\pm 7$ cm$^{-1}$ after intensity correction, a notch filter was digitally applied to both the measured spectrum and intensity fitting function (Equation 3). Since most of the QERS is contained within $\pm 7$ cm$^{-1}$, fitting its contribution outside this region is inherently difficult so the upper bound of $\Delta v_{QERS}$ was set to 0.5 cm$^{-1}$ to ensure physically relevant results. The $\gamma$ term was also bound between 0.5 and 2. All other fit parameters were unconstrained. Four representative fitted spectra of polystyrene (two measured below and two above $T_g$) are shown in FIGS. 4A-D, with Boson peak positions of 11.7, 11.5, 9.8, and 8.7 cm$^{-1}$ at 50 (FIG. 4A), 60 (FIG. 4B), 120 (FIG. 4C), and 130° C. (FIG. 4D), respectively.

By summing the fitted contributions from the Boson peak and normal modes, the spectral contribution can be isolated from just g(v). Using Equation 1, it can then be re-normalized as follows, $$\frac{I_{BP}(v) + I_{NM}(v)}{|v|[n(v,\,T) + H(v)]} \propto \frac{g(v)}{v^2}. \qquad \text{Eq 4}$$

Figure 5:
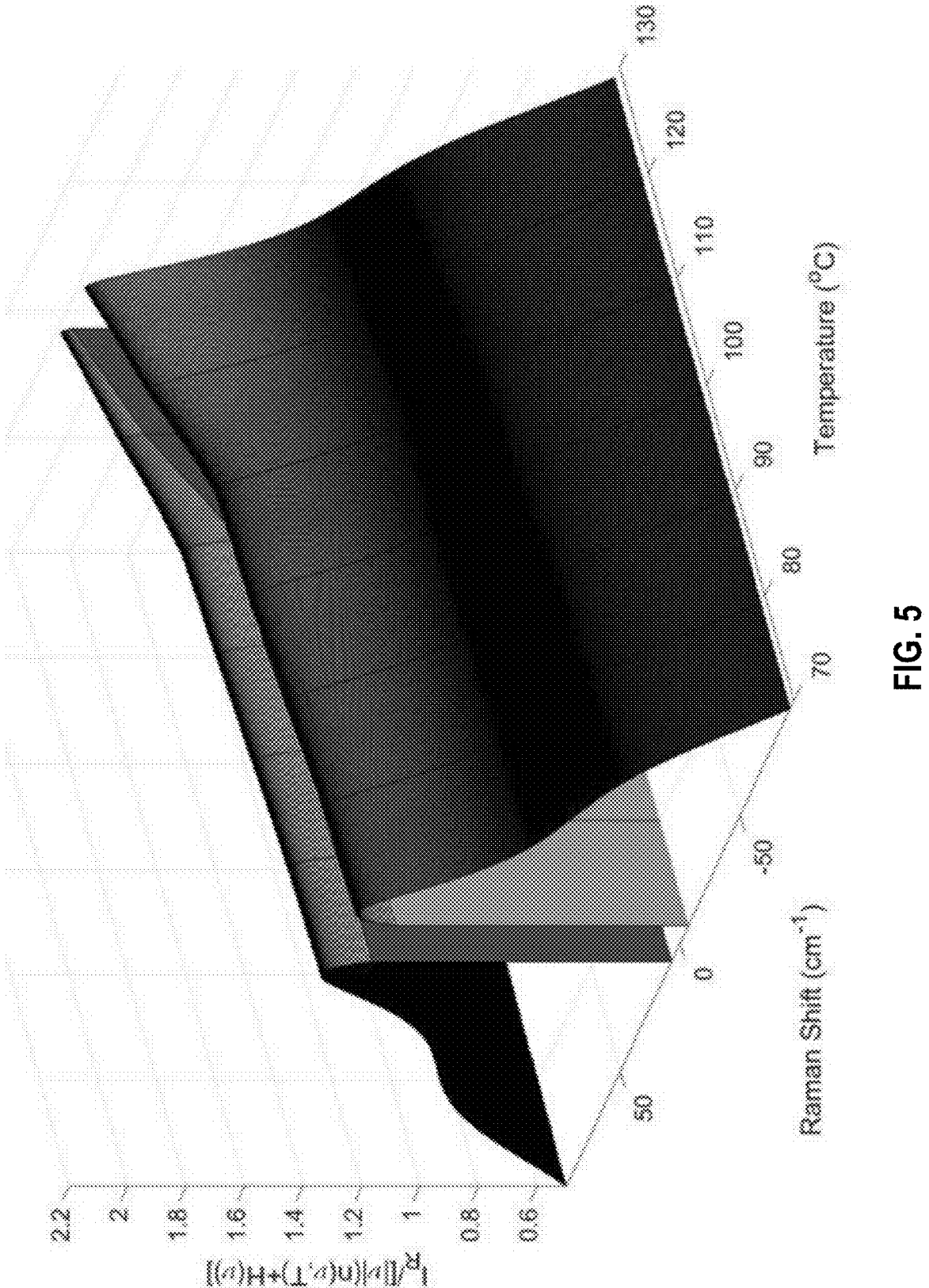
FIG. 5 is a illustrative representation of temperature dependence of the re-normalized acoustic phonon contribution to polystyrene disorder band, according to some embodiments.

FIG. 5 shows the renormalized density of states, which remained relatively constant below $T_g$, and the average value Boson peak position over that range was 12±0.2 cm$^{-1}$, in good agreement with the reported value of 11.5 cm$^{-1}$ by Surovtsev and Sokolov. Above $T_g$, there is a redshift in the Boson peak, as expected with the decreased sound velocity. In addition, there is increased intensity from the renormalized density of states, which combines with the increased QERS from the softer material to produce the kink in $\zeta_D(T)$ at $T_g$.

The disorder band feature in Raman spectra of amorphous materials is a combination of QERS and the Boson peak. While it is known that this disorder band increases as a material softens, the ability to use this phenomenon to directly measure glass transition behavior using a compact fiber coupled Raman probe without the need for advanced spectral processing can be demonstrated. Rigorous analysis of the temperature dependent spectra can accurately identify $T_g$ of polymers, but so too can simply monitoring the temperature dependence of the integrated intensity near the apparent spectral peak (~15 cm$^{-1}$) normalized to that of the shoulder (~65 cm$^{-1}$). The improved signal-to-noise in the low-frequency region of the Raman spectrum makes it far more promising for mainstream polymer characterization applications compared to conventional Raman focused on the chemical fingerprint region. Furthermore, the non-contact and high spatial resolution nature of Raman spectroscopy make this technique ideal for both micro-analysis and in situ process control applications. This is in stark contrast to DSC and DMA, neither of which are particularly suited for in-line process measurements or analysis of fibers and films.

Example 2—Method for Determining Resin Cure Kinetics with Low-frequency Raman Spectroscopy

Abstract

Characterizing resin extent of cure kinetics is critical to understanding the structure-property-processing relationships of polymers. The disorder band present in the low-frequency region of the Raman spectrum is directly related to conformational entropy and the modulus of amorphous materials, both of which change as the resin polymerizes. Normalizing the disorder band to its shoulder (~85 cm$^{-1}$) provides structural conversion kinetics, which can be directly correlated to chemical conversion kinetics for methacrylate and epoxy-amine based resin systems. In addition to fitting both the structural and chemical conversion data to a phenomenological kinetic rate equation, a relationship between the chemical and structural kinetics is demonstrated herein, which appears to relate to the softness of the material. Lastly, the method provided herein is used to investigate a methacrylate/epoxy interpenetrating polymer network resin system.

Introduction

Resin kinetics inform polymerization extent of cure and processing conditions, which are central to polymer network formation. How the polymer network is formed influences the final physical and mechanical properties of the material, and insufficient curing can be detrimental to the material's performance. Thus, characterization of the kinetics is important or understanding the structure-property-processing relationships of polymers, which is essential for industrial process development and quality control. Additionally, ensuring sufficient curing mitigates safety risks as unreacted monomers and other low molecular weight components could diffuse out of the material, causing adverse health effects. Cure kinetics are also important for determining adequate manufacturing times and establishing safe processing and storage conditions, especially in formulations that contain multicomponent reagents and initiators. Because of the complexity of multicomponent resin systems, there is a need for chemically independent techniques that can be implemented in situ into manufacturing processes.

Many experimental techniques are used to monitor resin cure kinetics including changes in refractive index, rheology, and dielectric analysis although differential scanning calorimetry (DSC) and Fourier transform infrared (FTIR) spectroscopy are perhaps the most widely implemented. DSC exposes a sample to a thermal profile and measures the heat flow during the curing process. Monitoring kinetics with DSC assumes that the heat evolved is proportional to the extent of cure of reactive groups and that the reaction rate is proportional to the measured heat flow. Similarly, photo-DSC monitors the heat release of photocurable resins after being irradiated with UV or visible light. In both DSC and photo-DSC, factors such as the method of sample preparation, the heating rate of the DSC test, and specificity of temperature integral approximation can have effects on the calculations and results. Photo-DSC is also limited by the relatively long delay times due to the required low-intensity light.

FTIR is used for monitoring the kinetics of both thermal and photocurable systems and provides chemical information about the resin as the absorption band is proportional to the bond concentration. In many cases, FTIR involves attenuated total reflection (ATR), which requires direct sample contact. This technique is useful for surface measurements but cannot provide information of a sample's interior nor is it suitable for in situ monitoring applications. Alternatively, conversion of the bulk polymer can be monitored in the near-IR range through transmission measurements, which can be adapted for in-line process monitoring. While effective for monitoring both physical and chemical properties of polymers, near-IR spectra contain overlapping overtones and combinations of bands from the mid-IR that often require nontrivial post-processing and chemometric data analysis.

Raman spectroscopy has been used to study the real-time kinetics of different polymerization reactions such as those of microemulsions and epoxy resin systems. Raman is a sensitive probe of nonpolar molecules, and as a noncontact, non-destructive technique, it is suitable for in situ monitoring of cure kinetics. Raman spectra can be subdivided into three main regions known as the stretch region (>2000 cm$^{-1}$), the chemical fingerprint region (~500 cm$^{-1}$-~2000 cm$^{-1}$), and the structural region (<500 cm$^{-1}$). However, thus far, Raman-based polymerization kinetics studies have focused exclusively on signals in the chemical fingerprint region, such as the methacrylate (C=C) band at ~1640 cm$^{-1}$ and the epoxy band (—CH—O—CH2) at ~1250 cm$^{-1}$.

Raman scattering in the low-frequency (terahertz) region, which is a subset of the structural region, is directly related to the phonon density of states g(v). In highly ordered crystalline materials, acoustic phonon modes produce sharp bands in the Raman spectrum, but as the material becomes less ordered, these modes tend to broaden and redshift simultaneously. For soft amorphous materials, g(v) is dominated by two main features—the Boson and van Hove peaks. In amorphous polymers, the Raman scattering intensity $I_R$(v) can be directly related to g(v) by $$I_R(v) = \frac{C(v)g(v)}{|v|}[n(v, T) + H(v)], \qquad \text{Eq 5}$$

where v is the frequency of the Raman shift, C(v) is the coupling coefficient, n(v, T)=(e$^{hv/k_BT}$−1)$^{-1}$ is the Bose-Einstein distribution function with kB being Boltzmann's constant, h is Planck's constant, and T is the temperature. The Heaviside function H(v)=1 for v≥0, 0 otherwise, accounts for the difference in the probability between the Stokes and anti-Stokes shifted photons.

These phonon modes have been shown to result in a broad (~150 cm$^{-1}$ wide) disorder band in polymers with an apparent peak near 15 cm$^{-1}$ and a well-defined shoulder dominated by the Boson and van Hove peaks, respectively. It was demonstrated that by normalizing the disorder band to the shoulder, the integrated intensity near the peak of the disorder band could be used to measure the effective change in conformational entropy as a polymer goes through the glass transition, without the need for advanced spectral processing or peak fitting.

Here, this same methodology can be applied to measure polymerization kinetics by monitoring the decrease in the normalized disorder band as a resin polymerizes. Since the disorder band in soft amorphous materials is a universal feature, this approach benefits from combining the "chemically agnostic" nature of traditional thermalmechanical analysis methods with the non-contact, nondestructive nature of laser-based vibrational spectroscopy. Herein, the universality of this technique is demonstrated by detecting transient structural changes during the curing process of methacrylate, epoxy-amine, and dual-cure methacrylate/epoxy interpenetrating polymer network (IPN) resins.

Materials and Methods

Materials and Sample Preparation

Figure 6:
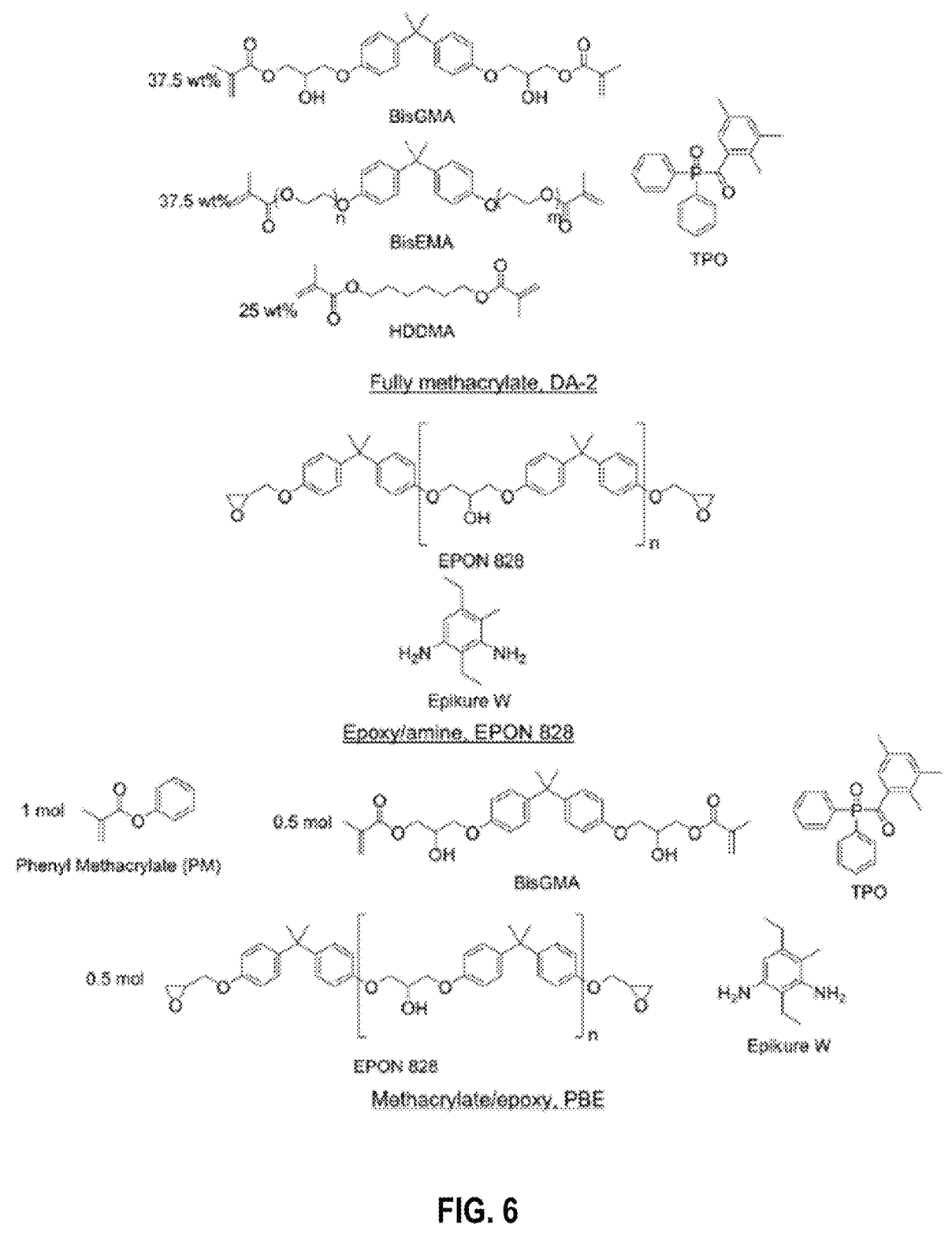

Three resins were formulated for this Example to represent a wide array of materials: fully methacrylate, epoxy-amine, and methacrylate/epoxy. Resins were prepared such that the methacrylate functionalities polymerized via photoinitiated free radical polymerization and the epoxy-amine components cured thermally. FIG. 6 shows the components of each resin formulation.

A fully methacrylate resin (DA-2) was prepared from 37.5 wt % bisphenol A glycerolate dimethacrylate, 37.5 wt % ethoxylated bisphenol A dimethacrylate, and 25 wt % 1,6-hexanediol phosphine oxide was added as a photoinitiator at 2 wt % based on the total mass of resin.

An epoxy-amine resin was prepared from a diglycidyl ether of bisphenol A resin (EPON 828) and a diethylmethylbenzenediamine resin. The epoxy equivalent weight (EEW) for EPON 828 was 186.1 g eq.$^{-1}$ and the amine hydrogen equivalent weight (AHEW) of Epikure© W was 44.6 g eq.$^{-1}$. These components were formulated with 1:1 equivalents of epoxide to amine hydrogen. The epoxy-amine resin is herein referred to as EPON 828.

A dual-cure methacrylate/epoxy IPN resin was prepared by combining methacrylate and epoxy-amine resin components. The epoxy-amine component was prepared with EPON 828 and Epikure© W with 1:1 equivalents of epoxide to amine hydrogen. Phenyl methacrylate, Bisphenol A diglycidyl methacrylate (BisGMA), and the epoxy-amine were formulated based on 1:0.5:0.5 molar equivalents, respectively. This resin formulation is denoted as PBE. TPO was added as the photoinitiator at 2 wt % based on the total resin.

All resin formulations were mixed with an ARE-310 planetary mixer programmed for 10 min at 2000 rpm to mix and 5 min at 2200 rpm to defoam. This mixing cycle was repeated until all components were fully dispersed homogenously (2-3 cycles). After mixing a given formulation, resin was applied onto a 4×6×0.020 in$^3$ steel test panel and spread with an adjustable film coater set to a thickness of 500 μm. A 25×25×0.15 mm$^3$ glass cover slip was then placed on top of the resin to mitigate oxygen inhibition at the surface, and the excess resin was removed.

Experimental Setup

Figure 7:
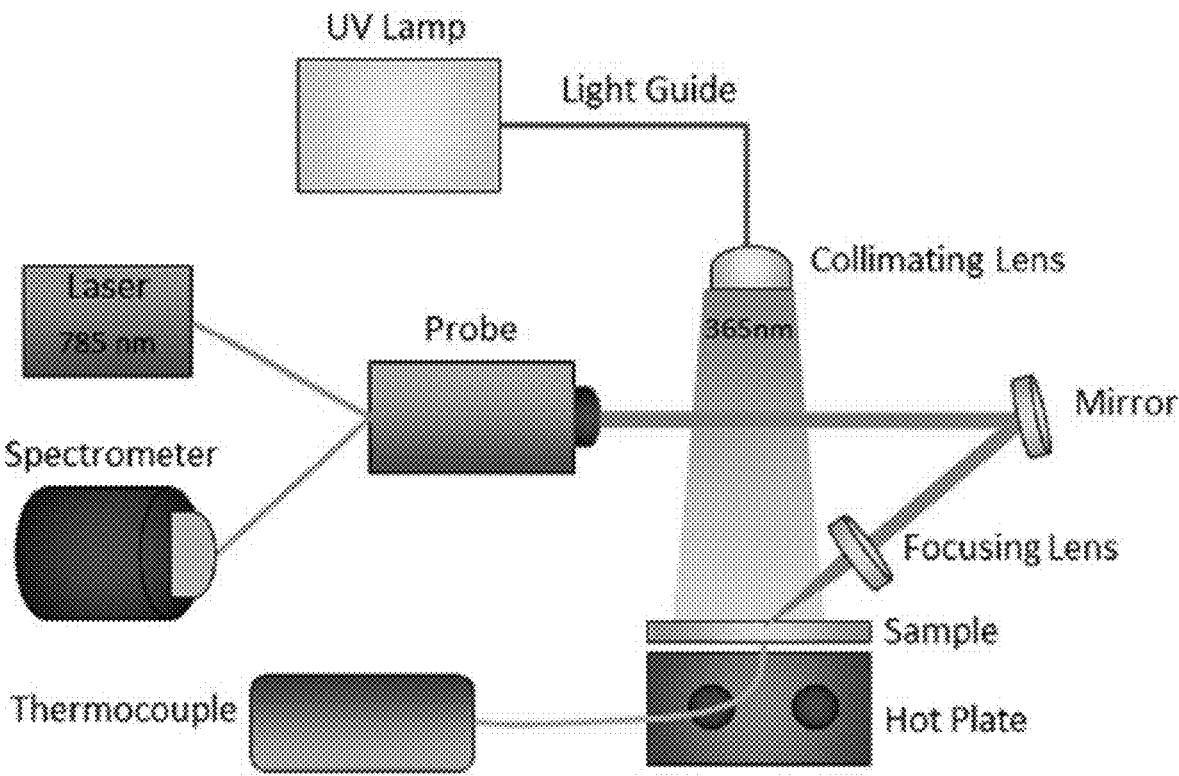
FIG. 7 is schematic representation of Raman kinetics experimental set-up, according to some embodiments.

The experimental setup, shown schematically in FIG. 7, enabled in situ real-time polymerization kinetics monitoring of photo, thermal, and sequential photo-thermal cure. This was accomplished with a 0.25-in thick aluminum plate with an embedded thermocouple seated on top of a hot plate as the sample platform. Light was passed through a 365 nm bandpass filter, fiber-coupled to a large core "light pipe", and then collimated directly above the sample platform to allow for relatively uniform illumination of the resins. The Raman scattering measurements were one with a 785 nm laser and probe with a 37.5 mm focal length aspheric lens for both excitation and collection. The probe can filter both Stokes and anti-Stokes Raman scattering to within approximately ±7 cm$^{-1}$ of the Rayleigh line. The scattered light was then fiber-coupled directly into an EAGLE Raman-S high-throughput transmission (f/1.6) spectrograph. Raman scattered light was collected with a deep depleted back-illuminated thermoelectrically cooled (−60° C.) CCD camera with a 950 ms integration time. The UV illumination intensity was controlled by a combination of lamp settings and adjustments to the height between the collimating lens and the sample platform, and the light intensities were measured with a power meter.

Data Processing and Analysis

All Raman spectra were analyzed with MATLAB code that included an adaptive, iteratively reweighted Penalized Least Squares algorithm for baseline correction for data in the chemical fingerprint region. No baseline correction was used in the structural region. Cosmic rays and other anomalous spikes in the spectra were removed. The conversion $\alpha$ was calculated from the following relationship, $$\alpha = \frac{\left(\frac{I_{var}}{I_{ref}}\right)_{unreacted} - \left(\frac{I_{var}}{I_{ref}}\right)_{reacted}}{\left(\frac{I_{var}}{I_{ref}}\right)_{unreacted}}, \qquad \text{Eq 6}$$

where the regions $I_{var}$ and $I_{ref}$ are the integrated intensities of the variable and reference peaks respectively. For structural kinetics, the variable and reference peaks were chosen to be the peak (~14 $cm^{-1}$) and shoulder (~85 $cm^{-1}$) of the disorder band, respectively. For the fingerprint region, the variable and reference peaks varied according to the polymer. For methacrylate kinetics, the variable and reference peaks were the aromatic CCH quadrant stretch (~1605 $cm^{-1}$) and the C=C stretch (~1637 $cm^{-1}$), respectively. For epoxy-amine kinetics, the variable and reference peaks were the epoxy ring breathing mode (~1250 $cm^{-1}$) and the phenyl band (~1109 $cm^{-1}$), respectively. All integrated intensities were determined with bounds of ±7 $cm^{-1}$ of the line center.

Conversion data were fit with linear least squares regression to the integrated form of the following kinetic rate equation, $$\frac{d\alpha}{dt} = k(\alpha_u - \alpha)^n, \qquad \text{Eq 7}$$

where $\alpha_u$ is the ultimate conversion, k is the rate constant, and n is the reaction order.

When performing Raman spectral band fitting, the data were corrected for filter and spectrometer roll-off by calibration with a broadband white light source in the region between ±200 $cm^{-1}$. Then the spectra were normalized for Stokes scattering and fitted to the following first principles model, $$I(v) = \frac{I_{QERS}}{2\pi} \frac{\Delta v_{QERS}}{v^2 + \left(\frac{\Delta v_{QERS}}{2}\right)^2} +$$

$$\left\{ \frac{\gamma I_{BP}}{2\sqrt{\pi}\,\xi_{BP}} e^{-\left[\frac{1}{4\gamma^2} + \left(\gamma \log\frac{|v|}{\xi_{BP}}\right)^2\right]} + \frac{I_{NM}}{2\sqrt{\pi}\,\Delta\xi_{NM}} e^{-\left(\frac{v-|\xi_{2NM}|}{2\Delta\xi_{NM}}\right)^2} \right\}$$

$$\left[ H(v) + H(-v)\left(\frac{v_0 - v}{v_0 + v}\right)^3 e^{\left(\frac{hv}{k_B T}\right)} \right],$$

with the default nonlinear least squares method from the MATLAB curve fitting toolbox. In Eq 8, I is the integrated intensity of the mode, $v_0$ is the frequency of the incident radiation, $\Delta v$ is the full-width half maximum, $\xi$ is related to the peak position, and $\gamma$ is a constant relating to the width and frequency of the Boson peak. The subscripts QERS, BP, and NM denote the three different contributions to the fit, namely quasi-elastic Rayleigh scattering, Boson peak, and normal modes, respectively.

Results and Discussion

UV Cured Methacrylate Resin

Figure 8A:
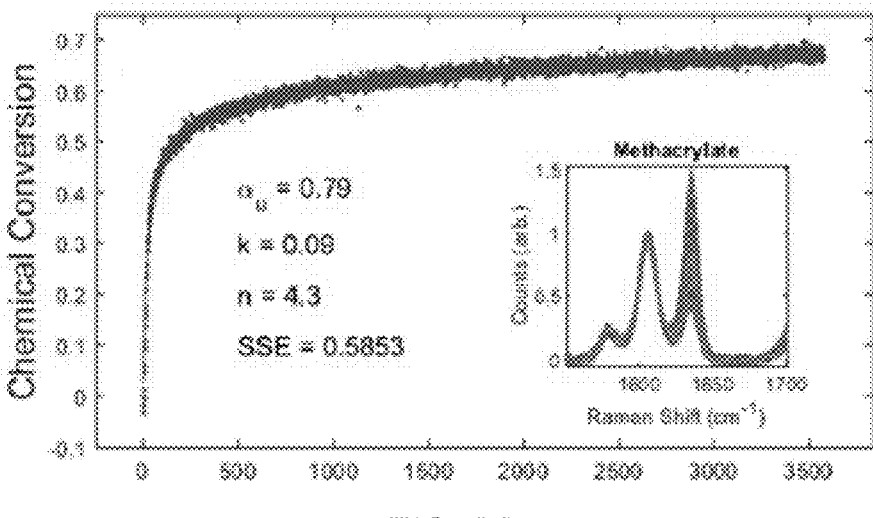
FIGS. 8A-8C are graphical representations of DA-2 resin photocure kinetics obtained from the chemical region of the Raman spectrum with inset showing the methacrylate (variable) and phenyl (reference) peak (FIG. 8A), the structural region with inset showing the normalized disorder band (FIG. 8B), and an overlay of the chemical conversion kinetics and the structural kinetics scaled by c=1.39 (FIG. 8C), with the inset showing the proportionality across the entire cure, according to some embodiments.

First, the cure kinetics of the DA-2 formulation were analyzed. FIG. 8A illustrates the methacrylate conversion based on the Raman results from the chemical region for measurements done with a 365 nm light source with an illumination intensity of 0.76 mW $cm^{-2}$. An unconstrained fit of the chemical conversion data resulted in $\alpha_u$=0.79, k=0.09, and n=4.3 with a sum square error, SSE, of 0.59. The previous FTIR analysis of DA-2 with 0.7 wt % phenylbis(2,4,6-trimethylbenzoyl)phosphine oxide as the photoinitiator, under various illumination intensities at a wavelength of 405 nm yielded $\alpha_u$=0.74 and k=4.4. The k values cannot be compared as the previous analysis modified the rate constant by including an intensity dependent prefactor in the kinetic rate equation:

$$\frac{d\alpha}{dt} = I_E^\omega k(\alpha_u - \alpha)^n,$$

where $I_E$ is the light intensity and $\omega$ the dose rate exponent with a reported value of 0.71.

Figure 8B:
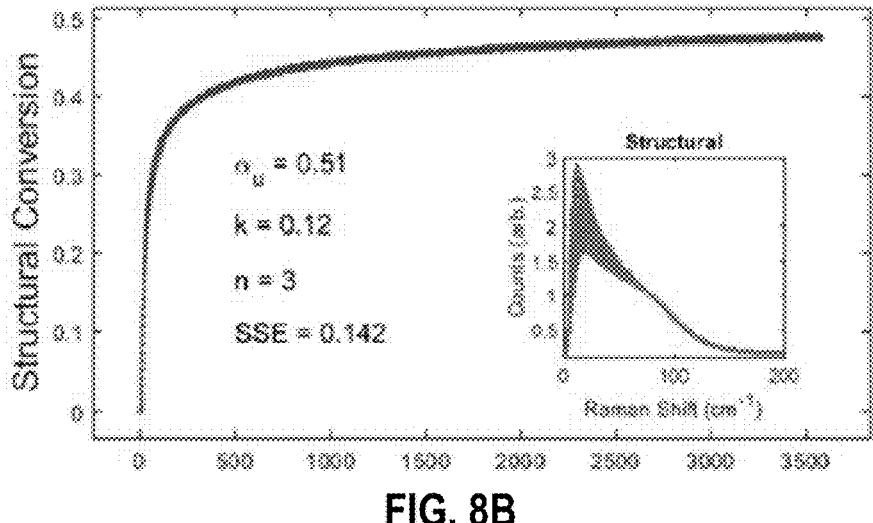
Figure 8C:
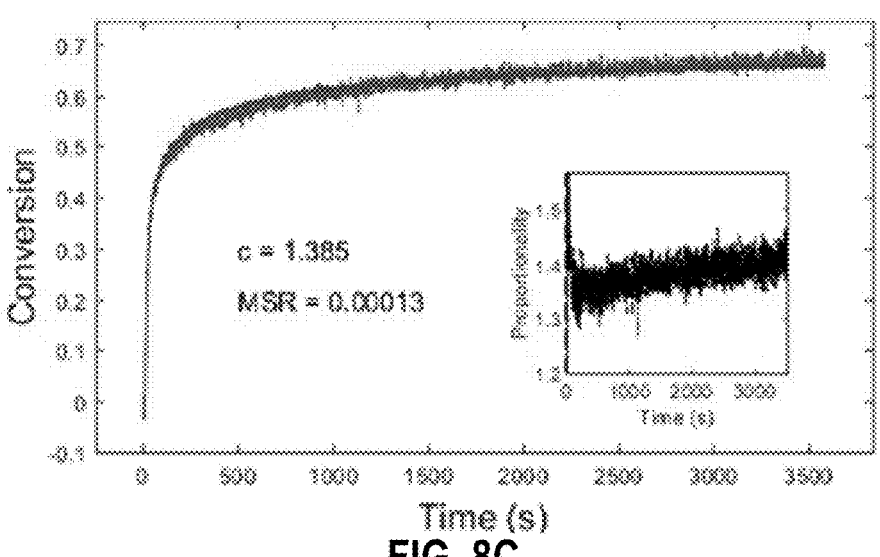

Visual inspection of the structural kinetics data, as shown in FIG. 8B shows the same general shape of the curve, with an improved signal-to-noise ratio. It should be noted that an unconstrained fit produced kinetic constants of $\alpha_u$=0.51, n=3.0, and k=0.12 with an SSE of 0.14, which do not match the chemical kinetics values. This is not unexpected since chemical conversion is a direct measure of monomer polymerization whereas structural conversion reflects the change in phonon dispersion. Therefore, the conversion values do not have the same physical meaning in structural kinetics as they do in chemical kinetics. However, As shown in FIG. 8C, there is a scaling factor c=1.39 between the chemical and structural conversion curves of DA-2 with a mean square residual, MSR, of 0.0001. Over the course of 12 different DA-2 experiments with light intensities ranging from 0.22-1.08 mW $cm^{-2}$ it was found that the scaling constant was robust with a value of c=1.40±0.02. That is, while the kinetic constants appear to be significantly different, the curves actually only differ by a scaling factor due to the differences in what is being probed.

Thermally Cured Epoxy-Amine Resin

Next, the EPON 828 thermally cured at 180° C. was analyzed. Results shown in FIGS. 9A-9C demonstrate the ability to generate both chemical and structural conversion curves. Unconstrained fitting produced kinetic constants of $\alpha_u$=0.88, k=0.002, and n=1.2 for the chemical conversion, and $\alpha_u$=0.58, k=0.01, and n=2.1 for the structural conversion. Due to the combination of low Raman scattering efficiency and the broad overlapping shape of peaks in this region, the chemical conversion is inherently noisy (see FIG. 9A) with a large SSE of 24.11. By contrast, the noise in the structural conversion data (see FIG. 9B) is comparable to that of the data of the UV-cured resin system. FIG. 9C gives c=1.57 for the two curves with an MSR of 0.0025, further demonstrating the self-consistency between the chemical and structural kinetics. It should be noted that, unlike the DA-2 resin where the proportionality constant settled in under 1 min, the EPON 828 took nearly 15 min before the proportionality constant stabilized. Over the course of 10 different experiments with the EPON 828 system with ~180° C. cure temperature, the average proportionality constant was c=1.71±0.26.

It should also be noted that in some of the EPON 828 experiments there was an apparent initial dip in the structural conversion, likely due to a transient drop in viscosity prior to gelation. For the purposes of calculating the c values, the conversion curves were truncated to remove any such initial drops, if necessary.

Upon peak fitting, the relative contributions to the disorder band were determined from the quasi-elastic Rayleigh scattering, Boson peak, and normal mode dominated by the van Hove peak. FIGS. 10A-10D illustrate the fitted results at the end of the cure for both resin formulations, demonstrating the simultaneous blueshift and decrease in the Boson peak after cure. It is important to note that EPON 828 is softer than the DA-2, with the two polymers having reported storage moduli of 2.1 GPa and 3.0 GPa, respectively and EPON 828 is cured at elevated temperatures, further softening it which accounts for the difference in the final Boson peak locations: 12 cm$^{-1}$ for EPON 828 and 16 cm$^{-1}$ for DA-2. Nonetheless, these differences in the phonon dispersion have no noticeable impact on the applicability of this method to measure the polymerization of the two resin systems, but the difference in moduli likely contributes to the difference in the c values between the two resin systems.

Dual-Cure IPN Resin

Lastly, to investigate the universality of the method, the PBE dual-functional IPN resin system was analyzed. FIGS. 11A-11D illustrates the results of both the methacrylate, epoxy, and structural conversions at room temperature over a 1 hour exposure to 365 nm light with an intensity of 1.01 mW cm$^{-2}$. Using the same methodology as the previous resin, both chemical (methacrylate and epoxy) and structural conversion can be measured. Unconstrained fitting produced kinetic constants of $\alpha_u$=0.76, k=0.01, and n=1.8 for the methacrylate chemical conversion and $\alpha_u$=0.40, k=0.02, and n=2.0 for the structural conversion. As expected, there was no observable epoxy chemical conversion (see FIG. 11B). Both the methacrylate chemical and structural conversion fits had a relatively low SSE of 1.92 and 0.24, respectively.

Figure 11A:
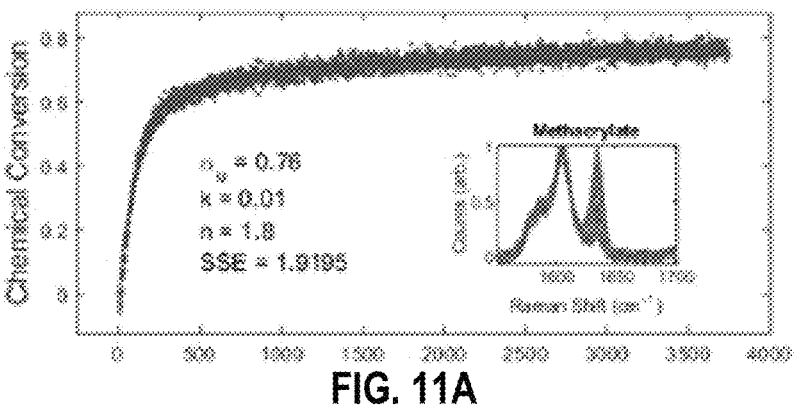
FIGS. 11A-11D are graphical representations depicting PBE photocure kinetics obtained using the methacrylate chemical region of the Raman spectrum with inset showing the methacrylate (variable) and phenyl (reference) peaks (FIG. 11A), (b) the epoxy chemical region of the Raman spectrum with inset showing the epoxied (variable) and phenyl (reference) peaks (FIG. 11B), the structural region with inset showing the normalized disorder band (FIG. 11C), and an overlay of the chemical conversion kinetics and the structural kinetics scaled by $c=1.95$ with the inset showing the proportionality across the entire cure (FIG. 11D), according to some embodiments.
Figure 11B:
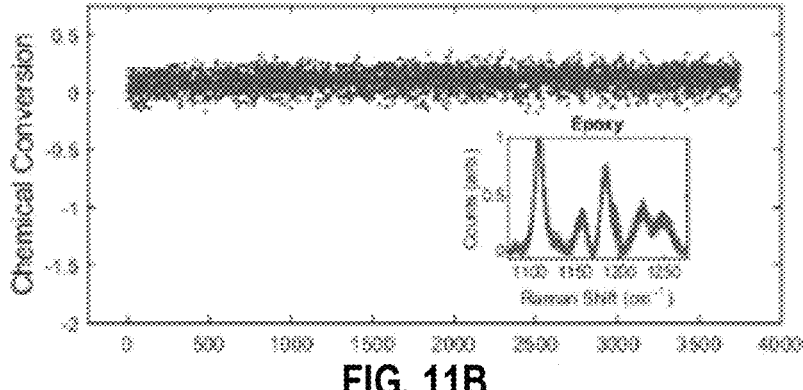
Figure 11C:
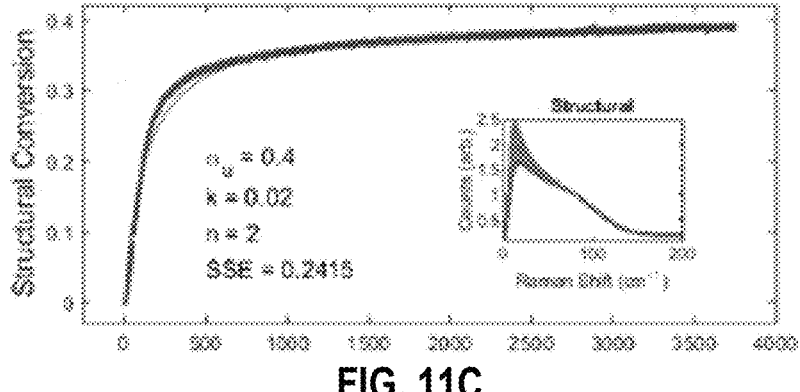
Figure 11D:
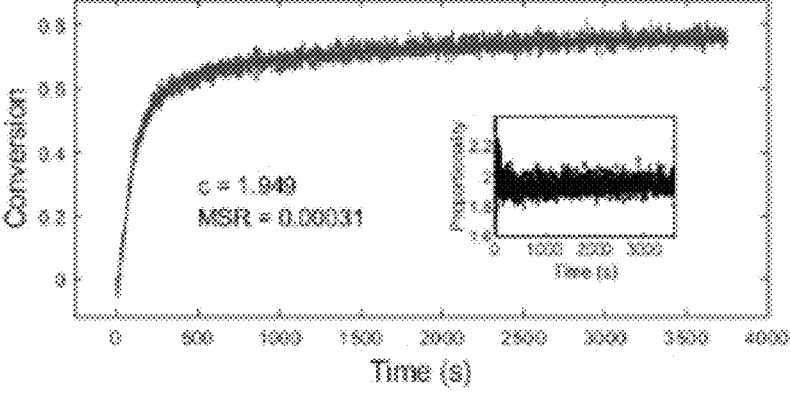

FIG. 11D illustrates that for the methacrylate fingerprint and structural conversion curves c=1.95 with an MSR of 0.0003. Over the course of 14 different PBE experiments (see ESI Table S.3†) with light intensities ranging from 0.21-1.03 mW cm-2, it was found that c=1.98±0.02. In addition to further validating the self-consistency between the chemical and structural conversions, this is also in accord with the predicted correlation between the modulus and the proportionality constant. Since the PBE resin was not thermally post-cured, the epoxy-amine network was not able to form, resulting in a significantly softer material and, therefore, a higher proportionality constant. Upon peak fitting, the final Boson peak position of the photocured PBE resin was determined to be 16 cm$^{-1}$, which is identical to the results of the fully methacrylate DA-2 resin.

Figure 12:
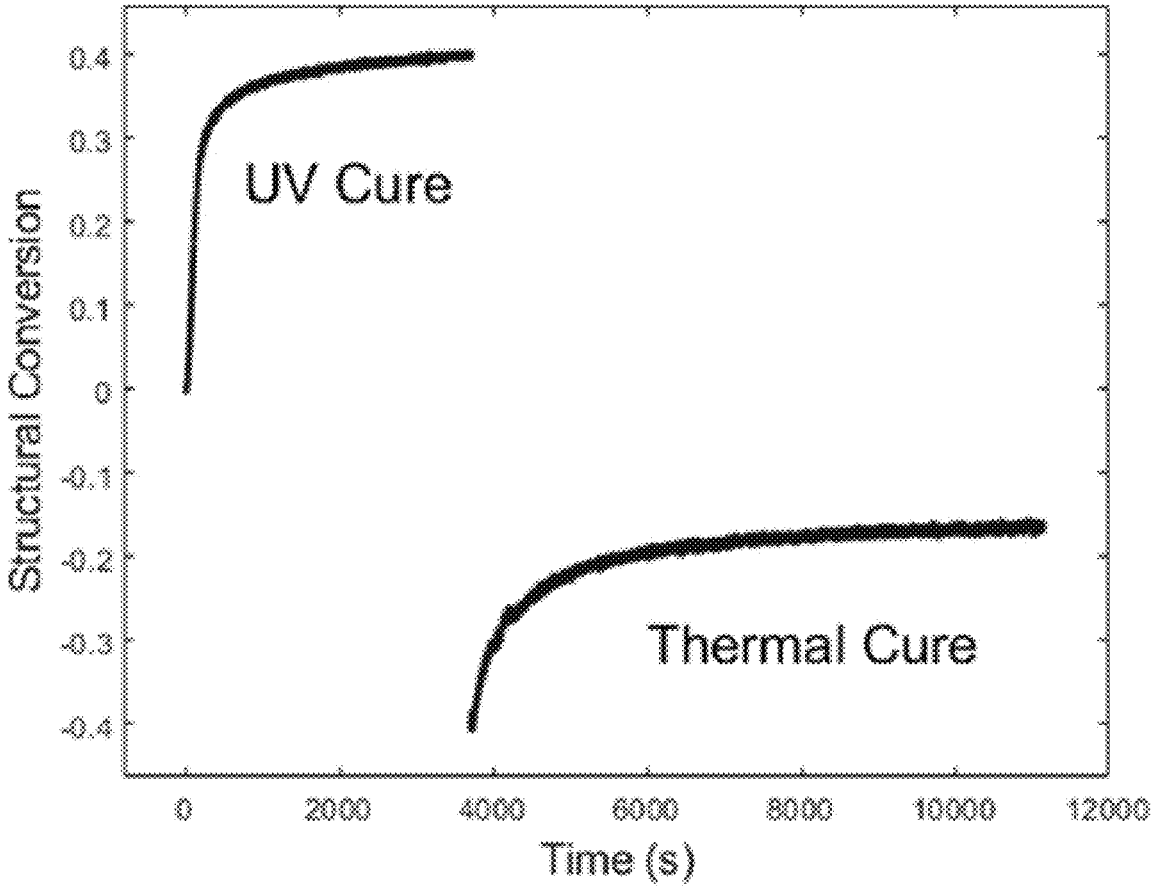
FIG. 12 is a graphical representation depicting PBE dual ultraviolet-thermal (UV-thermal) cure kinetics obtained using structural region, according to some embodiments.

Lastly, the PBE resin through the entire dual cure process was evaluated. First it was photocured with an illumination intensity of 1.02 mW cm$^{-2}$ for 1 hour, at which time the UV lamp was turned off, and data collection was paused. The sample was removed while the stage was heated to 180° C. The sample was then placed back on the temperature stage, and data collection was resumed for 2 hours, simulating a traditional post-cure in a preheated oven. FIG. 12 illustrates the change in the spectral weight of the disorder band, which reflect the kinetics of both the UV and thermal cures. It is believed that the sizeable negative step discontinuity in the data is due primarily to the temperature dependence of the low-frequency Raman signal, as shown in eqn (1) and (4).

The UV and thermal cure regions were independently analyzed to gain a deeper insight into the cure kinetics. During the photocure, no measurable conversion was present from the epoxy. The kinetic constants from the methacrylate chemical conversion were $\alpha_u$=0.79, k=0.010, and n=1.83 with an SSE of 1.72, and the kinetic constants from the structural conversion were $\alpha_u$=0.39, k=0.010, and n=1.4 with an SSE of 0.34. The methacrylate-to-structural proportionality constant was c=1.97. As expected, these results are extremely close to those shown in FIGS. 6A-6D.

Figure 13A:
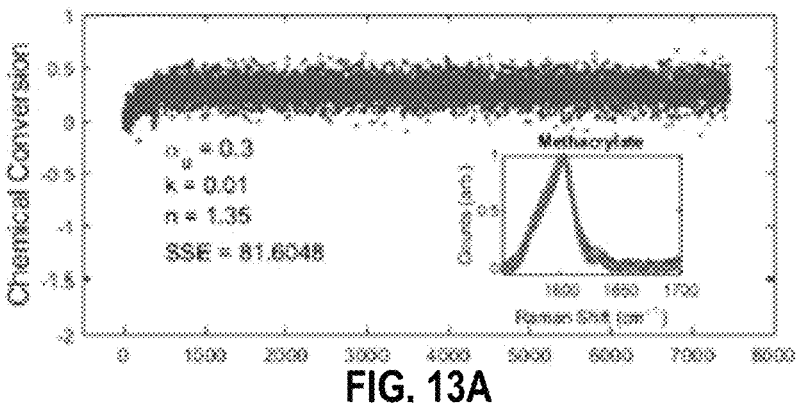
FIGS. 13A-13D are graphical representations depicting PBE thermal (secondary) cure kinetics obtained using the methacrylate chemical region of the Raman spectrum with inset showing the methacrylate (variable) and phenyl (reference) peaks (FIG. 13A), the epoxy chemical region of the Raman spectrum with inset showing the epoxied (variable) and phenyl (reference) peaks (FIG. 13B), the structural region with inset showing the normalized disorder band (FIG. 13C), and an overlay of the chemical conversion kinetics and the structural kinetics scaled by $c=5.34$ with the inset showing the proportionality across the entire cure (FIG. 13D), according to some embodiments.

The thermal cure kinetics unveiled several interesting kinetic processes beyond simple epoxy-amine polymerization. Additional methacrylate polymerization during the first 500 second of the thermal cure was observed (as shown in FIG. 13A). It is believed this may result from increased chain mobility above the glass transition temperature and increased internal energy allowing the release of trapped free radicals from dissolved oxygen. The kinetic constants for the additional methacrylate conversion of $\alpha_u$=0.3, k=0.010, and n=1.35 were determined; although it should be noted that the data were quite noisy, resulting in an SSE of 81.6. Still, an additional cure of 0.3 indicates a 30% increase over the photocure, which had an ultimate cure of 0.79, implying complete methacrylate conversion after thermal processing.

Figure 13B:
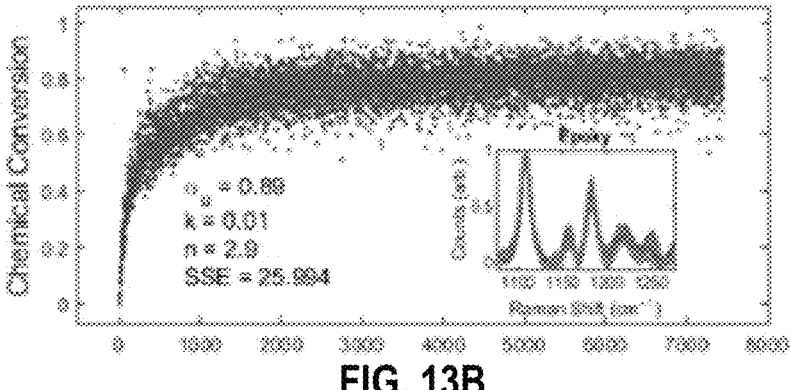
Figure 13C:
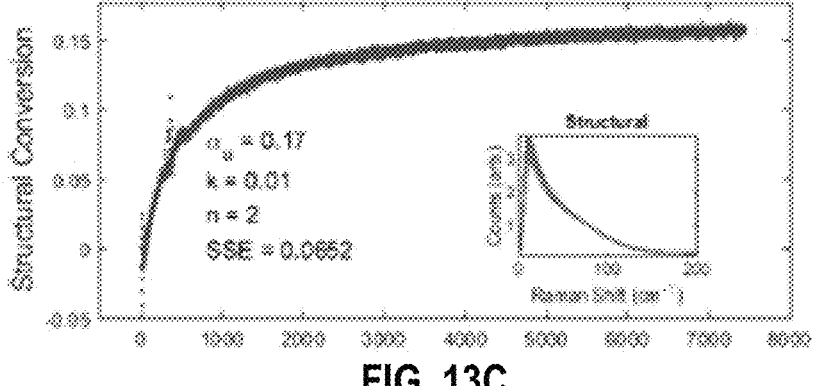
Figure 13D:
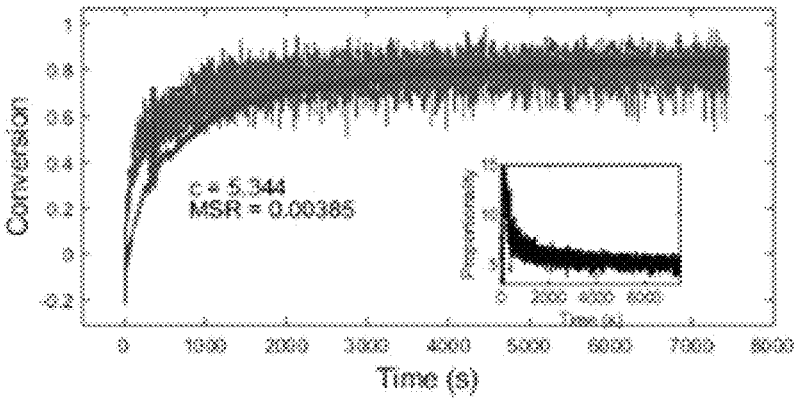
Figures 17A, 17B, 17C, 17D:
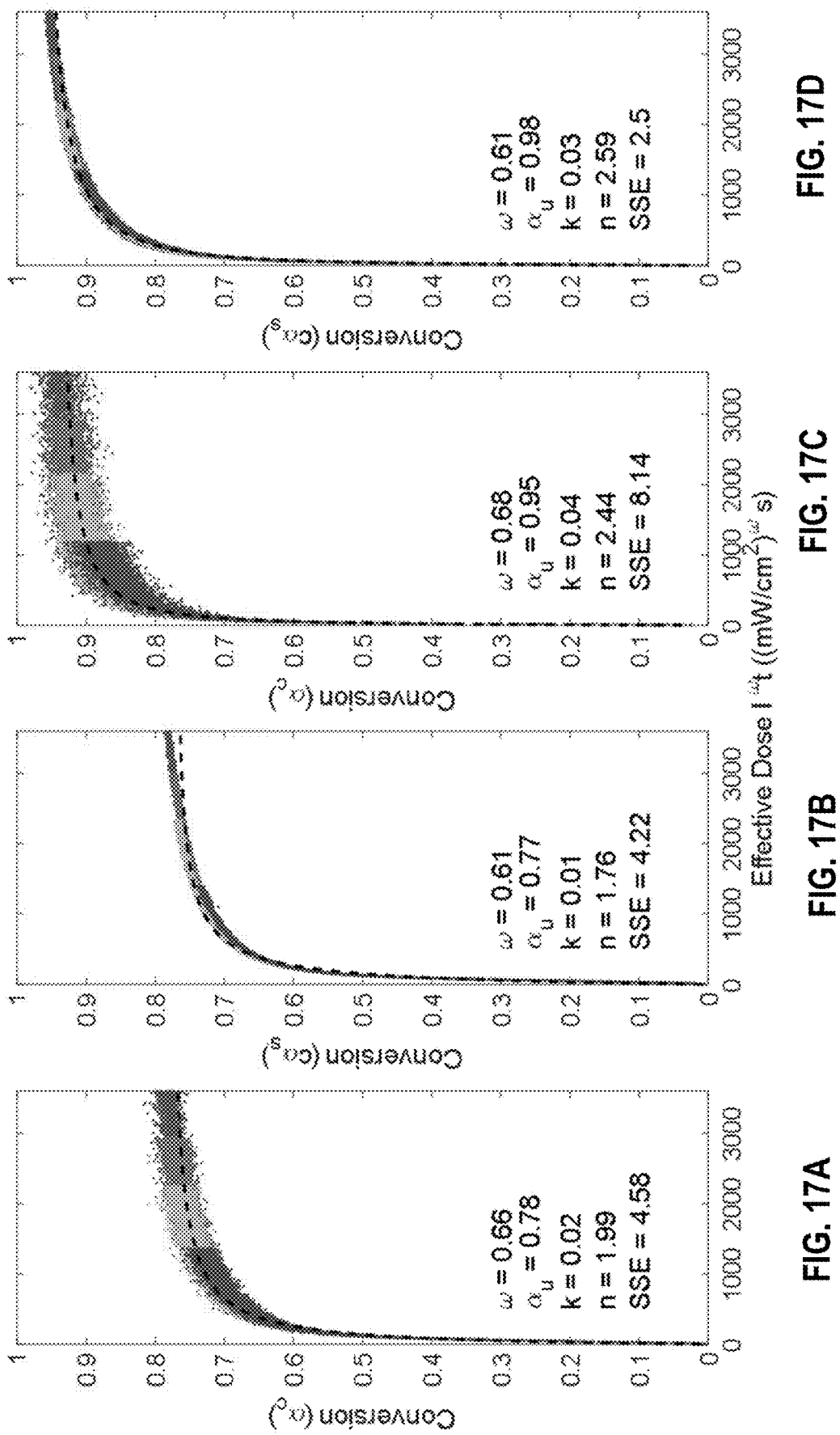

During the thermal cure, the epoxy chemical conversion was given by kinetic constants $\alpha_u$=0.89, k=0.010, and n=2 with an SSE of 25.99 (as shown in FIG. 13B), and the kinetic constants from the structural conversion were $\alpha_u$=0.17, k=0.010, and n=2 with an SSE of 0.07 (as shown in FIG. 13C). As illustrated in FIG. 13D, the structural conversion appears to lag the chemical conversion for the first half hour of the thermal cure. It is believed that this is an indication that during the initial polymerization of the secondary network (epoxy-amine), the modulus is still dominated by the primary network (methacrylate), resulting in slower structural kinetics. However, since both curves tend to overlap after approximately 70% conversion, it seems that once the secondary network has sufficiently percolated through the primary network, the epoxy polymerization eventually begins to correlate directly with changes in the modulus.

Conclusion

These results demonstrate the applicability of utilizing the disorder band present in the low-frequency region of the Raman spectra as a measure of the polymer extent of cure. This band is a universal feature of amorphous materials, providing a noncontact and chemically agnostic methodology for determining polymerization kinetics. Through the use of the structural-to-chemical proportionality constant, the ability to correlate the decrease in the overall disorder of the material and the reduction in the bond concentration of polymerization reactive functional groups was demonstrated. The large Raman scattering efficiency in the low frequency provides a noticeable improvement in the signal-to-noise ratio.

Example 3: Influence of Rheological Modifications on Primary Network Chemical and Structural Cure Kinetics for an Interpenetrating Polymer Network Resin This Example presents a follow-up to Example 2 with two chemically identical but rheologically distinct interpenetrating polymer network (IPN) resin systems to further investigate the relationship between the chemical, structural, and rheological conversion throughout the curing process. The scope is purposefully limited to the primary network formation of these two IPN resins, eliminating any changes in g(v) and $I_R$(v) associated with the non-isothermal nature of the secondary network formation. Rheological analysis demonstrates a correlation between structural conversion and storage modulus, which is not present in chemical conversion. It is shown herein that one can produce master cure kinetics curves with comparable kinetic constants using both the chemical and structural conversion methodologies. Parametric analysis of the structural conversion, chemical conversion, and photorheological conversion was combined with a semi-empirical model for the storage shear modulus as a function of extent of cure.

Materials and Methods

Resin Formulation

Figure 14:
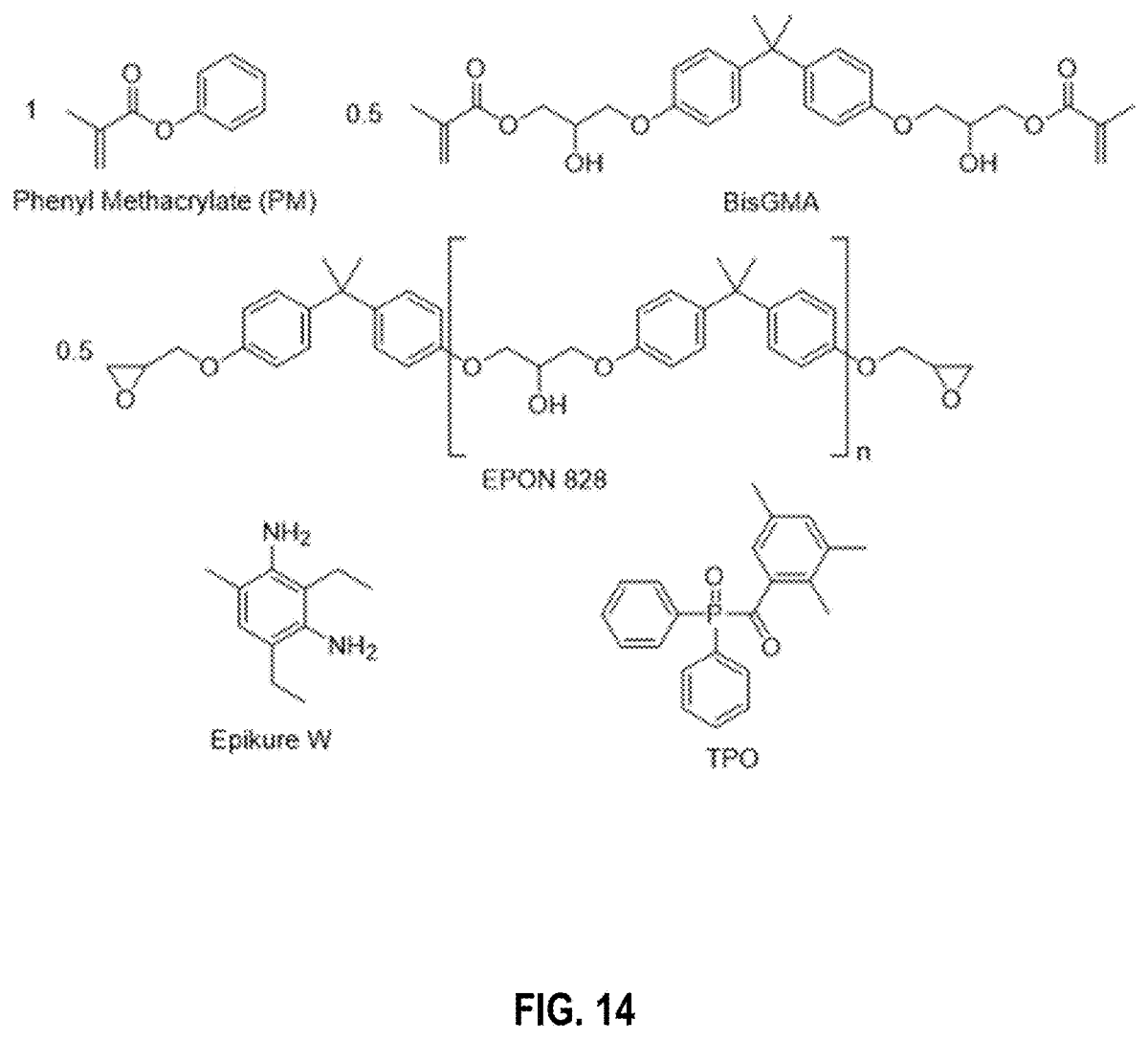

For this Example, a dual-cure methacrylate-epoxy IPN resin was used, which was prepared by combining commercially available methacrylate and epoxy/amine resin components. The epoxy/amine component was prepared from a diglycidyl ether of bisphenol A resin (EPON 828, Hexion) and a diethylmethylbenzenediamine resin. The epoxy equivalent weight (EEW) for EPON 828 was 186.1 g/eq and the amine hydrogen equivalent weight (AHEW) of diethylmethylbenzenediamine resin was 44.6 g/eq. These components were formulated with 1:1 molar equivalents of epoxide to amine hydrogen. Phenyl methacrylate (inhibited with 100 ppm of hydroquinone), bisphenol A glycerolate dimethacrylate (BisGMA, Esstech), and the epoxy/amine were formulated based on 1:0.5:0.5 molar equivalents, respectively. Diphenyl(2,4,6-trimethylbenzoyl) phosphine oxide (TPO, >98%, TCI America) was added as the photoinitiator at 2 wt % based on the total resin (see FIG. 14). This resin formulation is denoted as PBE-unfilled. A second formulation was produced based on the procedure originally developed for direct ink write printability by Lehman-Chong with the addition of 4 wt % carboxyl terminated butadiene nitrile rubber (CTBN, 10% acrylonitrile, 2.47% carboxyl, approx. MW 19,000 g/mol, Scientific Polymer Products Inc.) and 7 wt % fumed silica (Acrosil 200, Spectrum Chemical Mfg. Corp.). This resin formulation is denoted as PBE-filled. All resin formulations were mixed with an ARE-310 planetary mixer programmed for 10 min at 2000 rpm to mix and 5 min at 2200 rpm to defoam. This mixing cycle was repeated until all components were fully dispersed homogenously based on visual inspection (2-3 cycles).

Raman Measurements

After mixing, the resin was applied onto a 4×6×0.020 in³ steel test panel and spread with an adjustable film coater set to a thickness of 500 μm for PBE-unfilled and 300 μm for PBE-filled. The layer thicknesses were chosen to not exceed the penetration depth of the illumination source. A 25×25× 0.15 mm³ glass cover slip was then placed on top of the resin to mitigate oxygen inhibition at the surface, and the excess resin was removed. Light from a high-power mercury vapor source was passed through a 365-nm bandpass filter, fiber-coupled to a large core "light pipe," and then collimated directly above the sample platform to allow for relatively uniform illumination of the resins. The Raman scattering measurements were done with a 785-nm laser and probe with a 37.5-mm focal length aspheric lens for both excitation and collection. The scattered light was then fiber-coupled directly into an EAGLE Raman-S high-throughput transmission (f/1.6) spectrograph. Raman scattered light was collected with a deep depleted back-illuminated thermoelectrically cooled (−60° C.) CCD camera with a 950-ms integration time. The UV illumination intensity was controlled by a combination of lamp settings and adjustments to the height between the collimating lens and the sample platform, and the light intensities were measured with a power meter.

Photorheology Measurements

Photorheology was performed with a hybrid rheometer and the same 365-nm filtered fiber-coupled light source. A geometry consisting of a disposable 20-mm diameter aluminium top plate and 20-mm diameter acrylic bottom plate was used. The light intensity was calibrated with a radiometer. Experiments were conditioned with axial force adjustment and conducted isothermally at 25° C. Unless otherwise stated in the results and discussion, an oscillation method in fast sampling mode was used with a 0.3% strain, 1.0 Hz frequency, and 10.0 μN·m torque, and the geometry gap was set to 100 μm. For each experiment, the sample first oscillated without UV irradiation, and then the lamp was turned on at 30 seconds to irradiate the sample for the remaining duration of the experiment.

Results and Discussion

To verify the rheological differences between the two resin formulations the initial loss and storage shear moduli, G" and G', respectively of ten different samples of each formulation were measure (as shown in FIG. 19A and FIG. 19B). The averaged value of $$\frac{G''}{G'}$$

was determined to be 92.2±30.6 for the PBE-unfilled samples and 0.3±0.1 for PBE-filled samples. Viscosity as a function of shear rate was also measured for PBE-unfilled and PBE-filled samples with a 1° 20-mm cone and plate geometry with a 30-μm gap at 25° C. The shear rate was increased logarithmically from 0.001 to 1000 Hz and then decreased from 1000 to 0.001 Hz. As shown in FIG. 20, the PBE-unfilled resin displayed Newtonian behavior between 0.1 and 1000 Hz with an average viscosity of 1.3±0.1 Pa·s, while the PBE-filled resin displayed non-Newtonian shear thinning with average viscosities of 4.4 kPa·s at 0.1 Hz and 4.8 Pa·s at 1000 Hz. The rheological behavior of both resins is consistent with expectations based on the previous reports for a similar resin formulation.

Raman measurements were performed in triplicate for each resin system during 1-h cures at four different illumination intensities—0.20, 0.50, 0.75, and 1.00 mW/cm². All Raman spectra were analyzed with custom MATLAB© code which included an adaptive, iteratively reweighted, Penalized Least Squares algorithm for baseline correction for data in the chemical fingerprint region. No baseline correction was utilized in the structural region.

The conversion α was calculated from the following relationship, $$\alpha = \frac{\left(\frac{I_{var}}{I_{ref}}\right)_{unreacted} - \left(\frac{I_{var}}{I_{ref}}\right)_{reacted}}{\left(\frac{I_{var}}{I_{ref}}\right)_{unreacted}}, \qquad \text{Eq 9}$$

where the regions $I_{var}$ and $I_{ref}$ are the integrated intensities of the variable and reference peaks, respectively. For structural kinetics, $\alpha = \alpha_s$ and the variable and reference peaks selected were the peak ($\sim 14$ cm$^{-1}$) and shoulder ($\sim 85$ cm$^{-1}$) of the disorder band, respectively. For chemical kinetics, $\alpha = \alpha_c$ and the variable and reference peaks were the aromatic CCH quadrant stretch ($\sim 1605$ cm$^{-1}$) and the C=C stretch ($\sim 1637$ cm$^{-1}$), respectively. All integrated intensities were determined with bounds of $\pm 7$ cm$^{-1}$ of the line center. Example spectra are shown in FIG. 21A and FIG. 21B.

The averaged conversion curves for each illumination intensity are shown in FIGS. 15A-15D. The chemical-to-structural proportionality constant c, defined as the mean of $$\frac{\alpha_c}{\alpha_s}$$

from 100 s to 3600 s, is tabulated for all eight measurements in Table 1. For the PBE-unfilled resin system, c was relatively stable regardless of illumination intensity and is consistent with the previously reported value c=1.98±0.02. For the PBE-filled resin system, c ranged from 2.40 to 2.60 trending upward as the illumination intensity was decreased. The overall increase in c is likely due to the addition of the non-reactive fillers which serve to reduce the impact of the primary network formation on the overall modulus of the material. Additionally, while $\alpha_s$ and $\alpha_c$ are proportional to each other during most of the cure, there is a noticeable decrease in $\alpha_s$ during the initial inhibition time of the PBE-filled resin (see FIG. 15D). This deviation, which was similarly reported for thermally cured epoxy resin systems, is not present in $\alpha_c$ for the PBE-filled resin nor in $\alpha_s$ and $\alpha_c$ of the PBE-unfilled resin.

TABLE 1

Chemical to structural conversion proportionality constant c
for PBE-unfilled and PBE-filled at various illumination intensities.

| Intensity (mW/cm2) | 1.00 | 0.75 | 0.50 | 0.20 |
|---|---|---|---|---|
| PBE-unfilled | 1.99 ± 0.03 | 1.97 ± 0.03 | 1.98 ± 0.04 | 1.94 ± 0.05 |
| PBE-filled | 2.40 ± 0.06 | 2.40 ± 0.06 | 2.45 ± 0.07 | 2.60 ± 0.14 |

Photorheology was performed on both resin systems at each illumination intensity for 1 hour (see FIGS. 16A-16D and FIGS. 22A-22H). FIG. 16C shows that G' remains constant prior to activation for the PBE-unfilled resin, whereas FIG. 3d shows a dip in G' of the PBE-filled resin prior to activation for all four measurements. These results correlate with the magnitude of the normalized disorder band observed in the low-frequency Raman spectrum and confirm our hypothesis about softening. This softening may be attributed to additional absorbance of the illumination lamp by the fillers, which in return warms the sample prior to the activation of the polymerization process.

Next, a master cure kinetics curve was generated for each resin system. A phenomenological free radical polymerization reaction rate equation was used, $$\frac{d\alpha}{dt} = I^\omega k (\alpha_u - \alpha)^n, \qquad \text{Eq 10}$$

where I is the illumination intensity, k the reaction rate constant, n the reaction order, and $\alpha_u$ the ultimate conversion. The exponential factor $\omega$ is known as the dose rate dependency, which relates to the radical termination mechanism with $\omega = 0.5$ correlating to bimolecular termination and $\omega = 1$ correlating to unimolecular termination.

To determine $\omega$ the logarithmic form of Equation 10 was used, $$\ln R_p = \omega \ln I + \ln \kappa, \qquad \text{Eq 11}$$

where $$R_p = \frac{d\alpha}{dt} \text{ and } \kappa = k(\alpha_u - \alpha)^n.$$

The kinetic constants for each illumination intensity were determined by first removing the initial oxygen inhibition time from each conversion curve and fitting to the integrated form of Equation 10 with linear least squares regression independent of dose rate. For the chemical kinetics $\alpha = \alpha_c$ and for the structural kinetics $\alpha = c\,\alpha_s$. The data were also fit to a rational polynomial with the default nonlinear least squares method in the MATLAB® curve fitting toolbox and symbolically differentiated to determine $R_p$. The rational fit for both resins systems used a 5$^{th}$ order numerator with a 5$^{th}$ order or 4$^{th}$ order denominator for PBE-unfilled and PBE-filled resins, respectively. $R_p$ was then plotted against $\alpha$ and fit with a spline function to enable the determination of $\omega$ as a function of $\alpha$. The mean value of $\omega$ was then used to rescale conversion as a function of effective dose $I^\omega t$. This allows for all conversion curves from each light intensity to be superimposed onto one master curve, which can then be fitted to the integrated form of Equation 10 to determine the kinetic constants for the master curve. The results of this procedure are shown in FIGS. 23A-23D, FIGS. 24A-24D, FIGS. 25A-25D, and FIGS. 26A-26D. The final master cure kinetics curves are compared side-by-side in FIG. 17A and FIG. 17B for PBE-unfilled chemical and structural kinetics, respectively, and FIG. 17C and FIG. 17D for PBE-filled chemical and structural kinetics, respectively. It should be noted that in the case of PBE-filled structural kinetics, the initial dip in the structural conversion leads to an ambiguity in defining the end of the inhibition time. The zero crossing was used to avoid negative conversion values and to maintain consistency with the other curves.

For the PBE-unfilled and PBE-filled resin systems, the chemical and structural conversion master curves resulted in self-consistent kinetic constants as shown in Table 2. For the PBE-unfilled resin system the uncertainty in $\omega$ and the SSE for the fit were similar for both the chemical and structural kinetics. There was a noticeable decrease in signal-to-noise for the kinetics of the PBE-filled resin, resulting from a combination of increased fluorescence background in the Raman spectra from the fumed silica and CTBN fillers and the reduced volume fraction of methacrylate and phenyl functional groups.

TABLE 2

Master curve fit parameters for PBE-unfilled and PBE-filled resins.

| Resin | Kinetics Type | $\omega$ | $\alpha_u$ | k | n | SSE |
|---|---|---|---|---|---|---|
| PBE-unfilled | Chemical | 0.66 ± 0.11 | 0.78 | 0.02 | 1.99 | 4.58 |
| | Structural | 0.61 ± 0.12 | 0.77 | 0.01 | 1.76 | 4.22 |

TABLE 2-continued

| Master curve fit parameters for PBE-unfilled and PBE-filled resins. | | | | | | |
|---|---|---|---|---|---|---|
| Resin | Kinetics Type | ω | $\alpha_u$ | k | n | SSE |
| PBE-filled | Chemical | 0.68 ± 0.21 | 0.95 | 0.04 | 2.44 | 8.07 |
| | Structural | 0.61 ± 0.13 | 0.98 | 0.03 | 2.59 | 2.50 |

In general, ω trended upward throughout the cure process (see FIG. 23C, FIG. 24C, FIG. 25C, and FIG. 26C). This is consistent with a high degree of bimolecular termination in the early stages of cure due to the low viscosity and high chain mobility, switching to unimolecular termination as the material vitrifies into a glassy state, reducing the likelihood of unterminated chains finding each other. The PBE-filled resin system exhibits a roughly 2.5× increase in $R_p$ when compared to that of the PBE-unfilled resin system (see FIG. 23B, FIG. 24B, FIG. 25B, and FIG. 26B) which is reflected in the accompanying increase in both k and n. It should be noted that there is no apparent shift in the gel point (maximum of $R_p$). This is consistent with the percolation threshold definition of gel point which is purely dependent on monomer functionality. The increased reaction rate of the PBE-filled resin system also correlates with a stark increase in $\alpha_u$ by 17% according to the chemical kinetics and 21% according to the structural kinetics, suggesting that the fumed silica and CTBN fillers are plasticizing the resin and delaying vitrification of the glassy network which allows for higher monomer diffusion.

Lastly, the modulus was analyzed as a function of α to better understand the parametric relationship between $\alpha_c$, $\alpha_s$, and G'. The impact of extent of cure on viscoelastic properties has been of great interest in recent years, and models have been developed for modulus as a function of α based on both observations and first principles. Simultaneous stimulated Brillouin scattering and chemical fingerprint Raman spectroscopy were used to develop a comprehensive rate equation for longitudinal storage modulus M' as a function of both α and $$\frac{d\alpha}{dt}.$$

A first principles approach was taken by using a Prony series expansion of the Kohlrausch-Williams-Watts function to develop a model for both shear modulus G and Young's modulus E as a function of extent of cure, experimentally verifying their results for an epoxy resin system using a combination of DSC, rheology, and dynamic mechanical analysis.

For this Example, the empirical approach of modeling G' as a sigmoidal function was used, where the step change occurs as the resin vitrifies into the glassy state. However, it was observed that a pure sigmoid was insufficient to properly fit the measured data, particularly at higher illumination intensities. It was determined that the addition of a rate dependency term, $$G'_\xi = \gamma\alpha^\xi,$$

was needed where γ is the rate constant and ξ is the rate order. For the current dataset minimal improvements in the SSE values for fits with ξ>1 were observed, therefore deciding on the following model, $$G'(\alpha) = a\mathcal{L}\left(\frac{\alpha - \alpha_g}{b}\right) + \gamma\alpha + G'_0,$$

Eq 12 where $$G'_0$$

is the initial storage modulus, $\alpha_g$ is the extent of cure at which glass transition occurs, b relates to the sharpness of the transition with α, a relates to the ultimate storage modulus, and $\mathcal{L}$(x) the logistic sigmoid function defined as $\mathcal{L}(x)=(1+e^{-x})^{-1}$.

Photorheology and cure kinetics data were corrected to remove oxygen inhibition and then fitted to Equation 12 with the default nonlinear least squares method in the MATLAB curve fitting toolbox. FIG. 18A and FIG. 18C show G' versus $\alpha_c$ and FIG. 18B and FIG. 18D b and c show G' versus $\alpha_s$ for both resins systems at each illumination intensity. In FIG. 5 the dashed black lines indicate model fits, and the fit parameters are listed in Table 3. Individually fitted curves are shown in Figures FIGS. 27A-27D, FIGS. 28A-28D, FIGS. 29A-29D, and FIGS. 30A-30D.

TABLE 3

| G'(α) fit parameters for PBE-unfilled and PBE-filled resins plotted in FIG. 5. | | | | | | | |
|---|---|---|---|---|---|---|---|
| Resin | Kinetics Type | I (mW/cm²) | a (MPa) | b | $\alpha_g$ | γ (MPa) | SSE |
| PBE-unfilled | Chemical | 1.0 | 0.92 | 0.05 | 0.62 | 0.04 | 6.43 |
| | | 0.75 | 1.18 | 0.03 | 0.65 | 0.04 | 0.27 |
| | | 0.50 | 1.07 | 0.02 | 0.68 | 0.03 | 0.59 |
| | | 0.20 | 0.95 | 0.02 | 0.68 | 0.02 | 0.99 |
| | Structural | 1.0 | 0.91 | 0.02 | 0.31 | 0.12 | 5.05 |
| | | 0.75 | 1.18 | 0.01 | 0.34 | 0.13 | 1.11 |
| | | 0.50 | 1.08 | 0.01 | 0.35 | 0.07 | 1.12 |
| | | 0.20 | 1.08 | 0.01 | 0.36 | 0.04 | 0.13 |
| PBE-filled | Chemical | 1.0 | 1.83 | 0.03 | 0.82 | 0.15 | 1.8 |
| | | 0.75 | 1.45 | 0.03 | 0.81 | 0.11 | 3.63 |
| | | 0.50 | 0.96 | 0.05 | 0.83 | 0.26 | 24.82 |
| | | 0.20 | 0.95 | 0.03 | 0.82 | 0.16 | 4.03 |
| | Structural | 1.0 | 1.89 | 0.02 | 0.34 | 0.34 | 11.25 |
| | | 0.75 | 1.43 | 0.01 | 0.33 | 0.32 | 12.99 |
| | | 0.50 | 1.46 | 0.04 | 0.36 | 0.52 | 8.8 |
| | | 0.20 | 1.23 | 0.02 | 0.33 | 0.41 | 7.32 |

For PBE-unfilled chemical, Equation 12 provided fits with self-consistent and physically realistic values for $\alpha_g$ ranging from 0.62 to 0.68 and a ranging from 0.92 to 1.18 MPa. Interestingly, $\alpha_g$ appears to be negatively correlated to I indicating that a faster cure rate results in a transition to the glassy state at a lower degree of polymerization, but this may be related to the kinetics of the polymerization versus timescale of the measurement. PBE-unfilled structural also fits well to Equation 12 and provides values of $\alpha_g$ between 0.31 and 0.36 similarly decreasing in value as I increases, and values of a between 0.91 and 1.18 MPa. The ratios of the values of $\alpha_g$ for the chemical kinetics to those of the structural kinetics results in 1.94±0.04, consistent with the values of c in both previously published results and Table 1. The values for b and γ appear to remain relatively consistent regardless of illumination intensity across both chemical and structural kinetics.

In the case of PBE-filled Equation 12 again provided fits with self-consistent and physically realistic values for both structural and chemical kinetics. However, as seen in Table 3, the PBE-filled chemical kinetics showed a far more stable $a_g$ ranging from 0.81 to 0.83 and wider ranging values of $\alpha$ from 0.95 to 1.82 MPa. Table 3 also shows G' versus $\alpha_s$ for the PBE-filled at all four illumination intensities, which also fits well to Equation 12. These results provide values of $\alpha_g$ between 0.33 and 0.36 that similarly decrease in value as I increases, and values of a between 1.23 and 1.89 MPa. The ratios of the values of $\alpha_g$ for the chemical kinetics to those of the structural kinetics results in 2.41±0.08, consistent with the c values in Table 1. The values for b are fairly consistent with those of the unfilled resin systems, but the values of $\gamma$ show a stark increase when compared to those of the PBE-unfilled resin. This is likely due to the additional rheological complexity of the filled resin system, which could affect the evolution of the Poisson ratio throughout the cure, and therefore increase the deviation from the simple sigmoidal approximation. Interestingly, $\alpha_g$ for the PBE-filled resin chemical conversion was significantly greater than $\alpha_g$ for the PBE-unfilled, consistent with resin plasticization by the fillers. However, there does not appear to be a significant change in $\alpha_g$ for the structural conversion. This appears to be because the final G' values are relatively consistent (within 1 MPa of each other) for both PBE-filled and PBE-unfilled as shown in Table 4. This further supports the theory that $\alpha_s$ is a measure of the change in modulus, similar to how $\alpha_c$ is a measure of the change in bond concentration.

TABLE 4

| Final shear modulus G' for PBE-unfilled and PBE-filled at various illumination intensities. | | | |
| --- | --- | --- | --- |
| Intensity (mW/cm²) | 1.00 | 0.75 | 0.50 | 0.20 |
| PBE-unfilled \| G' (MPa) | 0.98 ± 0.04 | 1.21 ± 0.02 | 1.07 ± 0.03 | 0.90 ± 0.03 |
| PBE-filled \| G' (MPa) | 2.00 ± 0.07 | 1.57 ± 0.11 | 1.12 ± 0.07 | 1.12 ± 0.07 |

Conclusion

By comparing two rheologically distinct but chemically similar resin formulations, a direct correlation between the structural conversion kinetics as determined by the normalized disorder band in the low-frequency Raman spectrum and the change in modulus throughout the cure process was demonstrated. Not only does this serve to elucidate the cause of previously observed discrepancies between the structural and chemical conversion profiles, but through the development of a relatively simplistic model for modulus as a function of $\alpha$ it was shown that both $\alpha_s$ and $\alpha_c$ are related to G'. Additionally, despite the rheological differences between the two resin systems the ability to create conversion master curves as a function of effective dose was demonstrated, providing self-consistent kinetic constants across both chemical ($\alpha=\alpha_c$) and structural ($\alpha=c\ \alpha_s$) conversion measurements. In addition to the chemically agnostic nature and high signal-to-noise ratio that already make $\alpha_s$ extremely desirable as a method of determining cure kinetics behavior of resins, the direct relationship between $\alpha_s$ and the rheological properties described herein not only illustrates the underlying physical phenomena behind the technique, but is also believed to expand its usefulness for better understanding the structure-property-processing relationships of a resin throughout its cure.

Example 4: Low-Frequency Longitudinal Acoustic Phonon Modes Provide Insight Into Polymerization Kinetics of Epoxy and Dual-Cure Resins As illustrated in FIGS. 31A-31B, the intensity of the disorder band is directly proportional to the entropy of the material. This relationship can be leveraged to assess cure kinetics, as shown in the schematic of FIG. 32. This Example analyzes various materials according to this workflow.

FIGS. 33A-36B show chemical and structural cure kinetics of DA-2, as determined using this method. Referring specifically to FIGS. 35A-35B, it is shown that using the low-frequency region of the Raman spectrum, similar curves are observed for chemical and structural kinetics, only with different constants since the structural "conversion" is not a direct measure of C=C to C—C conversion.

Next, the chemical and structural cure kinetics of Epon828 are shown in FIGS. 37A-38. As with DA-2, using the low-frequency region of the Raman spectrum, similar curves are observed for chemical and structural kinetics, only with different constants since the structural "conversion" is not a direct measure of C—O—C ring opening.

As illustrated in FIGS. 39A-40, fitted Boson Peaks are redshift as the material hardens, and the relative positions are consistent with both temperature and moduli. A comparison of the position of the Boson peak in the DA-2 Raman spectrum and Epon828 Raman spectrum is also shown in FIGS. 39A-40.

The chemical and structural cure kinetics of PM-Bis-GMA-Epon828 are shown in FIGS. 41A-42.

FIGS. 43A-43D show graphs illustrating chemical versus structural kinetics. By ratioing the structure and chemical kinetic curves, it was found that they are directly proportional to each other, proving that the polymerization of the resin can be directly correlated with the decrease in disorder (entropy) using low-frequency Raman spectroscopy.

FIG. 44 shows a graph illustrating single versus dual core proportionality constant. The proportionality constant for the pure methacrylate formulation is consistently smaller than for the methacrylate-epoxy, which is consistent with the fact that the epoxies are not polymerized by UV illumination.

FIGS. 45A-45B show graphs illustrating PM-BisGMA-Epon828 dual cure kinetics, structural with cool down. Structural cure kinetics enables the continuous in situ monitoring of resins regardless of initiation or chemistry. Additionally, the thermally-induced increase in the disorder band is reversable.

This Example demonstrates the ability to use Raman spectroscopy as a means of monitoring in situ curing kinetics of methacrylate and epoxy based resins. Additionally, it is shown herein that low-frequency Raman spectroscopy facilitates direct measurement of structural changes with a much higher signal-to-noise ratio. It is further shown herein that low-frequency Raman can be used to measure methacrylate, epoxy, and dual functional resins making it a chemistry agnostic technique. Further still, it is shown herein that in addition to QERS decreasing when the material hardens, the intensity of the Boson peak does as well.

ENUMERATED EMBODIMENTS

The following exemplary embodiments are provided, the numbering of which is not to be construed as designating levels of importance:

Embodiment 1: A method of monitoring a kinetic process of an amorphous material, the method comprising:

measuring a disorder band of the amorphous material using Raman spectroscopy, the disorder band including a spectral peak and a shoulder;

normalizing the disorder band to the shoulder, generating an integrated value; and analyzing the integrated value to determine a status of the kinetic process of the amorphous material.

Embodiment 2: The method of Embodiment 1, wherein the disorder band is a low-frequency disorder band in a terahertz region.

Embodiment 3: The method of Embodiment 2, wherein the low-frequency disorder band is measured in a spectrum below 150 cm$^{-1}$.

Embodiment 4: The method of Embodiment 1, wherein the shoulder is formed by a van Hove peak.

Embodiment 5: The method of Embodiment 1, wherein the spectral peak is formed by at least one of a Boson peak and quasi-elastic Rayleigh scattering (QERS).

Embodiment 6: The method of Embodiment 1, wherein the Raman spectroscopy is performed using a double volume-holographic-grating-based fiber optic Raman probe, with an unpolarized laser source and collection optics.

Embodiment 7: The method of Embodiment 1, wherein the amorphous materials comprises a bulk polymer, film, and/or fiber.

Embodiment 8: The method of Embodiment 1, wherein the method is noncontact and chemically agnostic.

Embodiment 9: The method of Embodiment 1, wherein kinetic process comprises glass transition temperature ($T_g$) kinetics.

Embodiment 10: The method of Embodiment 9, wherein the shoulder is formed at between 50 and 100 cm$^{-1}$.

Embodiment 11: The method of Embodiment 9, wherein the spectral peak is formed at between 5 and 20 cm$^{-1}$.

Embodiment 12: The method of Embodiment 9, wherein the integrated value comprises integrated intensity near the spectral peak.

Embodiment 13: The method of Embodiment 12, wherein analyzing the integrated value comprises:

monitoring the integrated intensity over temperature; and assessing a temperature-dependent status of the $T_g$ kinetics of the amorphous material. Embodiment 14: The method of Embodiment 1, wherein kinetic process comprises cure kinetics.

Embodiment 15: The method of Embodiment 14, wherein the cure kinetics comprise at least one of polymerization and gelation.

Embodiment 16: The method of Embodiment 14, wherein the shoulder is formed at between 50 and 100 cm$^{-1}$.

Embodiment 17: The method of Embodiment 14, wherein the spectral peak is formed at between 5 and 20 cm$^{-1}$.

Embodiment 18: The method of Embodiment 14, wherein analyzing the integrated value comprises:

monitoring a decrease in the integrated value over at least one of time and temperature; and assessing at least one of a time-dependent and a temperature-dependent status of the cure kinetic of the amorphous material.

Embodiment 19: The method of Embodiment 14, wherein the cure kinetics comprise structural conversion kinetics and chemical conversion kinetics.

Embodiment 20: The method of Embodiment 19, further comprising correlating the structural conversion kinetics to the chemical conversion kinetics.

The terms and expressions employed herein are used as terms of description and not of limitation, and there is no intention in the use of such terms and expressions of excluding any equivalents of the features shown and described or portions thereof, but it is recognized that various modifications are possible within the scope of the embodiments of the present application. Thus, it should be understood that although the present application describes specific embodiments and optional features, modification and variation of the compositions, methods, and concepts herein disclosed may be resorted to by those of ordinary skill in the art, and that such modifications and variations are considered to be within the scope of embodiments of the present application.

What is claimed is:

1. A method of monitoring a kinetic process of an amorphous material, the method comprising:

measuring a disorder band of the amorphous material using Raman spectroscopy, the disorder band including a spectral peak and a shoulder;

normalizing the disorder band to the shoulder, generating an integrated value; and analyzing the integrated value to determine a status of the kinetic process of the amorphous material.

2. The method of claim 1, wherein the disorder band is a low-frequency disorder band in a terahertz region.

3. The method of claim 2, wherein the low-frequency disorder band is measured in a spectrum below 150 cm$^{-1}$.

4. The method of claim 1, wherein the shoulder is formed by a van Hove peak.

5. The method of claim 1, wherein the spectral peak is formed by at least one of a Boson peak and quasi-elastic Rayleigh scattering (QERS).

6. The method of claim 1, wherein the Raman spectroscopy is performed using a double volume-holographic-grating-based fiber optic Raman probe, with an unpolarized laser source and collection optics.

7. The method of claim 1, wherein the amorphous materials comprises a bulk polymer, film, and/or fiber.

8. The method of claim 1, wherein the method is noncontact and chemically agnostic.

9. The method of claim 1, wherein kinetic process comprises glass transition temperature ($T_g$) kinetics.

10. The method of claim 9, wherein the shoulder is formed at between 50 and 100 cm$^{-1}$.

11. The method of claim 9, wherein the spectral peak is formed at between 5 and 20 cm$^{-1}$.

12. The method of claim 9, wherein the integrated value comprises integrated intensity near the spectral peak.

13. The method of claim 12, wherein analyzing the integrated value comprises:

monitoring the integrated intensity over temperature; and assessing a temperature-dependent status of the $T_g$ kinetics of the amorphous material.

14. The method of claim 1, wherein kinetic process comprises cure kinetics.

15. The method of claim 14, wherein the cure kinetics comprise at least one of polymerization and gelation.

16. The method of claim 14, wherein the shoulder is formed at between 50 and 100 $cm^{-1}$.

17. The method of claim 14, wherein the spectral peak is formed at between 5 and 20 $cm^{-1}$.

18. The method of claim 14, wherein analyzing the integrated value comprises:

monitoring a decrease in the integrated value over at least one of time and temperature; and assessing at least one of a time-dependent and a temperature-dependent status of the cure kinetic of the amorphous material.

19. The method of claim 14, wherein the cure kinetics comprise structural conversion kinetics and chemical conversion kinetics.

20. The method of claim 19, further comprising correlating the structural conversion kinetics to the chemical conversion kinetics.

\* \* \* \* \*